(12) United States Patent
Kondo

(10) Patent No.: US 7,406,712 B2
(45) Date of Patent: Jul. 29, 2008

(54) COMMUNICATION APPARATUS, COMMUNICATION METHOD, AND RECORDING MEDIUM USED THEREWITH

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1535 days.

(21) Appl. No.: 09/860,177

(22) Filed: May 16, 2001

(65) Prior Publication Data

US 2002/0040433 A1 Apr. 4, 2002

(30) Foreign Application Priority Data

May 19, 2000 (JP) ............................. 2000-148552

(51) Int. Cl.
*G06F 17/30* (2006.01)
*G06F 11/00* (2006.01)
(52) U.S. Cl. ................................ 726/23; 726/22; 726/2
(58) Field of Classification Search ......... 713/200–202; 726/5, 23, 22, 2
See application file for complete search history.

(56) References Cited

OTHER PUBLICATIONS www.faqs.org/rfcs/rfc2805.html.*
Multimedia data-embedding and watermarking technologies Swanson, M.D.; Kobayashi, M.; Tewfik, A.H.; Proceedings of the IEEE vol. 86, Issue 6, Jun. 1998 pp. 1064-1087.*
Data-Hiding Codes Moulin, P.; Koetter, R.; Proceedings of the IEEE vol. 93, Issue 12, Dec. 2005 pp. 2083-2126.*
A multikey secure multimedia proxy using asymmetric reversible parametric sequences: theory, design, and implementation Yeung, S.F.; Lui, J.C.S.; Yau, D.K.Y.; Multimedia, IEEE Transactions on vol. 7, Issue 2, Apr. 2005 pp. 330-338.*
www.faqs.org/rfcs/rfc2805.html, as printed out in year 2004.*

* cited by examiner

*Primary Examiner*—David Y Jung
(74) *Attorney, Agent, or Firm*—Frommer Lawrence & Haug LLP; William S. Frommer; Thomas F. Presson

(57) ABSTRACT

Encoded data that is obtained by embedding subdata in advertisement information and embedding the subdata-embedded advertisement information in main data is provided to a user. At the user side, the encoded data is decoded to reproduce the main data and the subdata-embedded advertisement information, and the subdata-embedded advertisement information is decoded to reproduce the advertisement information and the subdata embedded therein.

32 Claims, 71 Drawing Sheets

FIG. 4A

| CONTENT IDENTIFIER | POINTER |
|---|---|
| http://www.·····/FILE1 | AD1 |
| http://www.·····/FILE2 | AD2 |
| http://www.·····/FILE3 | AD3 |
| ⋮ | ⋮ |
| | |

FIG. 4B

| | HEADER | ICON DATA | TEXT DATA | | | | LINK DATA | | | |
|---|---|---|---|---|---|---|---|---|---|---|
| | | | #1 | #2 | ····· | #M | #1 | #2 | ····· | #M |
| AD1 | | | | | | | | | | |
| AD2 | | | | | | | | | | |
| AD3 | | | | | | | | | | |
| ⋮ | ⋮ | ⋮ | ⋮ | ⋮ | | ⋮ | ⋮ | ⋮ | | ⋮ |
| | | | | | | | | | | |

PACKAGE DATA

PACKAGE DATA

FIG. 15

| HEADER | MAIN DATA (IMAGE/TEXT/ SOUND) | SUBDATA ||||||||||||||
| --- | --- | --- | --- | --- | --- | --- | --- | --- | --- | --- | --- | --- | --- | --- | --- |
| | | TEXT DATA ||| LINK DATA ||| IMAGE DATA ||| LINK DATA ||| SOUND DATA ||| LINK DATA |||
| | | #1 | #2 | --- #$M_1$ | #1 | #2 | --- #$M_1$ | #1 | #2 | --- #$M_2$ | #1 | #2 | --- #$M_2$ | #1 | #2 | --- #$M_3$ | #1 | #2 | --- #$M_3$ |
| AD1 | | | | | | | | | | | | | | | | | | | |
| AD2 | | | | | | | | | | | | | | | | | | | |
| AD3 | | | | | | | | | | | | | | | | | | | |
| ⋯⋯ | ⋯⋯ | ⋯⋯ | ⋯⋯ | ⋯⋯ | ⋯⋯ | ⋯⋯ | ⋯⋯ | ⋯⋯ | ⋯⋯ | ⋯⋯ | ⋯⋯ | ⋯⋯ | ⋯⋯ | ⋯⋯ | ⋯⋯ | ⋯⋯ | ⋯⋯ | ⋯⋯ | ⋯⋯ |

FIG. 26A

REQUEST-FREQUENCY INFORMATION

| USER ID | GENRE | | | AREAS | | | SEX | | ------ |
|---|---|---|---|---|---|---|---|---|---|
| | POPS | ROCK | ENKA | JAPAN | USA | EUROPE | MALE | FEMALE | ------ |
| ID1 | | | | | | | | | |
| ID2 | | | | | | | | | |
| ID3 | | | | | | | | | |
| ⋮ | ⋮ | ⋮ | ⋮ | ⋮ | ⋮ | ⋮ | ⋮ | ⋮ | |
| | | | | | | | | | |

FIG. 26B

| USER ID | PACKAGE-CONTENT-CHANGE INFORMATION | LINK-DATA-CHANGE INFORMATION |
|---|---|---|
| ID1 | | |
| ID2 | | |
| ID3 | | |
| | | |
| | | |

PIXEL

| p(1,1) | p(2,1) | p(3,1) | p(4,1) | p(5,1) | p(6,1) | p(7,1) | p(8,1) | p(9,1) |
|---|---|---|---|---|---|---|---|---|
| p(1,2) | p(2,2) | p(3,2) | p(4,2) | p(5,2) | p(6,2) | p(7,2) | p(8,2) | p(9,2) |
| p(1,3) | p(2,3) | p(3,3) | p(4,3) | p(5,3) | p(6,3) | p(7,3) | p(8,3) | p(9,3) |
| p(1,4) | p(2,4) | p(3,4) | p(4,4) | p(5,4) | p(6,4) | p(7,4) | p(8,4) | p(9,4) |
| p(1,5) | p(2,5) | p(3,5) | p(4,5) | p(5,5) | p(6,5) | p(7,5) | p(8,5) | p(9,5) |
| p(1,6) | p(2,6) | p(3,6) | p(4,6) | p(5,6) | p(6,6) | p(7,6) | p(8,6) | p(9,6) |
| p(1,7) | p(2,7) | p(3,7) | p(4,7) | p(5,7) | p(6,7) | p(7,7) | p(8,7) | p(9,7) |
| p(1,8) | p(2,8) | p(3,8) | p(4,8) | p(5,8) | p(6,8) | p(7,8) | p(8,8) | p(9,8) |
| p(1,9) | p(2,9) | p(3,9) | p(4,9) | p(5,9) | p(6,9) | p(7,9) | p(8,9) | p(9,9) |
| p(1,10) | p(2,10) | p(3,10) | p(4,10) | p(5,10) | p(6,10) | p(7,10) | p(8,10) | p(9,10) |

FIG. 36

PIXEL

| p(1,1) | p(2,1) | p(3,1) | p(4,1) | p(5,1) | p(6,1) | p(7,1) | p(8,1) | p(9,1) |
|---|---|---|---|---|---|---|---|---|
| p(1,2) | p(2,2) | p(3,2) | p(4,2) | p(5,2) | p(6,2) | p(7,2) | p(8,2) | p(9,2) |
| p(1,3) | p(2,3) | p(3,3) | p(4,3) | p(5,3) | p(6,3) | p(7,3) | p(8,3) | p(9,3) |
| (p(1,4)) | p(2,4) | p(3,4) | p(4,4) | (p(5,4)) | p(6,4) | p(7,4) | p(8,4) | p(9,4) |
| p(1,5) | p(2,5) | p(3,5) | p(4,5) | p(5,5) | p(6,5) | p(7,5) | p(8,5) | p(9,5) |
| p(1,6) | p(2,6) | p(3,6) | p(4,6) | p(5,6) | p(6,6) | p(7,6) | p(8,6) | p(9,6) |
| p(1,7) | p(2,7) | p(3,7) | p(4,7) | p(5,7) | p(6,7) | p(7,7) | p(8,7) | p(9,7) |
| (p(1,8)) | p(2,8) | p(3,8) | p(4,8) | (p(5,8)) | p(6,8) | p(7,8) | p(8,8) | p(9,8) |
| p(1,9) | p(2,9) | p(3,9) | p(4,9) | p(5,9) | p(6,9) | p(7,9) | p(8,9) | p(9,9) |
| p(1,10) | p(2,10) | p(3,10) | p(4,10) | p(5,10) | p(6,10) | p(7,10) | p(8,10) | p(9,10) |

FIG. 42A
FIG. 42B
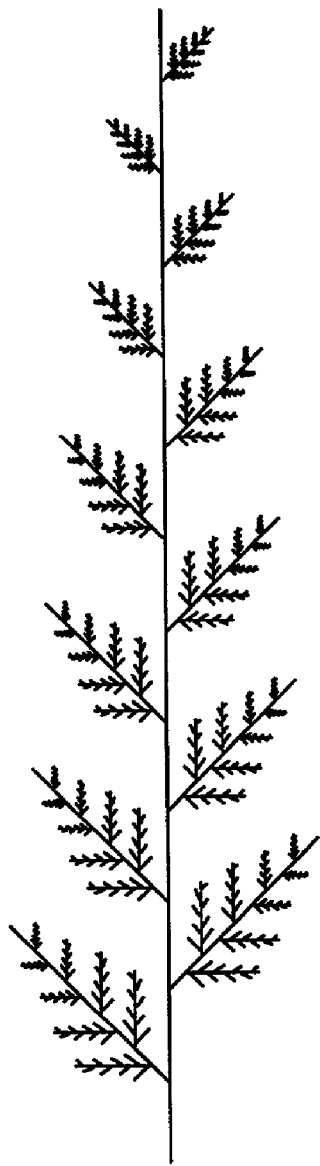
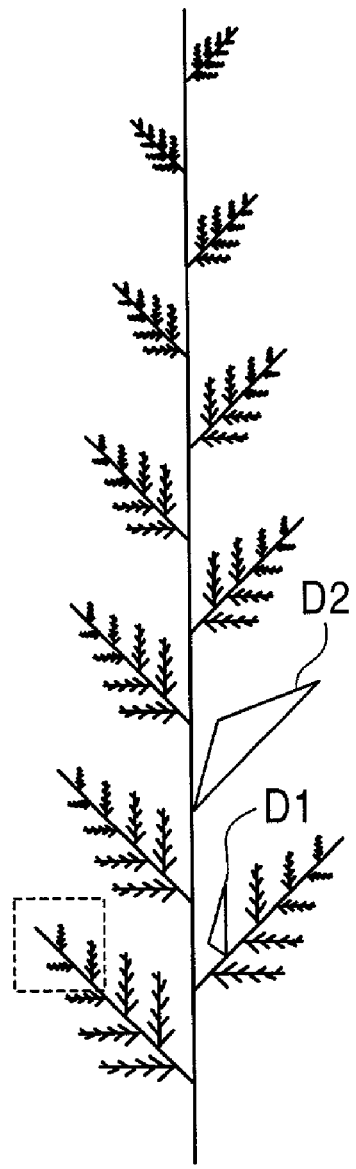

COLUMN VECTOR SPACE

| (1,1) | (1,2) | (1,3) | (1,4) | (1,5) | (1,6) | | (1,N) |
|---|---|---|---|---|---|---|---|
| (2,1) | (2,2) | (2,3) | (2,4) | (2,5) | (2,6) | | (2,N) |
| (3,1) | (3,2) | (3,3) | (3,4) | (3,5) | (3,6) | ... | (3,N) |
| (4,1) | (4,2) | (4,3) | (4,4) | (4,5) | (4,6) | | (4,N) |
| (5,1) | (5,2) | (5,3) | (5,4) | (5,5) | (5,6) | | (5,N) |
| | | : | | | | | |
| (M,1) | (M,2) | (M,3) | (M,4) | (M,5) | (M,6) | | (M,N) |

PIXEL

FIG. 61A

PIXEL

| (1,3) | (1,4) | (1,6) | (1,5) | (1,1) | (1,N) | | (1,2) |
|---|---|---|---|---|---|---|---|
| (2,3) | (2,4) | (2,6) | (2,5) | (2,1) | (2,N) | | (2,2) |
| (3,3) | (3,4) | (3,6) | (3,5) | (3,1) | (3,N) | ------- | (3,2) |
| (4,3) | (4,4) | (4,6) | (4,5) | (4,1) | (4,N) | | (4,2) |
| (5,3) | (5,4) | (5,6) | (5,5) | (5,1) | (5,N) | | (5,2) |
| (M,3) | (M,4) | (M,6) | (M,5) | (M,4) | (M,N) | | (M,2) |

FIG. 61B

PIXEL

| (5,3) | (5,4) | (5,6) | (5,5) | (5,1) | (5,N) | | (5,2) |
|---|---|---|---|---|---|---|---|
| (3,3) | (3,4) | (3,6) | (3,5) | (3,1) | (3,N) | | (3,2) |
| (1,3) | (1,4) | (1,6) | (1,5) | (1,1) | (1,N) | ------- | (1,2) |
| (M,3) | (M,4) | (M,6) | (M,5) | (M,1) | (M,N) | | (M,2) |
| (2,3) | (2,4) | (2,6) | (2,5) | (2,1) | (2,N) | | (2,2) |
| (4,3) | (4,4) | (4,6) | (4,5) | (4,1) | (4,N) | | (4,2) |

COMMUNICATION APPARATUS, COMMUNICATION METHOD, AND RECORDING MEDIUM USED THEREWITH

BACKGROUND OF THE INVENTION

1. Field of the Invention

The present invention relates to communication apparatuses, communication methods, and recording media used therewith, and in particular, relates to a communication apparatus and a communication method in which the desired information can be obtained using a desired media-type and which securely show advertisements, etc., to users, and to a recording medium used with the communication apparatus and method.

2. Description of the Related Art

According to the World Wide Web (WWW) system on the Internet, a user uses a WWW browser to view Web pages provided by WWW servers.

The Web pages are described in a page-description language such as Hypertext Markup Language (HTML). By using HTML, various types of information can be linked to other types of information. Therefore, when viewing a certain Web page, the user follows links on the Web page and obtains the desired information.

The media-type of information at the destination of the link on the Web page is determined by the creator of the Web page. Accordingly, the user cannot always obtain the desired information in the desired media-type. In other words, for example, when users obtain information on a piece of music of a given artist, there are various users such as a user who wishes to know the name of the piece of music in text form, a user who wishes to listen to the music, a user who wishes to view the image of the jacket of an album (such as a compact disk) containing the music. In this case, necessary information cannot always be provided in the media-type desired by the user.

Also, there is a case in which a Web page has a banner advertisement linked to a Web page having a description of advertisement information. In this case, advertisement information to which the banner advertisement is linked cannot be displayed on the WWW browser unless the user clicks on the banner advertisement. This makes it impossible to ensure that the advertisement information is shown to the user.

SUMMARY OF THE INVENTION

Accordingly, the present invention is made in view of the foregoing circumstances, and it is an object of the present invention to provide a communication apparatus and a communication method in which desired information can be obtained using the desired media-type and which ensures that predetermined information such as an advertisement is shown to users, and a recording medium used with the communication apparatus and method.

To this end, according to an aspect of the present invention, there is provided a communication apparatus for transmitting data when requested by an external apparatus. The communication apparatus includes a storage unit, a retrieval unit, an encryption unit, and a communication unit. The storage unit stores a plurality of pieces of package data each of which consists of main data and subdata. The main data is one of a plurality of pieces of media data. The subdata consists of a plurality of pieces of media data and a plurality of pieces of link data corresponding thereto. The retrieval unit retrieves the desired package data from the storage unit in response to a request from the external apparatus. The encryption unit outputs encrypted package data generated by encrypting the retrieved package data. The communication unit transmits the encrypted package data to the external apparatus.

Therefore, because the communication apparatus of the present invention can send data of desired media-type in response to a request from an external apparatus, it can enable a real multimedia-database service.

According to another aspect of the present invention, there is provided a communication apparatus for receiving data from an external apparatus. The communication apparatus includes a request unit, an output unit, a user-instruction detecting unit, and an output control unit. The request unit requests, from the external apparatus, package data consisting of main data and subdata in response to a user's instruction. The main data is one of a plurality of media data. The subdata consists of a plurality of pieces of media data and a plurality of pieces of link data corresponding thereto. The output unit outputs, in response to the request by the request unit, the main data of the package data received from the external apparatus. The user-instruction detecting unit detects a user's instruction concerning the output main data. The output control unit outputs the subdata corresponding to the output main data when the user's instruction is detected by the user-instruction detecting unit. When the user-instruction detecting unit detects a user's instruction concerning part of the subdata, the request unit requests new package data from the external apparatus based on link data corresponding to the part of the subdata.

The communication apparatus of the present invention can be provided with a real multimedia-database service via a very simplified interface because it can obtain data of desired media-type from an external apparatus.

According to another aspect of the present invention, there is provided a communication apparatus for transmitting data to an external apparatus. The communication apparatus includes a storage unit, a retrieval unit, and a communication unit. The storage unit stores a plurality of pieces of encoded data generated by performing encoding so that predetermined information is reproduced when decoding the encoded data. The retrieval unit retrieves desired encoded data from the storage unit in response to a request from the external apparatus. The communication unit transmits the retrieved encoded data to the external apparatus.

According to the communication apparatus of the present invention, by providing with an external apparatus with encoded data in which predetermined information can be reproduced in decoding, the external apparatus can be controlled to ensure that predetermined information is shown when the external apparatus obtains a final decoded result. Thus, information displayed by the external apparatus can be easily controlled.

According to another aspect of the present invention, there is provided a communication apparatus for receiving data from an external apparatus. The communication apparatus includes a request unit, a decoding unit, and an output unit. The request unit requests, from the external apparatus, encoded data generated by performing encoding so that predetermined information is reproduced when decoding the encoded data. The decoding unit retrieves and decodes the requested encoded data. The output unit outputs both the predetermined information and decoded data generated by finally decoding the encoded data.

Because the communication apparatus of the present invention is provided with encoded data in which predetermined information can be reproduced in decoding, it is controlled to ensure that the predetermined information is shown when being used to obtain a final decoded result. Thus, information displayed by the communication apparatus can be easily controlled.

BRIEF DESCRIPTION OF THE DRAWINGS

FIGS. 4A and 4B are illustrations of a look-up table and a data storage part contained in the database 31 shown in FIG. 3;

FIG. 15 is an illustration of a data storage part in the database 31 shown in FIG. 3;

FIGS. 26A and 26B are illustrations of user-preference information and change information which constitute user information;

FIG. 32 is an illustration of processing in step 101 shown in FIG. 31;

FIG. 36 is an illustration of a case in which 1-bit information is embedded for four pixels;

FIGS. 42A and 42B are illustrations of encoding/decoding using similarity;

FIG. 44 consists of illustrations (A) and (B) of an embedded coding process and an embedded decoding process;

FIGS. 49A, 49B, 49C, 49D, 49E, 49F, 49G, 49H, 49I, 49J, and 49K are illustrations of results of an embedded coding process;

FIGS. 61A and 61B are illustrations of switching of rows and columns;

DESCRIPTION OF THE PREFERRED EMBODIMENTS

Figure 1:
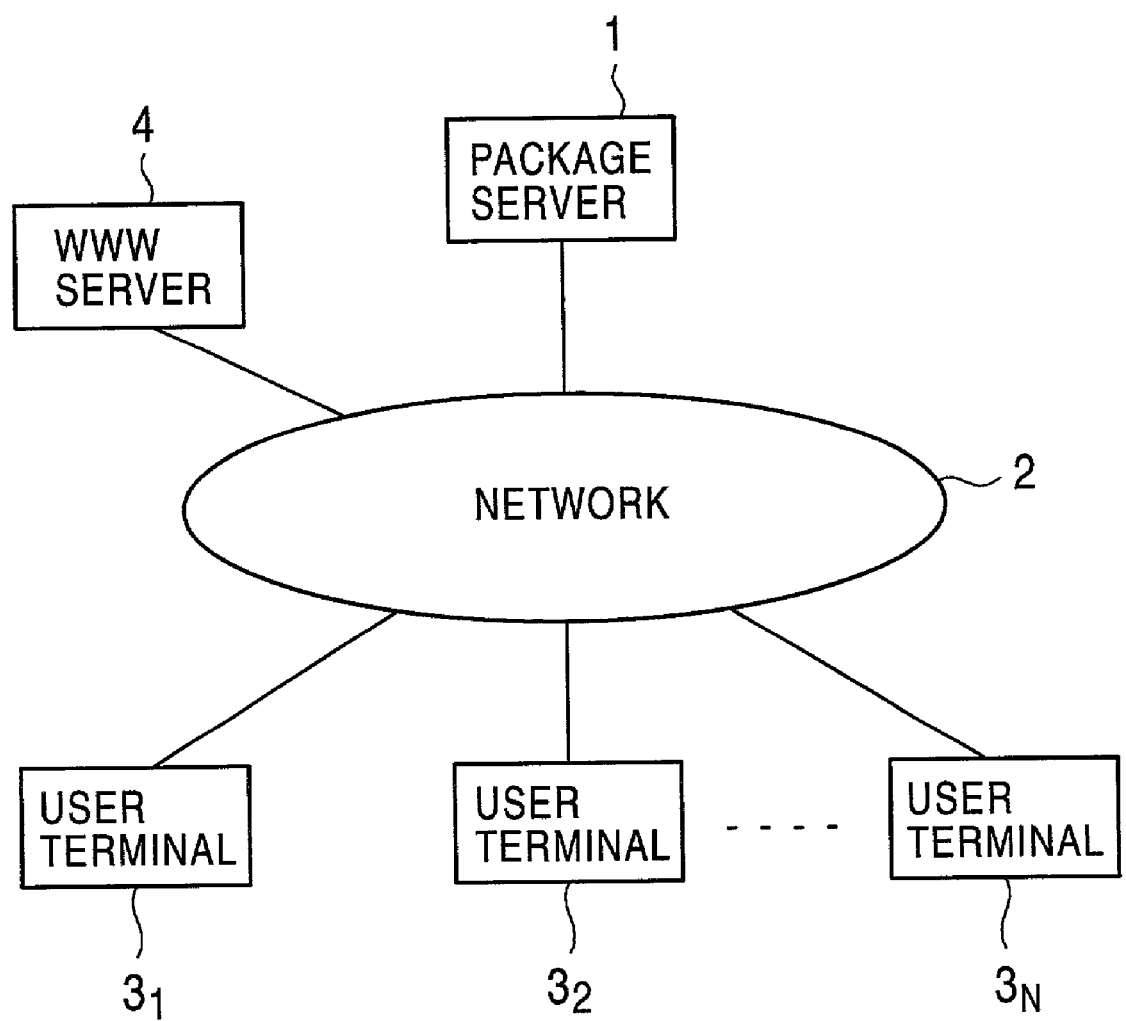
FIG. 1 is a block diagram showing an embodiment of a network system to which the present invention is applied.

FIG. 1 shows an embodiment of a network system to which the present invention is applied.

In response to a request from one of user terminals $3_1$, $3_2$, ... $3_N$ (one of the user terminals $3_1$ to $3_N$ is hereinafter referred to as a "user terminal 3" unless it needs to be particularly distinguished from the other ones), a package server 1 transmits package data (as described later) via a network 2 such as the Internet.

The user terminal 3 uses the network 2 to request package data from the package server 1, as required, and receives and outputs the package data transmitted as a response from the package server 1 (the package data is displayed in a form such as image or text, or is output as sound). The user terminal 3 requests a Web page or the like from a WWW server 4 via the network 2, and receives and displays the Web page transmitted as a response from the WWW server 4 via the network 2.

In response to a request from the user terminal 3, the WWW server 4 transmits a Web page via the network 2.

Figure 2:
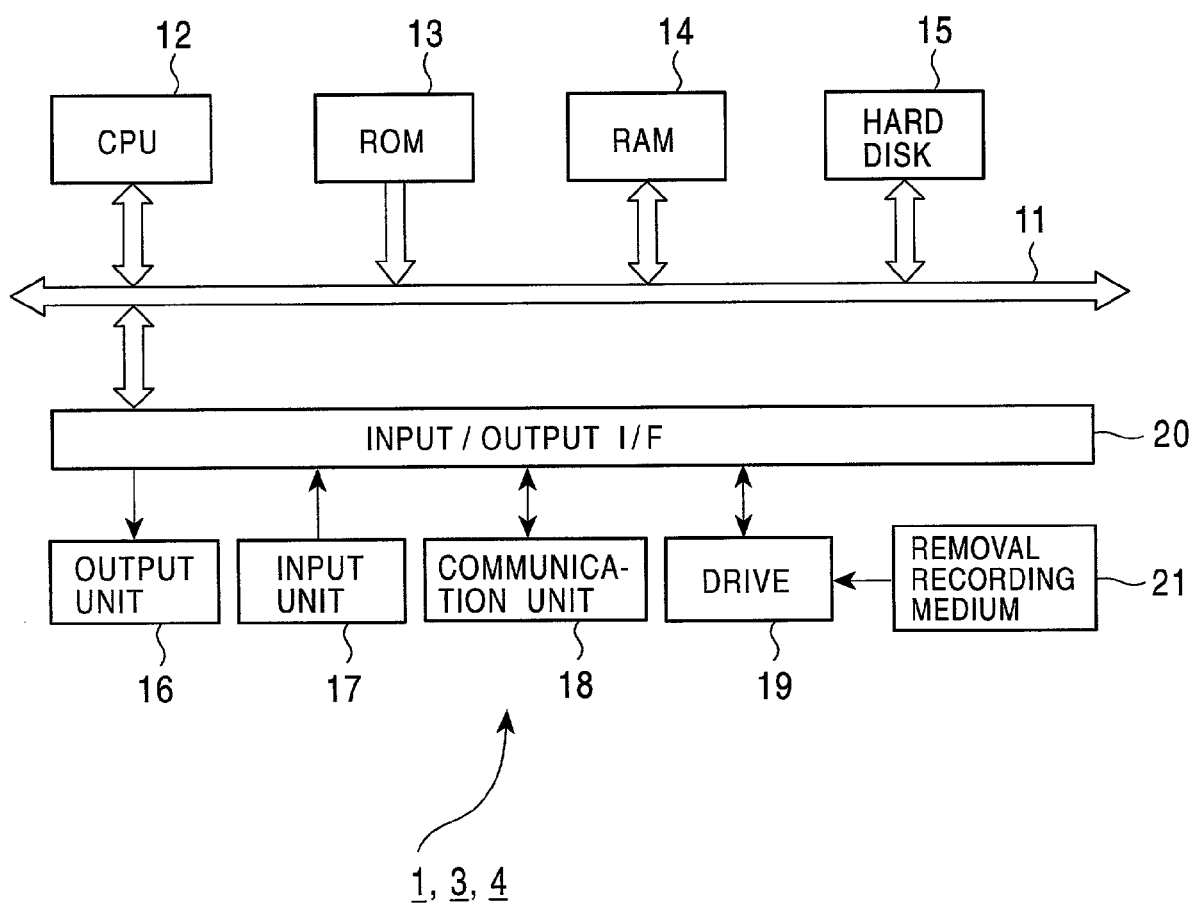
FIG. 2 is a block diagram showing a hardware configuration of each of the package server 1, the user terminal 3, and the WWW server 4 which are shown in FIG. 1.

Next, FIG. 2 shows a hardware configuration of each of the package server 1, the user terminal 3, and the WWW server 4.

The package server 1, the user terminal 3, and the WWW server 4 each have a computer-based structure.

Each apparatus has a built-in central processing unit (CPU) 12 as a computer. An input/output interface (I/F) 20 is connected to the CPU 12 via a bus 11. When a command is input to the CPU 12 via the input/output I/F 20 by operating, by the user of the apparatus, an input unit 17 having a keyboard, a microphone, etc., the CPU 12 executes, in response to the command, a program stored in a read-only memory (ROM) 13, which implements a dedicated browser (described later). Also, after loading it into a random access memory (RAM) 14, the CPU 12 executes one of the following programs: a program stored in a hard disk drive 15; a program installed in the hard disk drive 15 after being transferred from a network or a satellite and being received by a communication unit 18; and a program installed in the hard disk drive 15 after being read from a removal recording medium 21. This allows the CPU 12 to perform processes in accordance with flowcharts (described later) or processes performed in block diagrams (described later). Under control of the CPU 12, by using the input/output I/F 20, the result of each process is output from an output unit 16 including a liquid crystal display and a speaker, is transmitted by the communication unit 18, or is recorded in the hard disk drive 15.

In this Specification, processing steps that describe each program for controlling the computer to perform each process do not always need to be time-sequentially described in accordance with an order described in the form of each flowchart (described later), and also include processes (e.g., parallel processing or object-based processing) performed in parallel or separately.

Each program may be processed by one computer or may be distributively processed by a plurality of computers. Also, each program may be of a type which is transferred and executed in a remote computer.

In addition, each program can be recorded in the hard disk drive 15 or the ROM 13 as a type of recording medium built into a computer. Each program can be temporarily or permanently stored (recorded) on the removal recording medium 21 such as a floppy disk, a compact disk read only memory, a digital versatile disk, a magnetic disk, or a semiconductor memory. This removal recording medium 21 can be provided as so-called "package software".

Each program can be installed in the computer from the above removal recording medium 21. Also, it is possible that, by transferring each program by radio from a download site to the computer via a satellite for digital satellite broadcasting, or transferring each program to the computer by wire, the computer can install the transferred program in the hard disk drive 15 after receiving it by the communication unit 18.

Figure 3:
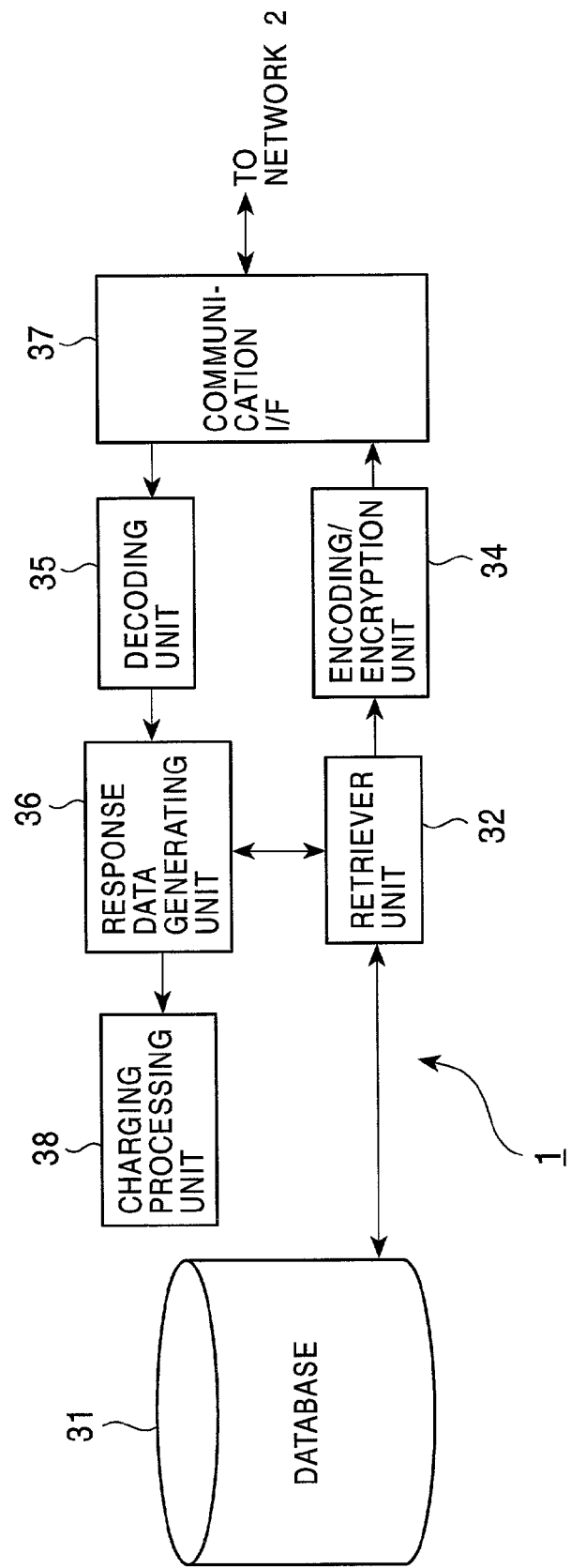
FIG. 3 is a block diagram showing a functional construction of the package server 1 shown in FIG. 1.

FIG. 3 shows a functional configuration of the package server 1 shown in FIG. 1.

A database 31 stores package data, etc., that the package server 1 provides to the user terminal 3. In response to a request from a response-data generating unit 36, the package data is retrieved from the database 31 and is supplied to the response-data generating unit 36 by a retriever unit 32. The retriever unit 32 receives package data as response data from the response-data generating unit 36, and supplies the response data to an encoding/encryption unit 34. The encoding/encryption unit 34 processes the supplied response data by performing protocol conversion (encoding) for transmission via the network 2, encryption necessary for establishing security, etc., and supplies the processed data to a communication I/F 37. A decoding unit 35 processes data from the user terminal 3 which is supplied from the communication I/F 37 by performing decryption for establishing security, protocol conversion, etc., and supplies the processed data to the response-data generating unit 36.

The response-data generating unit 36 recognizes, based on the data from the user terminal 3 which is supplied from the decoding unit 35, package data requested by the user, and controls the retriever unit 32 to retrieve the package data. The response-data generating unit 36 uses the package data supplied from the retriever unit 32 to generate response data, and supplies the generated response data to the retriever unit 32. The response-data generating unit 36 controls a charging processing unit 38 in accordance with a request, etc., from the user terminal 3.

The communication I/F 37 transmits the response data supplied from the encoding/encryption unit 34 to the user terminal 3, and receives and supplies, to the decoding unit 35, data transmitted from the user terminal 3 via the network 2. Under control of the response-data generating unit 36, the charging processing unit 38 performs charging.

With reference to FIGS. 4A and 4B to 6, data stored in the database 31 in the package server 1 (FIG. 3) is described below.

The database 31 contains a look-up table shown in FIG. 4A and a data storage part shown in FIG. 4B.

As shown in FIG. 4A, the look-up table consists of content identifiers for identifying package data stored in entries in the data storage part of the look-up table, and pointers for designating (the addresses of) entries at which the package data are stored. In the example shown in FIG. 4A, uniform resource locators (URL) are used as the content identifiers.

As shown in FIG. 4B, the data storage part consists of one or more entries at which the package data are stored.

Each package data consists of, for example, a header, icon data, text data, and link data in this order.

The header has predetermined information on the package data, such as the length of package data.

The icon data is image data to be displayed as an icon at the user terminal 3. The package data necessarily has single icon data.

The text data combines with the icon data to form a pair, and is text to be used as an item of a menu displayed when a predetermined event is given to the icon corresponding to the icon data. The package data includes a necessary number of text data. In the example shown in FIG. 4B, the package data has M data.

The link data is identification information for identifying package data to be linked to the text data. The link data is, for example, the content identifier of the package data linked to the text data. Accordingly, the package data basically includes an equal number of link data to the number of text data.

Figure 5:
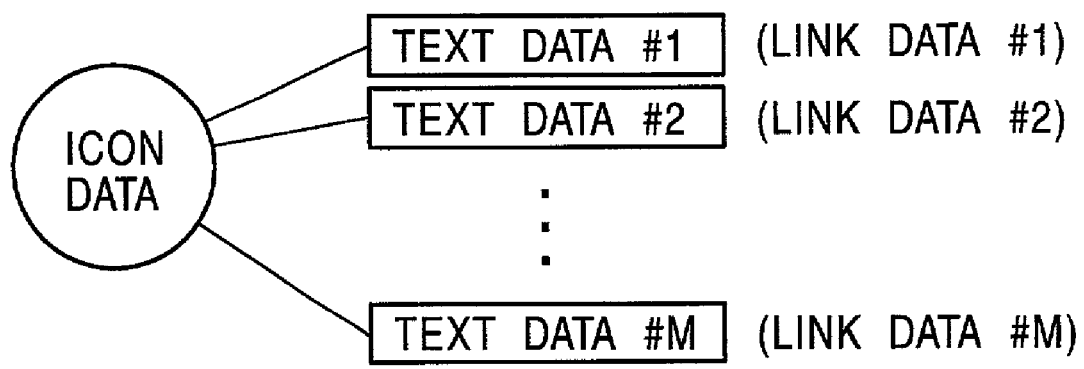
FIG. 5 is an illustration of package data.

In other words, the package data includes a set of icon data and a necessary number of text data #1 to #M to which link data representing links to other package data are correlated, as shown in FIG. 5. In the package data, each of the text data can be linked to other package data (or to the text data itself). Thus, by using package data itself as basic units, a link structure constituted by a plurality of package data can be formed.

Figure 6A:
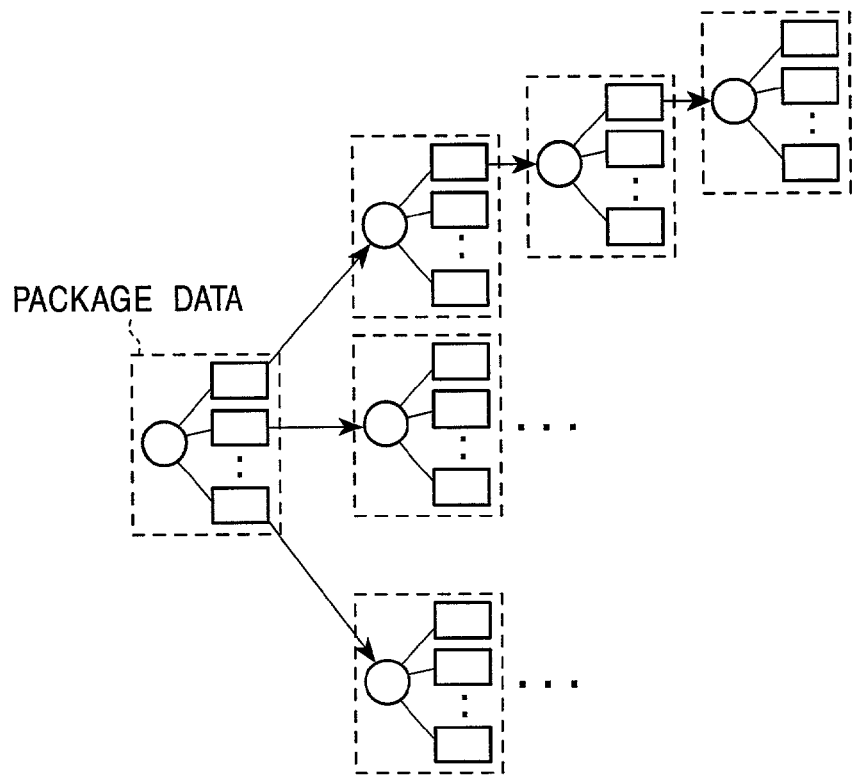
FIGS. 6A and 6B are illustrations of link structures formed by predetermined.
Figure 6B:
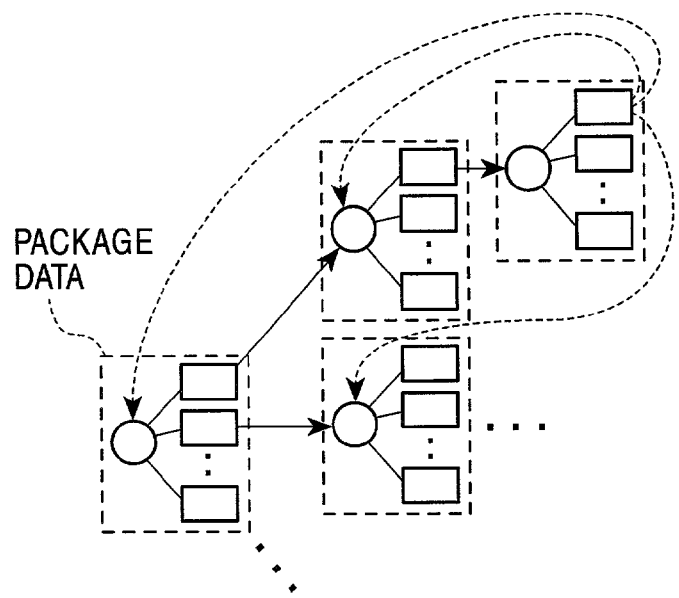

Specifically, when in the package data, the icon data is indicated by a circle, and the text data are represented by rectangles, package data as a basic unit is represented as shown in FIG. 5. By using package data, each of text data in the package data can be linked to other package data, as shown in FIGS. 6A and 6B. By performing repeated linking as to package data, a link structure in which infinite package data are linked to one another is theoretically realized.

The link structure of package data can be formed not only as a tree structure as shown in FIG. 6A, but also as a structure having loops as represented by the dot-line arrows shown in FIG. 6B.

Also, the structure of package data formed by a set of the icon data and text data can be regarded as a structure in which the text data subsidiarily accompany the icon data as the main part of the package data. Accordingly, data (e.g., the icon data in FIG. 5) that becomes the main part of package data is hereinafter referred to also as "main data", and subsidiary data (e.g., the text data #1 to #M in FIG. 5) that are paired with the main data to form the package data are hereinafter referred to also as "subdata".

Figure 7:
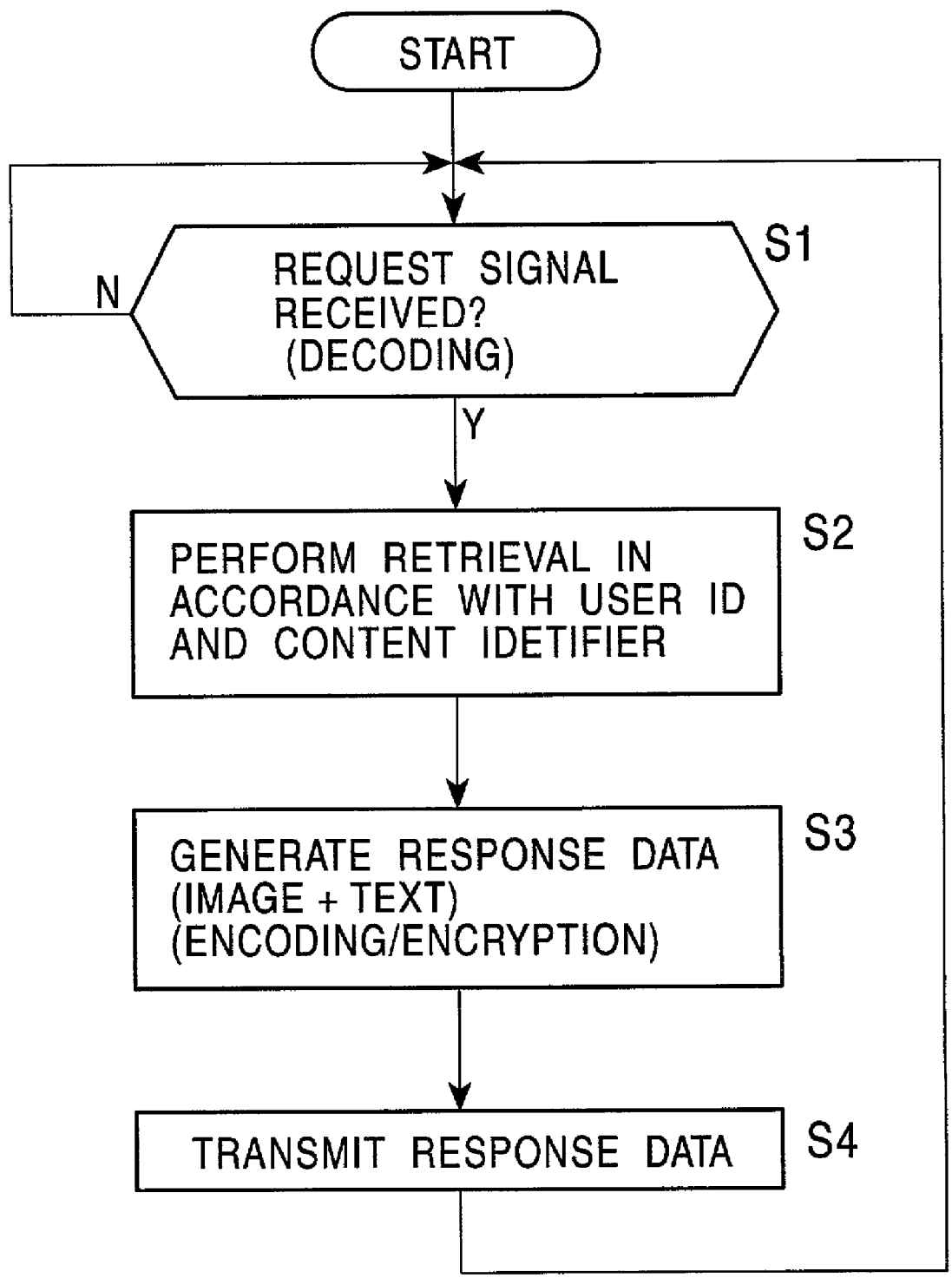
FIG. 7 is a flowchart illustrating a process performed by the package server 1 shown in FIG. 1.

Next, with reference to the flowchart shown in FIG. 7, the process of the package server 1 in FIG. 3 is described below.

In this embodiment, in order that the user terminal 3 may be provided with package data, the user terminal 3 must be registered beforehand in, for example, the package server 1, and a user identification (ID) for identifying a user must be issued to the registered user terminal 3.

However, the package data can be provided without performing the above registration.

A request signal for requesting predetermined package data is transmitted from the user terminal 3 to the package server 1 via the network 2. In step S1, the communication I/F 37 (FIG. 3) of the package server 1 determines whether it has received the request signal from the user terminal 3. The request signal includes, for example, the content identifier (FIG. 4A) of package data requested by the request signal, and the user ID of the user terminal 3.

In step S1, if the communication I/F 37 has determined that it has not received the request signal from the user terminal 3, the communication I/F 37 repeatedly performs the determination until receiving the request signal.

In step S1, if the communication I/F 37 has determined that it has received the request signal from the user terminal 3, the communication I/F 37 supplies the request signal to the decoding unit 35. The decoding unit 35 processes the request signal by performing decryption, protocol conversion, etc., and supplies the processed request signal to the response-data generating unit 36. In step S2, the response-data generating unit 36 controls the retriever unit 32 to retrieve package data corresponding to the content identifier included in the request signal from the decoding unit 35.

The response-data generating unit 36 recognizes whether the user ID included in the request signal corresponds to one of registered user IDs. When the user ID included in the request signal does not correspond, the response-data generating unit 36 can be controlled, for example, not to perform the subsequent steps.

Under control of the response-data generating unit 36, the retriever unit 32 retrieves the content identifier included in the request signal from the look-up table (FIG. 4A) in the database 31. The retriever unit 32 reads, from the database 31, package data at an entry represented by a pointer correlated with the content identifier. The read package data is supplied to the response-data generating unit 36.

In step S3, the response-data generating unit 36 generates response data by adding, to the package data from the retriever unit 32, the user ID included in the request signal from the user terminal 3, a server ID for identifying the package server 1, etc. The generated response data is supplied to the encoding/encryption unit 34 via the retriever unit 32.

The encoding/encryption unit 34 processes the supplied response data by performing protocol conversion, necessary encryption, etc., and supplies the processed response data to the communication I/F 37. In step S4, the communication I/F 37 transmits the supplied response data via the network 2 to the user terminal 3 that transmitted the request signal. After that, the communication I/F 37 goes back to step S1, and the same steps are repeatedly performed.

Figure 8:
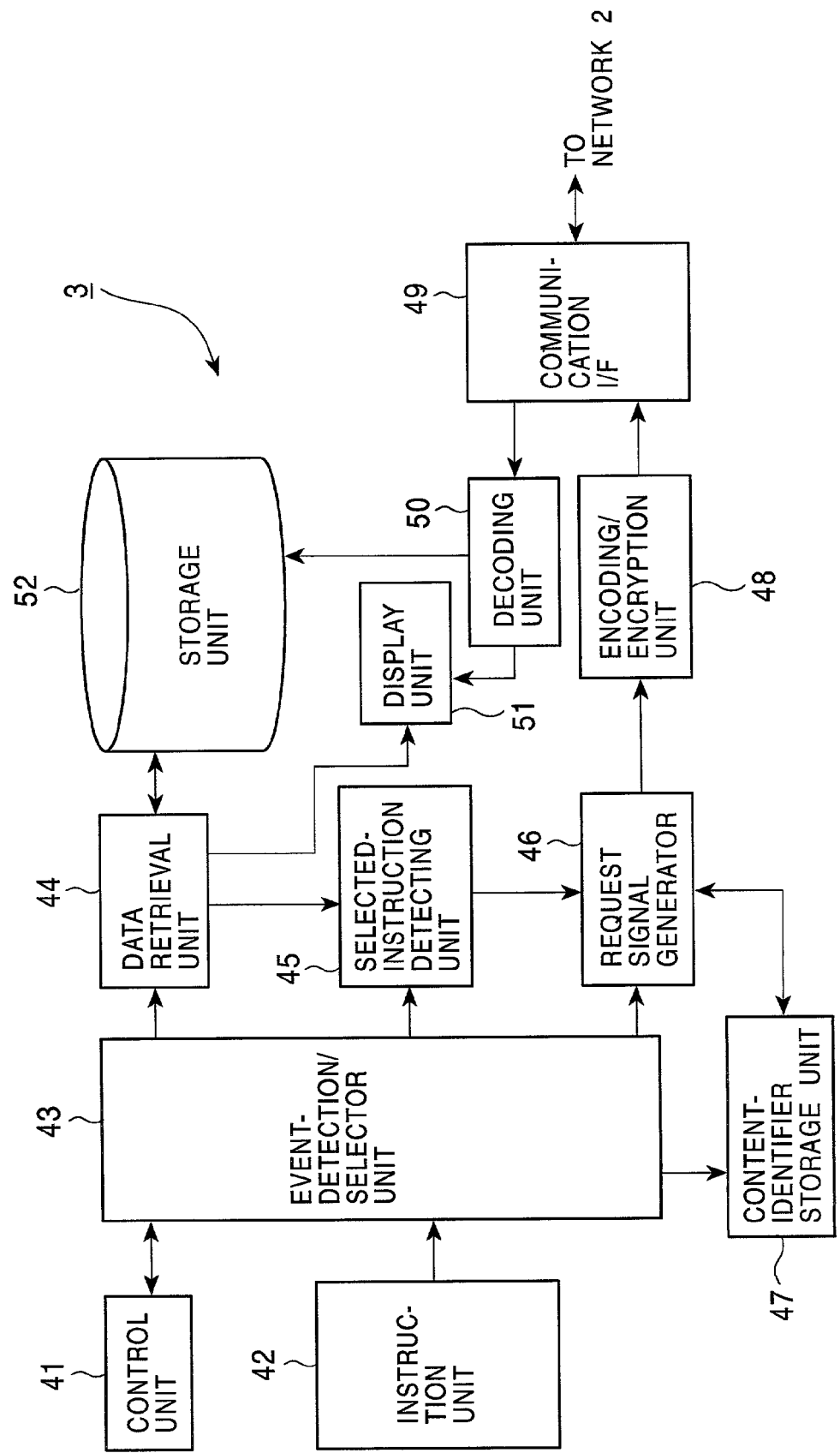
FIG. 8 is a block diagram showing a first functional construction of the user terminal 3.

FIG. 8 shows a functional block diagram of the user terminal 3 shown in FIG. 1.

When an event-detection/selector unit 43 detects, for example, an event or the like which represents termination of a process, a control unit 41 performs control for terminating the process. Although the control unit 41 controls each functional block constituting the user terminal 3, representations such as arrows, which represent control, are omitted for avoiding complication in the drawing.

A pointing device such as a mouse is used as an instruction unit 42. The instruction unit 42 is operated for moving a cursor. In addition, for example, a keyboard or the like, or a microphone and a speech recognition device can be used as the instruction unit 42.

The event-detection/selector unit 43 detects an event generated by operating the instruction unit 42, and supplies an event signal corresponding to the event to the control unit 41, a data retrieval unit 44, a selected-instruction detection unit 45, a request signal generator 46, a content-identifier storage unit 47, etc.

The types of event includes, for example, clicking, double clicking, and dragging which are performed using a mouse as the instruction unit 42. In this embodiment, the mouse as the instruction unit 42 has, for example, two buttons, a right button and a left button. The event-detection/selector unit 43 detects, as different events, clicking (left clicking) performed by operating the left button, and clicking (right clicking) performed by operating the right button.

Based on the event signal supplied from the event-detection/selector unit 43, the data retrieval unit 44 retrieves subdata constituting package data stored in a storage unit 52, and supplies the retrieved subdata to the selected-instruction detection unit 45 and a display unit 51.

By referring to subdata from the data retrieval unit 44, the selected-instruction detection unit 45 detects, based on the event signal supplied from the event-detection/selector unit 43, text data that is selected from among text data (as subdata) displayed on the display unit 51 by the user operating the instruction unit 42. The selected-instruction detection unit 45 supplies the request signal generator 46 with link data corresponding to the detected text data.

The request signal generator 46 generates a request signal including a content identifier as the link data supplied from the selected-instruction detection unit 45, and supplies the generated request signal to an encoding/encryption unit 48. Also, based on the event signal from the event-detection/selector unit 43, the request signal generator 46 generates a request signal including a content identifier stored in the content-identifier storage unit 47, and supplies the generated request signal to the encoding/encryption unit 48.

Based on the event signal from the event-detection/selector unit 43, the content-identifier storage unit 47 recognizes and stores a file name and a URL as a content identifier for identifying a Web page content on which the cursor is positioned when dragging with the mouse as the instruction unit 42 is started. The content-identifier storage unit 47 always stores the last content identifier (the content identifier of a content on which dragging is performed the last time).

The encoding/encryption unit 48 processes the request signal supplied from the request signal generator 46 by performing processes identical to those performed by the encoding/encryption unit 34 (FIG. 3) in the package server 1. The processed signal is supplied to the communication I/F 49.

The communication I/F 49 transmits the supplied request signal to the package server 1 via the network 2, and receives and supplies, to a decoding unit 50, the response data transmitted from the package server 1 via the network 2.

The decoding unit 50 processes the response data from the communication I/F 49 by performing processes identical to those performed in the decoding unit 35 (FIG. 3) in the package server 1.

The display unit 8 displays the subdata supplied from the data retrieval unit 44, the main data of the package data as the response data supplied from the decoding unit 50, etc.

The storage unit 52 stores the package data as the response data supplied from the decoding unit 50.

Figure 18:
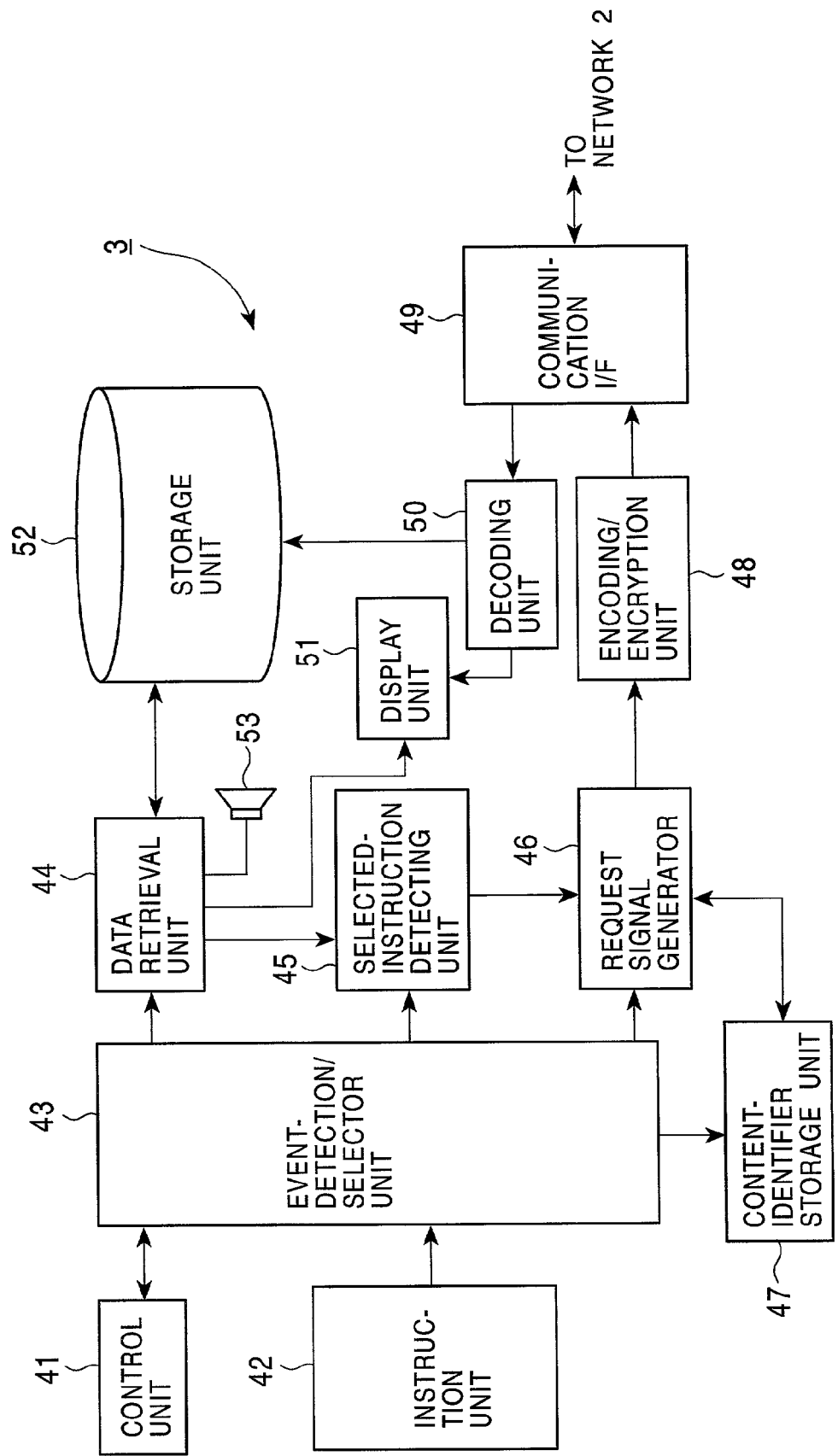
FIG. 18 is a block diagram showing a second functional construction of the user terminal 3.
Figure 19:
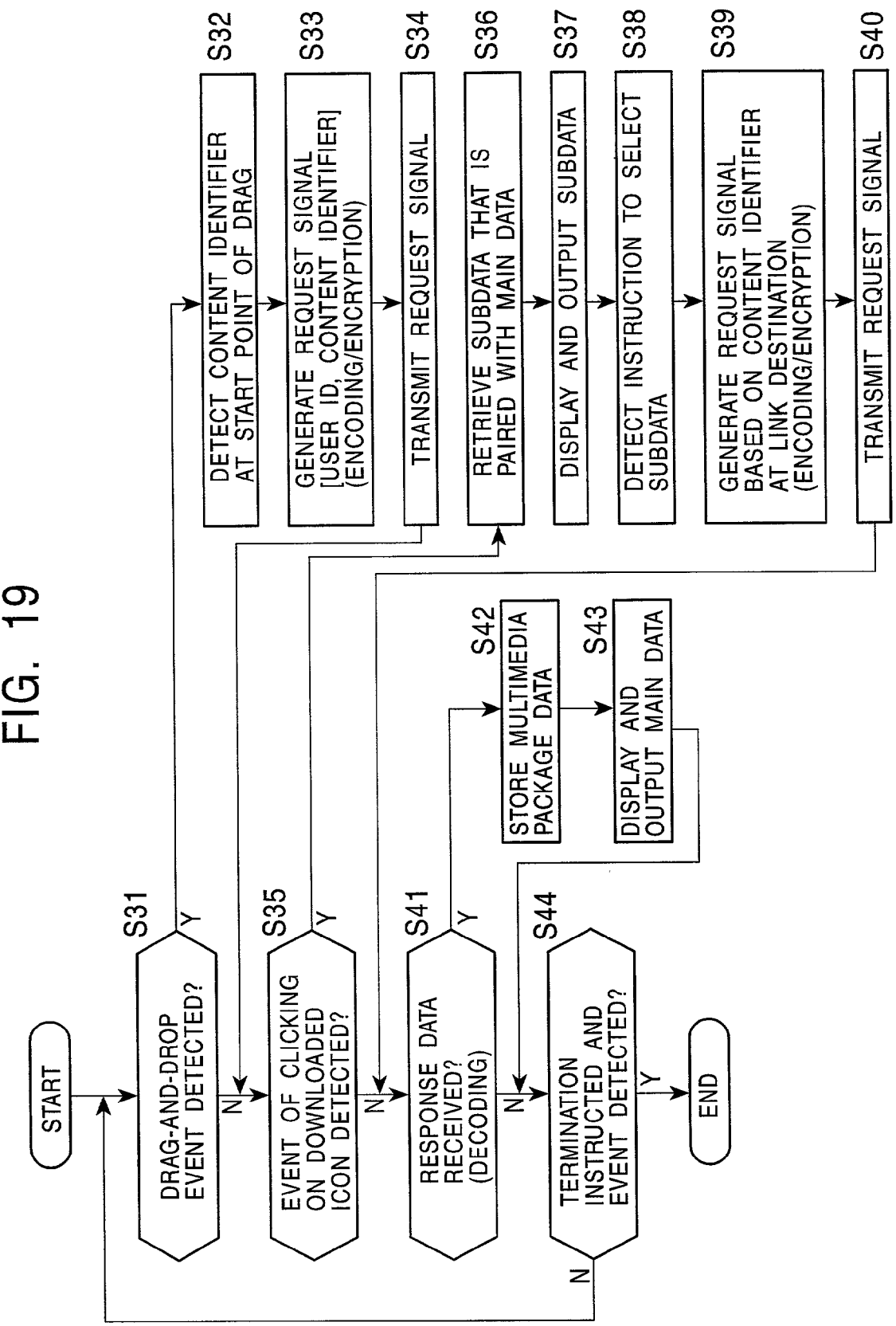
FIG. 19 is a flowchart illustrating a process performed by the user terminal 3.
Figure 67:
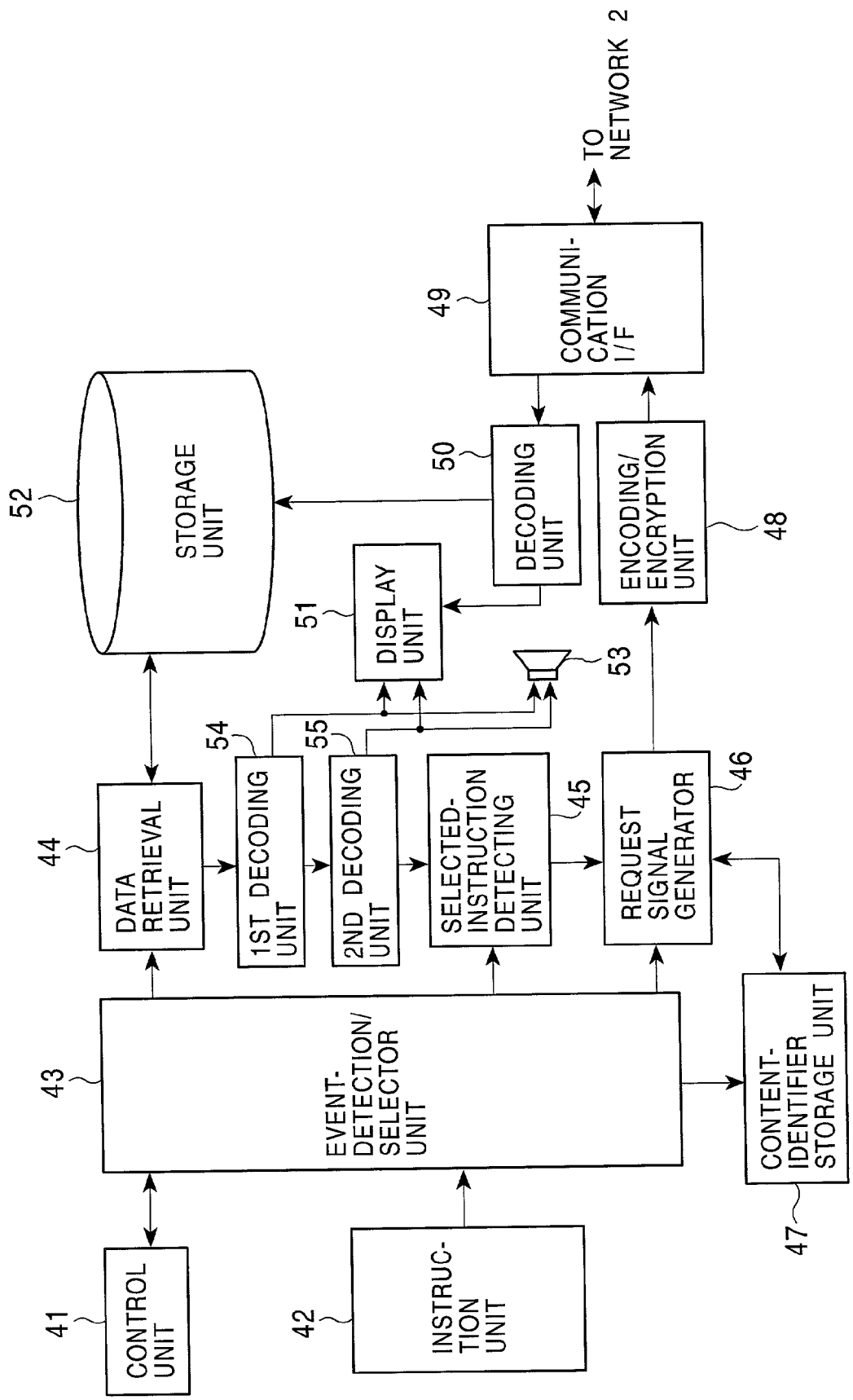
FIG. 67 is a block diagram showing a third construction of the user terminal 3.

Although the user terminal 3 also includes a functional block for functioning as a WWW browser, the block is not shown in FIG. 8 for avoiding complication of illustration (this applies to FIGS. 18 and 67).

Next, with reference to the flowchart shown in FIG. 9, and FIG. 10 to FIGS. 14A and 14B, the process of the user terminal 3 is described below.

Figure 10:
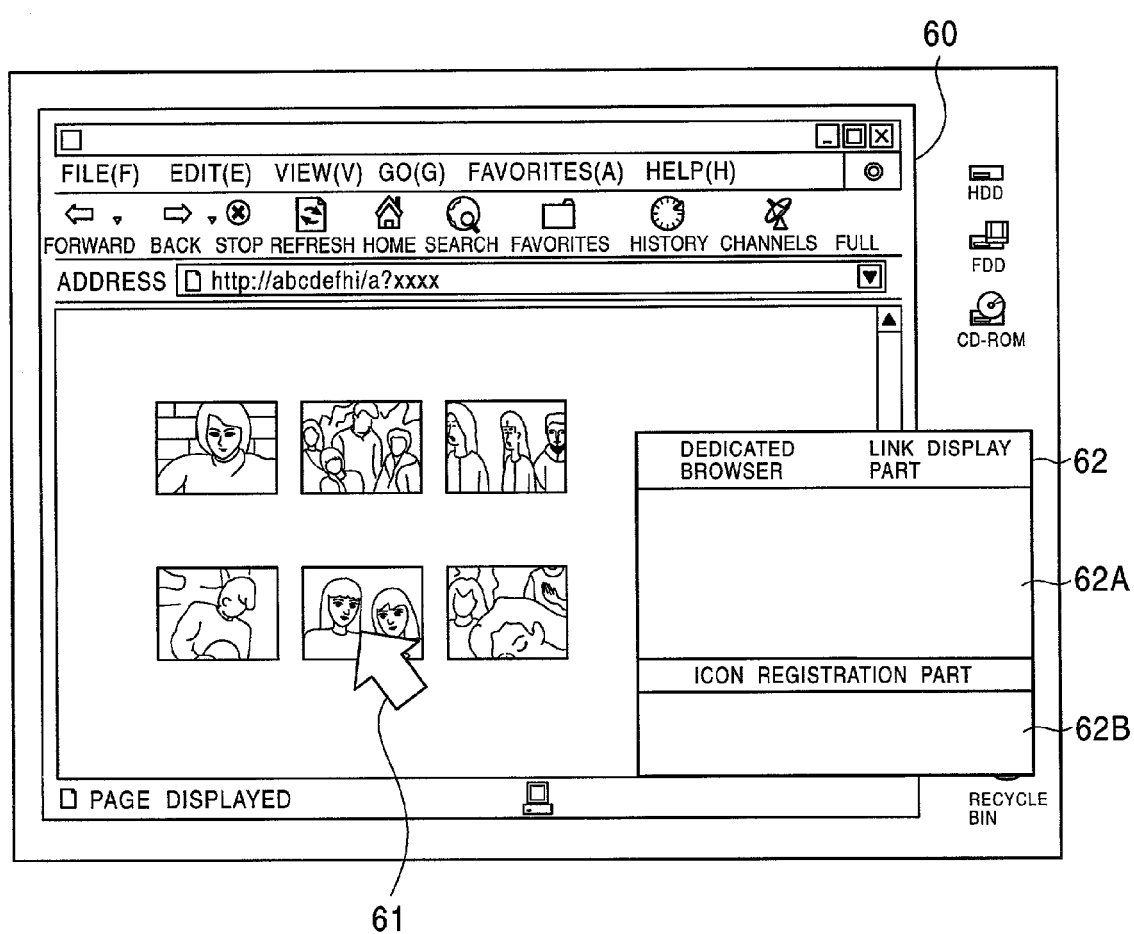
FIG. 10 is an illustration of a screen displayed by the user terminal 3.

When the user terminal 3 is operated so that an application program (dedicated browser 62) for accepting provision of package data from the package server 1 is started, as shown in FIG. 10, the display unit 51 displays a window of the dedicated browser 62 for accepting provision of package data, and may also display a window of a WWW browser 60.

The WWW browser 60 uses the network 2 to request, from the WWW server 4, a Web page corresponding to a URL designated by the user or a preset URL. As a result, a Web page transmitted from the WWW server 4 is displayed.

The dedicated browser 62 consists of a link display part 62A and an icon registration part 62B. In this embodiment, the lower part of the dedicated browser 62 is used as the icon registration part 62B, and the upper part of the dedicated browser 62 is used as the link display part 62A.

The display unit 51 displays not only (the windows of) the WWW browser 60 and the dedicated browser 62, but also a cursor 61 operable by the instruction unit 42. In step S11, the process determines whether an event has occurred in which, by operating the mouse as the instruction unit 42, one of contents displayed on the WWW browser 60 is dragged and dropped on the icon registration part 62B of the dedicated browser 62. In other words, the process determines whether dragging and dropping has been performed.

In step S11, if the process has determined that the dragging and dropping has been performed, the process proceeds to step S12. In step S12, the event-detection/selector unit 43 supplies the request signal generator 46 with an event signal representing the determination. The request signal generator 46 refers to the content-identifier storage unit 47 based on the event signal from the event-detection/selector unit 43, thereby detecting the content identifier of a content on which the cursor 61 is positioned when dragging starts.

After that, the process proceeds to step S13. In step S13, the request signal generator 46 generates a request signal which includes the content identifier detected in step S12 and a user ID assigned to (the user of) the user terminal 3 and which requests package data corresponding to the included content identifier, and supplies the generated request signal to the communication I/F 49 via the encoding/encryption unit 48. In step S14, the communication I/F 49 transmits, to the package server 1, the request signal supplied via the encoding/encryption unit 48.

Subsequently, the process proceeds to step S15. In step S15, the event-detection/selector unit 43 determines, as described later, whether an event has occurred in which after the cursor 61 is moved on an icon displayed in the link display part 62A or the icon registration part 62B of the dedicated browser 62, the mouse as the instruction unit 42 has been operated by performing right clicking. If the event-detection/selector unit 43 has determined that right clicking has not been performed, the process proceeds to step S21.

In step S21, the process determines whether the communication I/F 49 has received response data as package data that the package server 1 transmits in response to the request signal transmitted in step S14 or step S20 (described later).

In step S21, if the process has determined that the communication I/F 49 has received the response data, the communication I/F 49 supplies the package data as the response data to the display unit 51 and the storage unit 52 via the decoding unit 50. After that, the process proceeds to step S22.

In step S22, the storage unit 52 stores the package data supplied via the decoding unit 50, and the process proceeds to step S23. In step S23, the display unit 51 displays, in the link display part 62A or the icon registration part 62B of the dedicated browser 62, an icon corresponding to icon data constituting the package data supplied via the decoding unit 50. The process proceeds to step S24.

Figure 11:
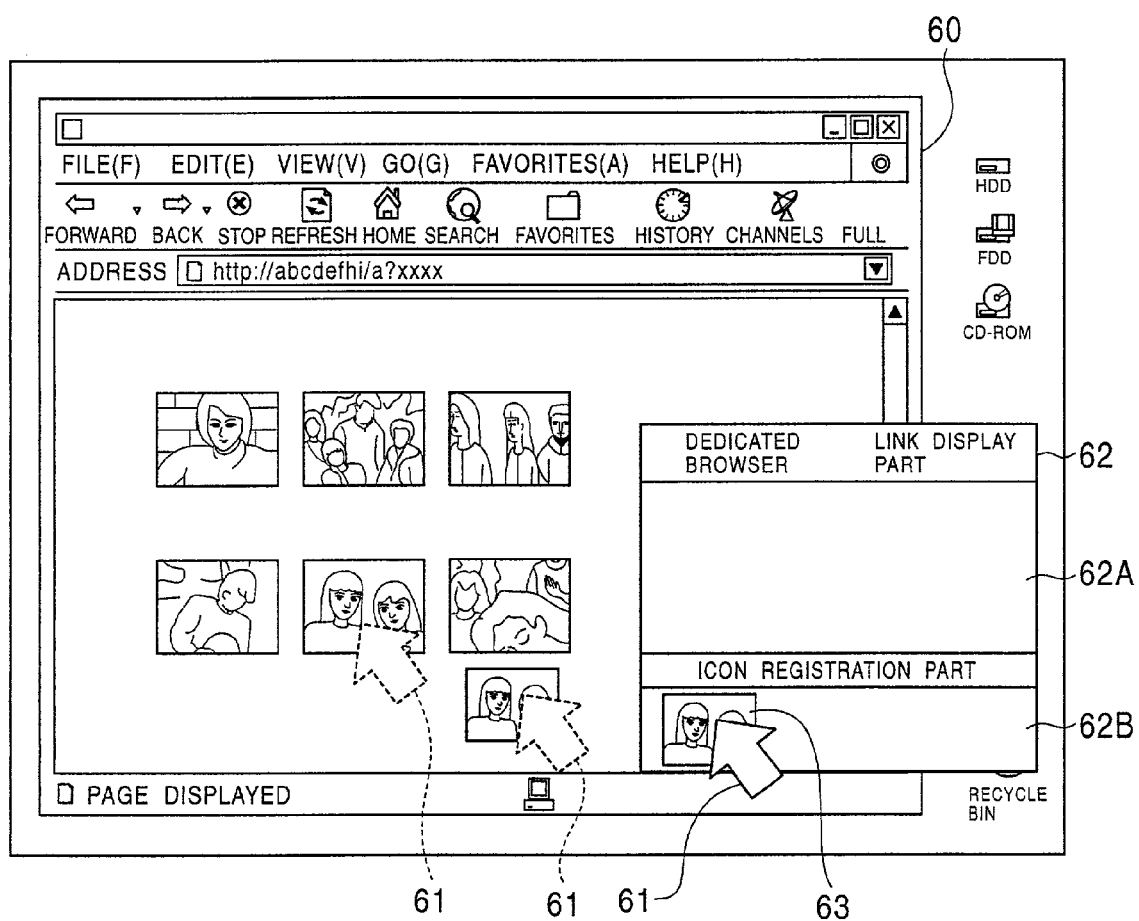
FIG. 11 is an illustration of a screen displayed by the user terminal 3.

The package server 1 (specifically, the database 31) stores package data having icon data corresponding to icons (e.g., if a content is GIF-format image data, an icon therefor is formed by reducing an image represented by the image data) representing contents forming Web pages so that the package data are correlated with content identifiers identical to those of the contents. Accordingly, as shown in FIG. 11, when an image content of a Web page displayed in the WWW browser 60 is dragged and dropped to the icon registration part 62B, steps S11 to S15, and steps S21 to S23 are performed in this order. As a result, in the icon registration part 62B, an icon 63 representing the image content is displayed.

In step S24, the event-detection/selector unit 43 determines whether or not the mouse as the instruction unit 42 has been operated to close the dedicated browser 62. If the event-detection/selector unit 43 has determined that the operation has not been performed, event-detection/selector unit 43 goes back to step S11, and the same steps are subsequently performed.

In step S15, the event-detection/selector unit 43 has determined that an event has occurred in which when the cursor 61 is moved onto an icon displayed in the link display unit 62A or the icon registration part 62B, the right clicking using the mouse as the input unit 42 is performed, the event-detection/selector unit 43 proceeds to step S16. In step S16, by supplying the data retrieval unit 44 with an event signal representing the right clicking, the event-detection/selector unit 43 controls the data retrieval unit 44 to retrieve, from the storage unit 52, text data that is paired with icon data corresponding to the icon at which the cursor was positioned when the right clicking was performed.

Having retrieved the text data from the storage unit 52, in step S17, the data retrieval unit 44 creates and displays, on the display unit 51, a pop-up menu (including a pull-down menu and a pull-up menu) including the text data as an item. The pop-up menu is hereinafter described using a pull-down menu as an example.

By way of example, when the icon 63 in the icon registration part 62B in FIG. 11 is a photograph of an artist's face, icon data corresponding to the icon 63 is paired with text data representing the names of pieces of music which are sung by the artist so that package data is formed. Accordingly, by performing right clicking on the icon 63 in this case, a pull-down menu 64 containing the music names as text data is displayed as shown in FIG. 12A.

After the display unit 51 displays the pull-down menu 64, the process proceeds from step S17 to step S18. When one of the items is selected by the user using the instruction unit 42, in step S18, the event-detection/selector unit 43 detects the selection, and supplies the data retrieval unit 44 and the selected-instruction detection unit 45 with an event signal corresponding to the detection. When receiving this event signal, the data retrieval unit 44 retrieves, from the storage unit 52, link data corresponding to the text data of the item of the pull-down menu which was selected by the user operating the instruction unit 42. The retrieved link data is supplied to the selected-instruction detection unit 45. The selected-instruction detection unit 45 supplies the request signal generator 46 with a content identifier as the link data from the data retrieval unit 44, whereby in step S19, the request signal generator 46 generates a request signal including the content identifier supplied from the selected-instruction detection unit 45.

The request signal generator 46 supplies the request signal generated in step S19 to the communication I/F 49 via the encoding/encryption unit 48. In step S20, the communication I/F 49 uses the network 2 to transmit, to the package server 1, the request signal supplied from the encoding/encryption unit 48. After that, the process proceeds to step S21, and the same steps are subsequently performed. In step S24, if the event-detection/selector unit 43 has determined that the mouse as the instruction unit 42 has been operated to close the dedicated browser 62, the control unit 41 closes the WWW browser 60 and the dedicated browser 62, and the process is terminated.

Figure 12A:
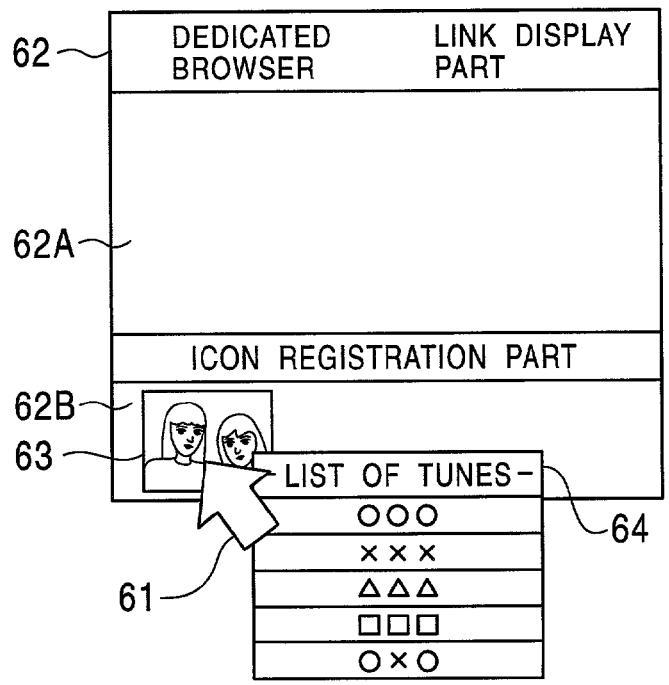
FIGS. 12A and 12B are illustrations of screens displayed by the user terminal 3.

Accordingly, while the pull-down menu of the music names is being displayed as shown in FIG. 12A, when the cursor 61 is moved to one of the music names, "ΔΔΔ", and the user selects the music name by, for example, left-clicking on it, a content identifier as link data corresponding to text data representing the music name "ΔΔΔ" is transmitted to the package server 1.

In addition, assuming that in package data correlated with a content identifier as link data corresponding to text data representing the music name, icon data that represents a reduced image of the jacket of an album containing the music is included, the package data is transmitted as response data from the package server 1 to the user terminal 3.

As described above, the package data is stored in the storage unit 52 in step S22, and an icon corresponding to the icon data of the package data is displayed on the display unit 51.

Figure 13A:
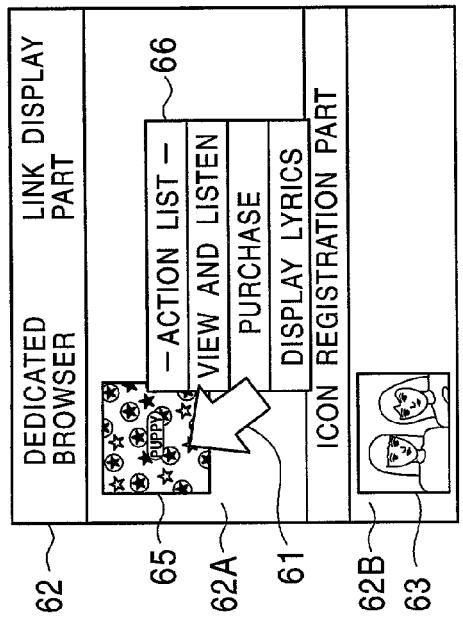
FIGS. 13A, 13B, 13C, and 13D are illustrations of screens displayed by the user terminal 3.

As shown in FIG. 13A, the dedicated browser 62 displays an icon 65 in a form in which an image of the jacket of the album containing the piece of music selected by the user is reduced.

In this embodiment, when a content on the WWW browser 60 is dragged and dropped onto the icon registration part 62B, an icon corresponding to the content is displayed in the icon registration part 62B. Also, an icon corresponding to icon data of package data, to which text data (subdata) of the package data is linked, is displayed in the link display part 62A. Accordingly, as shown in FIG. 13A, the link display part 62A of the dedicated browser 62 displays the jacket-image icon 65 corresponding to icon data of the package data having a link from the text data as the music name selected from among the pull-down menu 64 (FIG. 12B) displayed by right-clicking on the icon 63 in the icon registration part 62B.

An icon displayed in the icon registration part 62B is registered in the icon registration part 62B, and if the dedicated browser 62 is closed, package data including icon data corresponding to the icon remains stored in the storage unit 52. Conversely, package data having an icon displayed in the link display part 62A is erased in the storage unit 52, for example, when the dedicated browser 62 is closed. Accordingly, after that, when the dedicated browser 62 is opened again, the icon registered in the icon registration part 62B is displayed, but the icon displayed in the link display part 62A is not displayed.

Figure 13B:
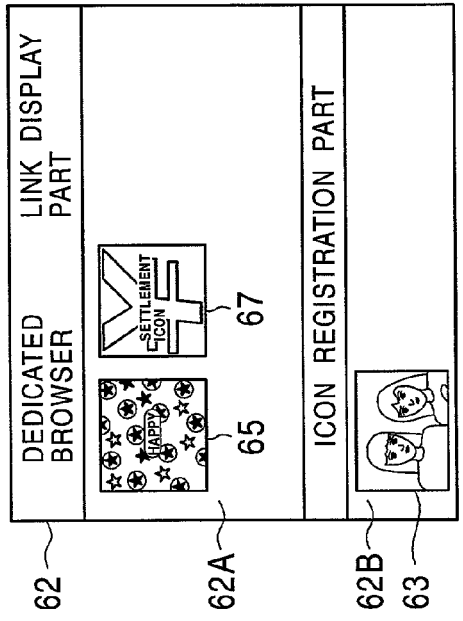

When the cursor 61 is moved onto the jacket-image icon 65 displayed in the link display part 62A, and the user left-clicks the mouse as the instruction unit 42, the link display part 62A displays a pull-down menu 66 containing items as text data which are paired with icon data corresponding to the icon 65, as shown in FIG. 13B.

Figure 13C:
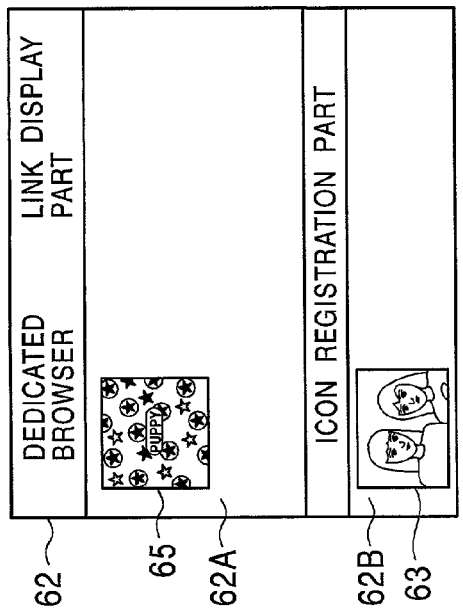
Figure 13D:
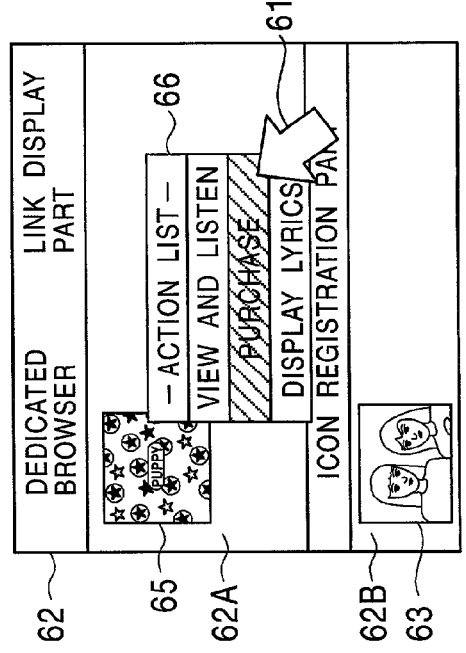

The pull-down menu 66 consists of items indicating viewing and listening to a content of the album represented by the icon 65, purchase of the content, and displaying lyrics, as shown in FIG. 13B. As shown in FIG. 13C, the user selects the purchase of data of the music in the album represented by the icon 65 by moving the cursor 61 onto the purchase item, and left-clicking the instruction unit 42. Then, identically to the above case, a request signal is transmitted from the user terminal 3. In response to the request signal, package data to which the text data of the purchase item is linked is transmitted from the package server 1 to the user terminal 3. In the link display part 62A, an icon 67 corresponding to the icon data of the package data is displayed, for example on the right of the icon 65 last displayed in the link display part 62A, as shown in FIG. 13D.

The text data of the purchase item of the pull-down menu shown in FIG. 13C is linked to package data including the icon data of the icon 67 representing a settlement in the case of purchasing the data of the music. In FIG. 13D, the above icon 67 is displayed in the link display part 62A.

Figure 14A:
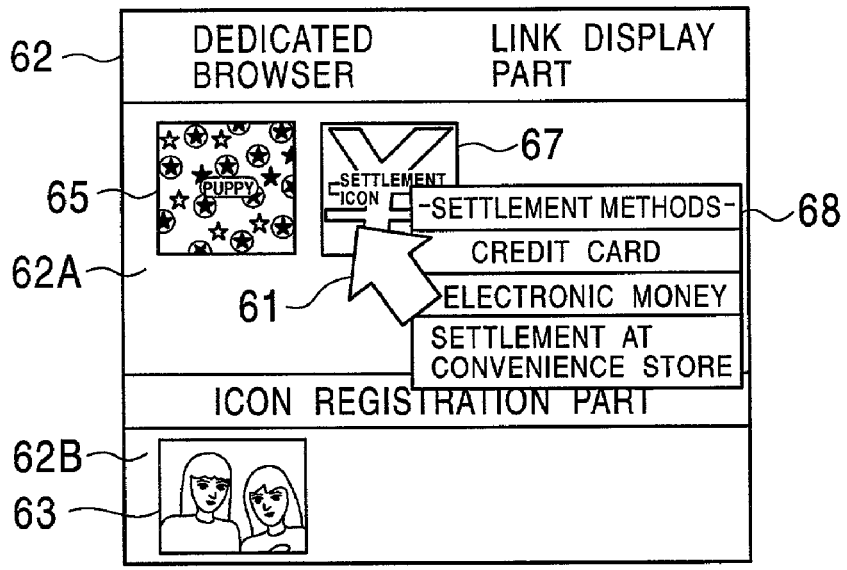
FIGS. 14A and 14B are illustration s of screens displayed by the user terminal 3.
Figure 14B:
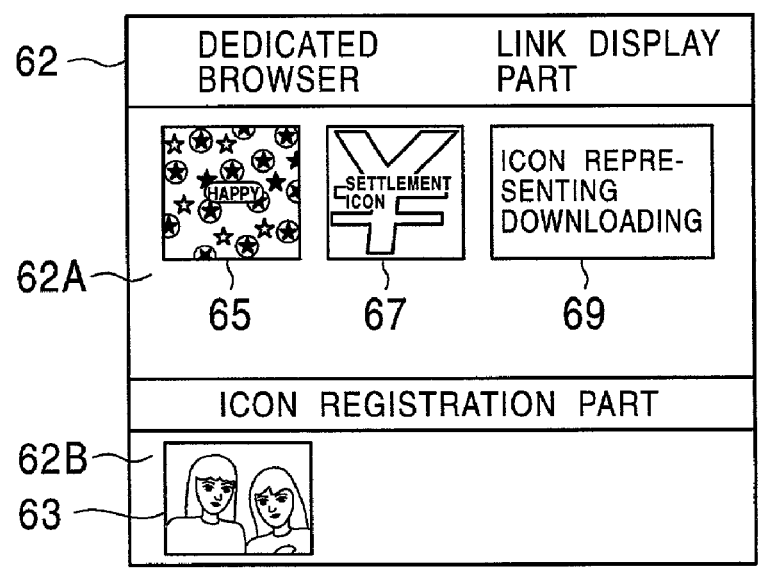

In addition, when the user moves the cursor 61 onto the settlement icon 67 displayed in the link display part 62A, and clicks the mouse as the instruction unit 42, the link display part 62A displays, identically to the above case, a pull-down menu 68 as shown in FIG. 14A, which consists of items corresponding to text data which are paired with icon data corresponding to the icon 67.

The pull-down menu 68 specifically consists of items representing a credit-card payment, an electronic money payment, and a payment at a convenience store (convenience-store payment) which are the methods of the settlement represented by the icon 67. When the user selects one of the methods by moving the cursor 61 onto the corresponding item and left-clicking the instruction unit 42, the dedicated browser 62 performs processing corresponding to the selected settlement method.

By way of example, when the credit-card payment is selected, the dedicated browser 62 of the user terminal 3 displays a dialog box for inputting a credit-card number, etc. When the credit-card number, etc., are input, the dedicated browser 62 transmits the input information as purchase information to the package server 1, with music-identification information representing the music whose data is selectively purchased by the user.

In the purchase information, the credit-card number is used for the charging processing unit 38 (FIG. 3) in the package server 1 to perform charging. Later, the price for the music data is paid.

The package server 1 acquires, from a database (not shown) and a server (not shown) on the network 2, the music data specified by the music-identification information in the purchase information from the user terminal 3. The acquired data is transmitted to the user terminal 3.

The user terminal 3 downloads the music data transmitted from the package server 1, as described above, and stores the downloaded data in, for example, a portable memory or the like.

As described above, the dedicated browser 62 displays each icon representing information, etc., and displays a pull-down menu corresponding to the icon. When an item of the pull-down menu is selected, an icon of package data to which text data corresponding to the item is linked is repeatedly displayed, whereby the user can reach the desired information by performing the same operation.

Just before transmitting the music data, the package server 1 can transmit, to the user terminal 3, icon data (not package data) of an icon 69 indicating that the data is being downloaded. In this case, the dedicated browser 62 of the user terminal 3 displays the icon 69, for example, on the right of the icon 67 last displayed in the link display part 62A. In the package server 1, by linking text data corresponding to the items of the pull-down menu 68 to package data including the icon data of the icon 69, when the user left-clicks any one of the item, the package data including the icon data of the icon 69 can be transmitted to the user terminal 3.

In the above case, in the link display part 62A, the new icon is displayed on the last displayed icon. However, the new icon can be displayed in the form of overwriting the already displayed icon.

The icon registration part 62B can be divided into a plurality of areas, and icons relating to identical category information can be registered in each area. In other words, in the icon registration part 62B, icons belonging to categories such as music, movie, and news can be displayed in a form in which the icons are registered in different areas corresponding to the categories.

In the above case, the (window of) dedicated browser 62 is divided into two areas, the link display part 62A and the icon registration part 62B. However, the dedicated browser 62 does not need to be divided as described, and can be formed by a single area.

In the above case, when the dedicated browser 62 is closed, in the storage unit 52, only package data including each icon displayed in the icon registration part 62B is stored, and package data including each icon displayed in the link display part 62A is erased. However, all package data can be stored in the storage unit 52. In this case, when the dedicated browser 62 is opened again, the dedicated browser 62 displays an icon registered in the icon registration part 62B and a sequence of icons of package data traced by the user using the displayed icon as a start point. Thus, not information for specifying a Web page such as a URL, but the so-called "bookmarks" of links traced by the user can be realized in the form of a visual medium of an icon. In the icon registration part 62B, an icon representing a content forming a Web page is registered. In this respect, bookmarks are realized no in units of Web pages but in units of contents.

In the above case, when the user moves the cursor 61 to an icon displayed in the dedicated browser 62, and right-clicks the mouse, a pull-down menu is displayed which consists of text data that are paired with icon data corresponding to the icon. However, the event for displaying the pull-down menu is not limited to right-clicking. For example, the pull-down menu can be displayed when the cursor 61 is positioned on an icon. Also, the event for activating another action such as selection of a pull-down-menu item is not limited to the described event.

In the above case, when music data is finally downloaded, the package server 1 performs charging so that the price for the music is paid. In addition, for provision of package data, charging can be performed, as required.

In the above case, the downloading of music data is performed. However, in addition to sound data (audio data) such as music data, image data (video data) such as movie data, programs, etc., can be downloaded. Although the downloading of music data is performed from the package server 1 in the above case, it can be performed from another server on the network 2.

By using package data downloaded from the package server 1, the user terminal 3 can update package data stored in the storage unit 52. For example, when in the package server 1 (FIG. 3), the icon data or text data of package data stored in the database 31 is updated, by using the package data obtained after updating, package data stored in the storage unit 52 of the user terminal 3 can be updated.

So-called "push technology" can be used as a method for updating the package data in the storage unit 52. Specifically, the request signal generator 46 periodically or nonperiodically generates and transmits, to the package server 1, a request signal including a content identifier corresponding to package data stored in the storage unit 52, whereby the package data stored in the storage unit 52 can be updated by using package data transmitted in response to the request signal from the package server 1.

In addition, a unique terminal ID is assigned to the user terminal 3, and the package server 1 stores the content identifier of package data downloaded by the user terminal 3 so that the content identifier is correlated with the terminal ID of the user terminal 3, while the user terminal 3 transmits, to the package server 1, an Internet protocol (IP) address that is assigned when the user terminal 3 connects to the network 2 so that the IP address is correlated with the terminal ID, whereby the package data stored i the storage unit 52 can be updated.

In this case, when receiving an IP address and a terminal ID from the user terminal 3, the package server 1 detects updated package data from among package data of content identifiers correlated with the terminal ID, and transmits the updated package data to a destination represented by the IP address transmitted with the terminal ID, whereby the user terminal 3 can receive updated package data among the package data stored in the storage unit 52.

As described above, when package data stored in the storage unit 52 of the user terminal 3 is updated, an icon displayed on the dedicated browser 62 and the items of a pull-down menu displayed corresponding to the icon change, as required, or every moment. This enables the user to have an interest in the icon and the items.

In the above case, the main data of package data is icon data, and subdata paired with the main data is text data. Accordingly, by viewing a pull-down menu composed of the text data, the user can recognizes information based on the text.

Figure 12B:
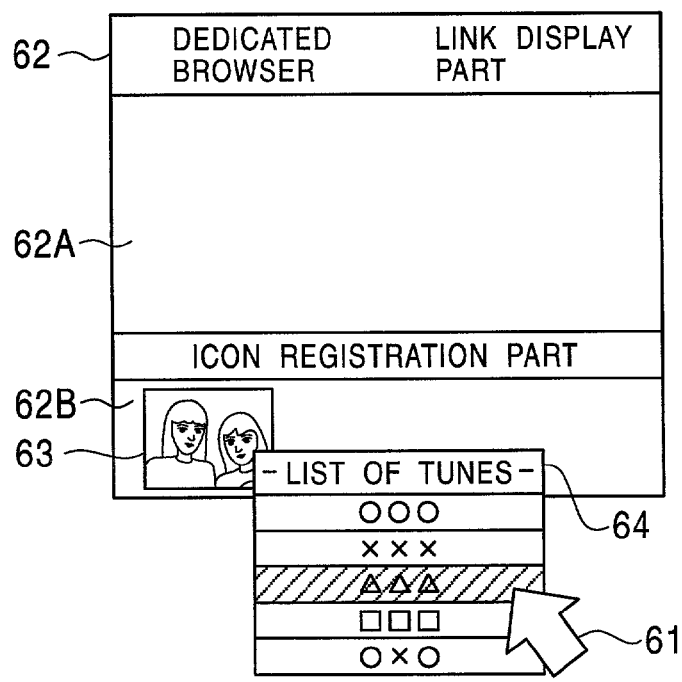

By way of example, as shown in FIGS. 12A and 12B, the pull-down menu 64, which is displayed by right-clicking on the icon 63 indicating an artist's face photograph, displays in text the names of pieces of music sung by the artist. This enables the user to know the music names in text. However, in addition to uses who wish to know music names in text, there are many types of users such as those who wish to actually listen to pieces of music, and those who wish to view an image of the jacket of an album containing pieces of music of the artist.

Accordingly, in the database 31 in the package server 1, among the data of media such as text, image data, and sound data, a type of data is used as main data, and package data in which at least two type of data are used as subdata is stored, whereby the package data can be provided from the package server 1 to the user terminal 3.

In this case, in each entry in the data storage part of the database 31 (FIG. 3), package data as shown in FIG. 15 is stored.

In this case, the package data is formed by sequentially arranging a header, main data that is one of image data, text data, and sound data, and subdata constituted by a pair of text data and link data for text, a pair of image data and link data for image, and a pair of sound data and link data for sound.

The header, the text data, and the link data for text are identical to the header, the text data, and the link data (shown in FIG. 4B) in the package data, respectively.

Here, among image data, text data, and sound data, one type of data can be used as the main data. When image data or text data is used as the main data, the main data in the image- or text-data form can be displayed. However, sound data is used as the main data, the main data in the sound-data form cannot be displayed. Instead, an icon representing the sound data is displayed. Accordingly, when sound data is used as main data, the main data includes not only the sound data, but also icon data corresponding to an icon representing the sound data. Also, it is possible that image data and text data as main data include icon data corresponding to icons representing the image data and the text data.

The image data and the link data for image as subdata, or the sound data and the link data for sound as subdata are similar to the text data and the link data shown in FIG. 4B, except that the medium is not text but image or sound. Accordingly, a description thereof is omitted.

Figure 16:
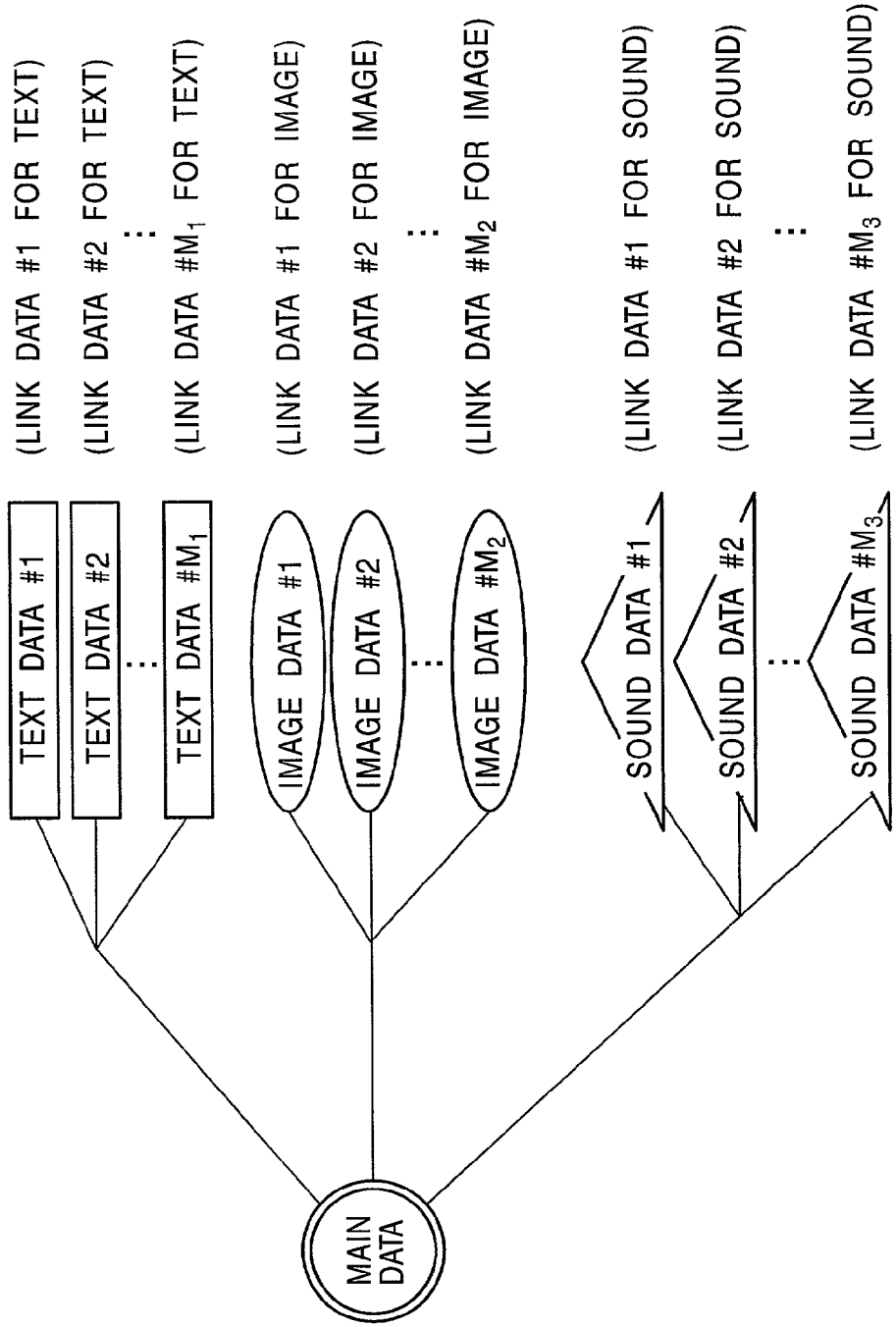
FIG. 16 is an illustration of multimedia package data.

In this case, the package data is constituted by a set of main data which is one of image data, sound data, and text data, and necessary numbers of text data #1 to #M1, image data #1 to #M2, and sound data #1 to #M3 which are correlated with link data representing links to package data, as shown in FIG. 16. Also in this case, in the package data, each of the text data, the image data, and the sound data, which is used as subdata, can be linked to other package data (or may be linked even to itself). Thus, by using package data as a basic unit, a link structure composed of plurality of package data can be formed.

Figure 17:
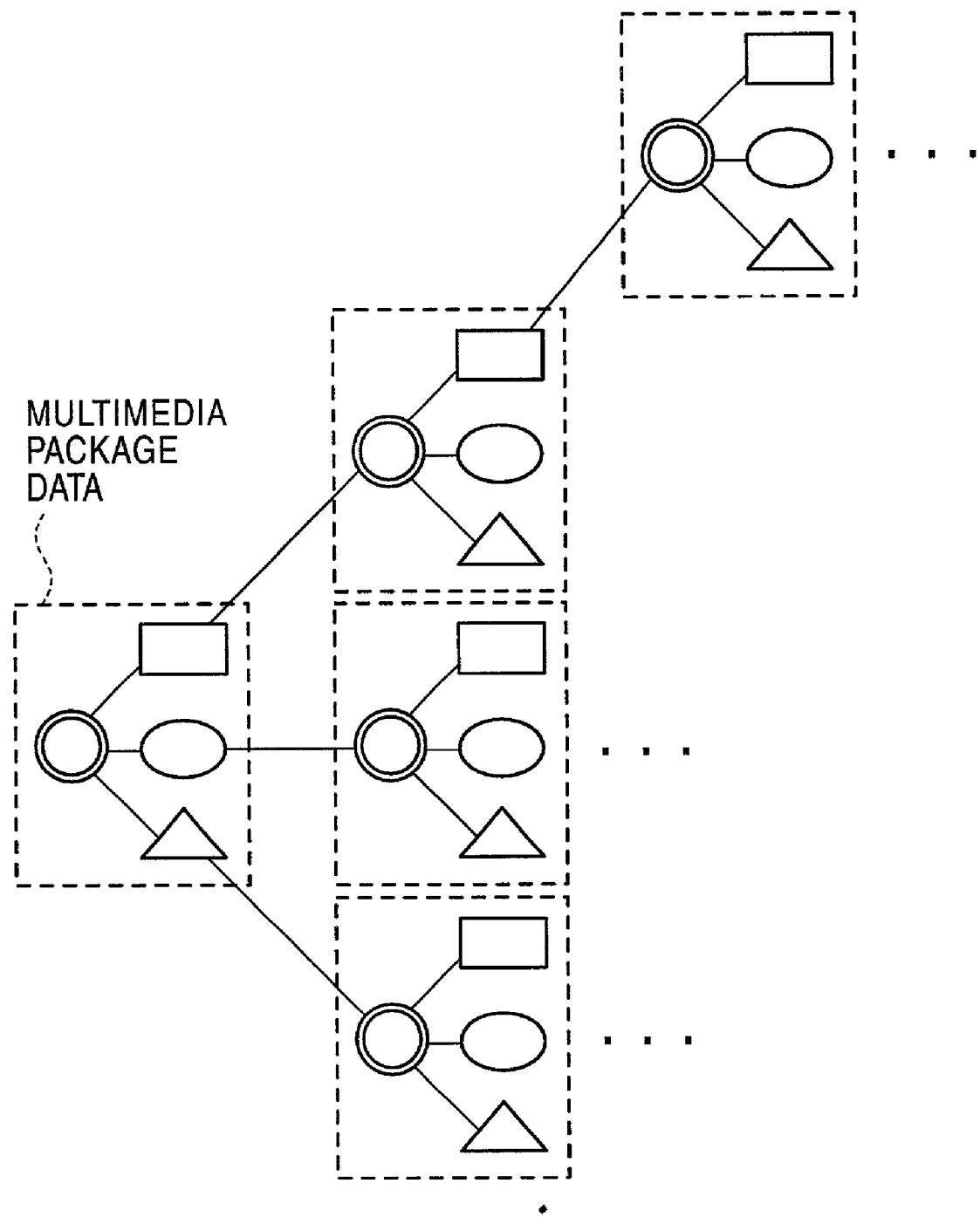
FIG. 17 is an illustration of a link structure.

Specifically, as shown in FIG. 16, when the main data of the package data is indicated by a double circle, the text data in the subdata are indicated by rectangles, the image data in the subdata are indicated by circles, and the sound data in the subdata are indicated by triangles, even in package data constituted by the data of the above multimedia, the data (in the subdata) of each medium, which forms the package data, can be linked to other package data, as shown in FIG. 17. By repeatedly performing such linking, a link structure in which infinite package data are mutually linked is theoretically realized.

For avoiding complication in the drawing, FIG. 17 shows package data each of which is constituted by a set of main data (double circle) and subdata composed of single text data (rectangle), single image data (circle), and single sound data (triangle).

Similarly to the cases shown in FIGS. 6A and 6B, even the above package data constituted by the data of multimedia can be formed in a tree structure or a structure in which loops are formed.

Next, FIG. 18 shows a construction of the user terminal 3 in a case in which the package server 1 provides multimedia package data. In FIG. 18, blocks identical to those in FIG. 8 are denoted by identical reference numerals.

Since the user terminal 3 in FIG. 18 is basically identical in structure to that in FIG. 3, except that a speaker 53 for outputting sound data forming multimedia package data is provided, a description thereof is omitted. Although a data retrieval unit 44 and the speaker 53 are directly connected to each other, the speaker 53 also has the functions of a reproduction unit. Accordingly, the speaker 53 has a function of reproducing an analog audio signal by converting audio data as digital data retrieved by the data retrieval unit 44 from digital form into analog form and amplifying the converted data.

Next, with reference to the flowchart shown in FIG. 19, and FIGS. 20 to 22, a process performed by the (dedicated browser 62 of) the user terminal 3 in FIG. 18 is described below.

Figure 9:
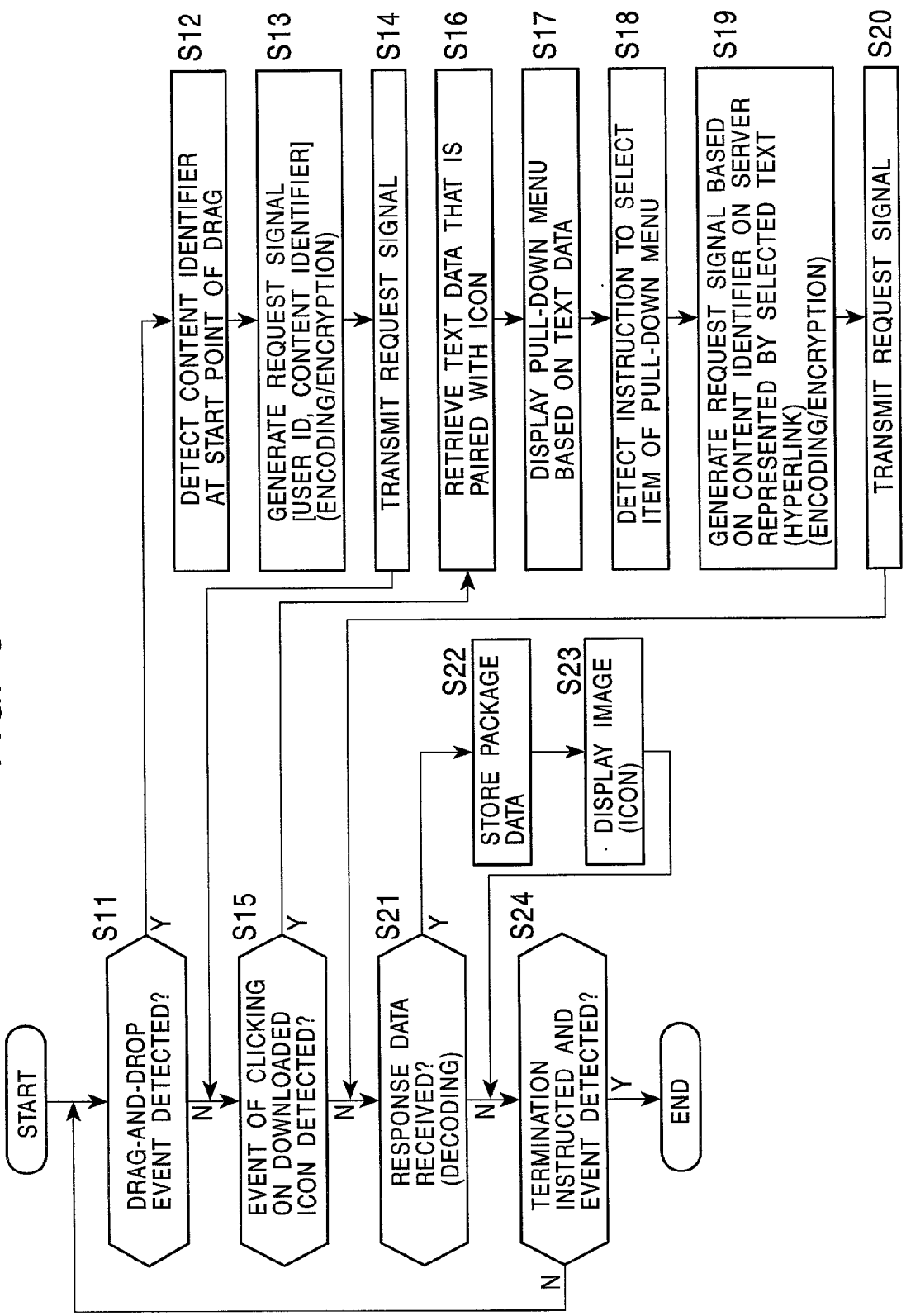
FIG. 9 is a flowchart illustrating a process performed by the user terminal 3.

Basically, in steps S31 to S43, the user terminal 3 performs processes identical to steps S11 to S23 shown in FIG. 9.

However, in step S41, if the process has determined that the user terminal 3 has received multimedia package data as response data from the package server 1, the process proceeds to step S42, and the multimedia package data is stored in a storage unit 52. The process further proceeds to step S43, and the dedicated browser 62, which is opened by a display unit 51, displays icons representing image data, sound-data, and text data which constitute the main data of the multimedia package data. Otherwise, the image data, the sound data, and the text data are displayed by the display unit 51 or are output from the speaker 53.

In step S35, the process has determined that an event of right-clicking is given to one of the icons representing the main data displayed on the dedicated browser 62, the process proceeds to step S36. In step S36, the data retrieval unit 44 retrieves, from the storage unit 52, subdata which is paired with the main data, and the process proceeds to step S37. In step S37, text data, image data, or sound data that forms the subdata retrieved by the data retrieval unit 44 is displayed on the display unit 51, or is output from the speaker 53, as required. At this time, the dedicated browser 62 displays other necessary things. For example, when text data as subdata forms the items of a pull-down menu, the pull-down menu is displayed. Also, for example, for sound data as subdata, buttons for operations such as controlling reproduction and selecting sound data are displayed.

In step S38, when one of the subdata is selected by the user operating the instruction unit 42, the event-detection/selector unit 43 detects the selected subdata, and supplies both the data retrieval unit 44 and the selected-instruction detection unit 45 with an event signal corresponding to the selection. When the data retrieval unit 44 receives the event signal, link data corresponding to the selected subdata is retrieved from the storage unit 52 and is supplied to the selected-instruction detection unit 45 by the data retrieval unit 44. The selected-instruction detection unit 45 supplies the request signal generator 46 with a content identifier as the link data from the data retrieval unit 44, whereby in step S36, the request signal generator 46 generates a request signal including the content identifier supplied from the selected-instruction detection unit 45.

In step S40, the request signal is transmitted to the package server 1. The package server 1 transmits, as response data, to the user terminal 3, multimedia package data specified by the content identifier included in the request signal. In step S40, if the process has determined that the communication I/F 49 of the user terminal 3 has received the multimedia package data as the response data, the received multimedia package data is stored in the storage unit 52 in step S42. In step S43, an icon representing the main data of the package data, such as image data, sound data, or text data, is displayed on the dedicated browser 62, or the image data, the sound data, or the text data is displayed in the display part 51 or is output as sound from the speaker 53.

Figure 20:
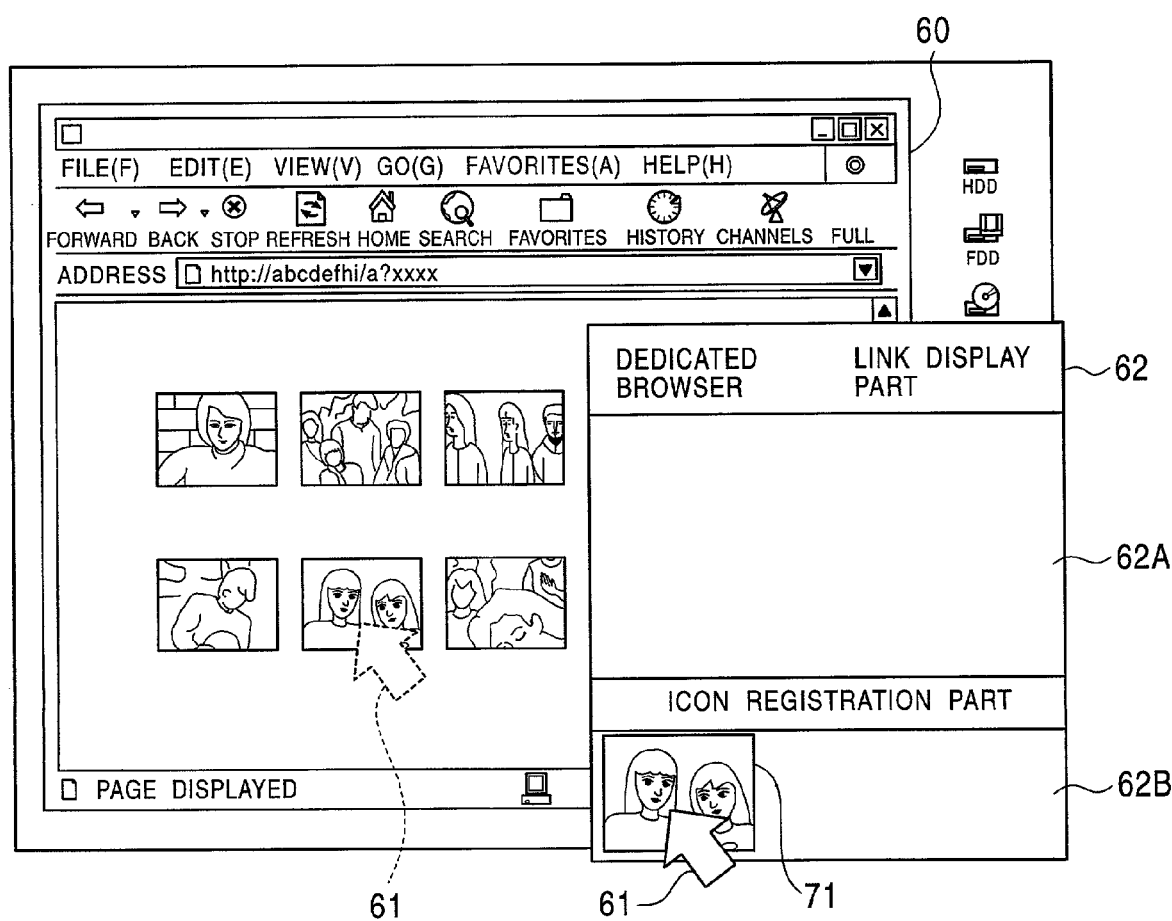
FIG. 20 is an illustration of an example of a screen displayed by the user terminal 3.

Accordingly, for example, when an image content displayed on the WWW browser 60 is dragged and dropped to the icon registration part 62B of the dedicated browser 62, as shown in FIG. 20, multimedia package data specified by the content identifier of the image content is downloaded from the package server 1, and the main data of the multimedia package data is displayed in the icon registration part 62B of the dedicated browser 62.

In FIG. 20, the main data of the multimedia package data specified by the content identifier of the dragged and dropped image content is image data, and an image 71 corresponding to the image data is displayed in the icon registration part 62B. When the main data is sound data or text data, sound corresponding to the sound data is output from the speaker 53, or text corresponding to the text data is displayed on the display unit 51 (FIG. 18). Also, an icon representing the sound data or the text data can be displayed in the icon registration part 62B.

Even when the main data is image data, an icon representing the image data can be displayed in the icon registration part 62B.

Figure 21:
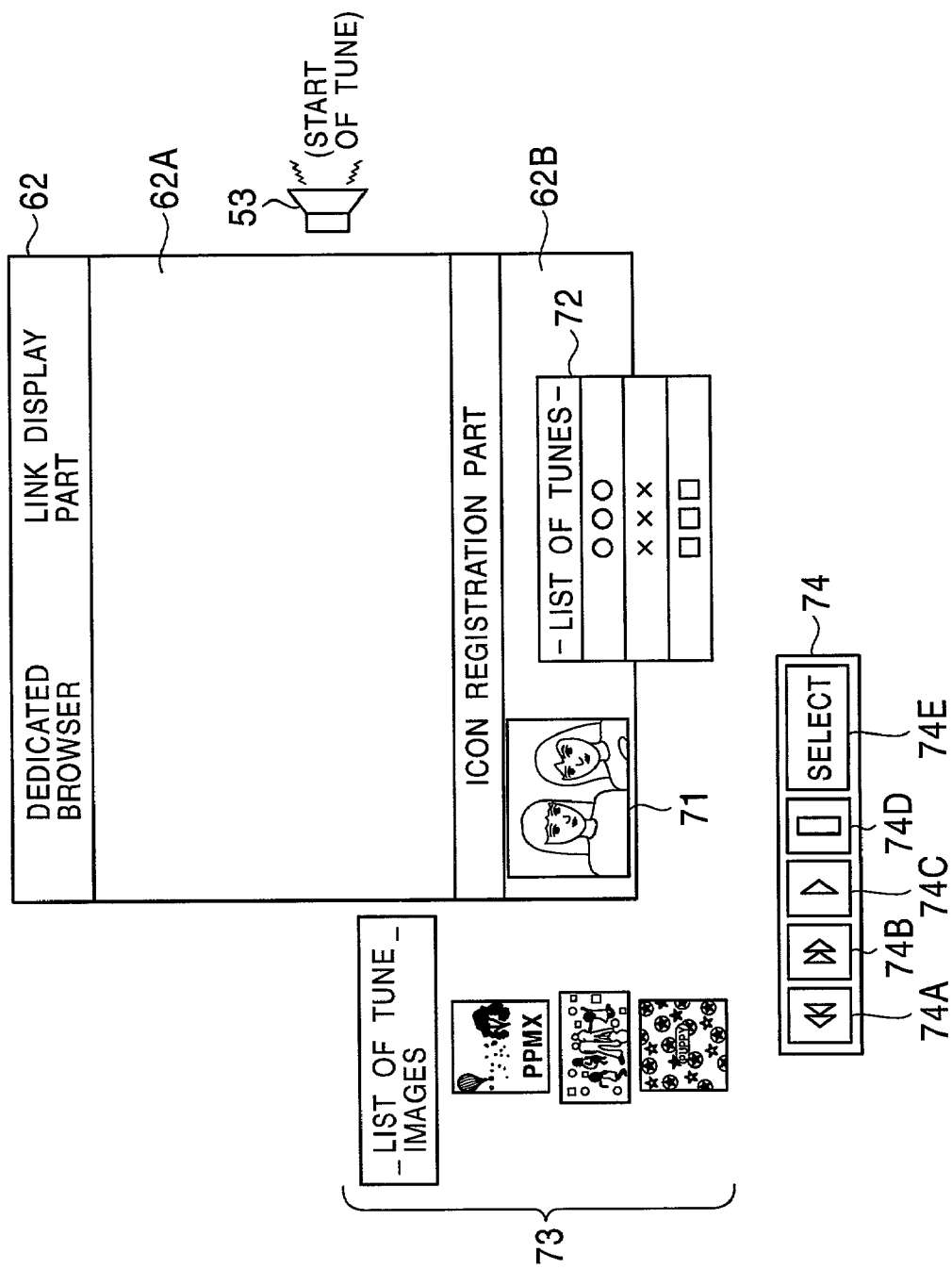
FIG. 21 is an illustration of an example of a screen displayed by the user terminal 3.

After the icon registration part 62B of the dedicated browser 62 displays the image 71, by moving the cursor 61 onto the image 71, and performing right-clicking, subdata is output (including both display by the display unit 51 and output from the speaker 53), as shown in FIG. 21, and necessary things are displayed.

In FIG. 21, a pull-down menu 72 whose items are text data as subdata is displayed on the display unit 51. Images 73 corresponding to subdata are displayed on the display unit 51. Also, sound as the subdata is output from the speaker 53, and an operation panel 74 for performing control of reproduction of the sound and selecting is displayed on the display unit 51.

In FIG. 21, the image 71 as main data is an image of a photograph of an artist's face, and a pull-down menu 72 as subdata is made up of text representing pieces of music song by the artist. Images 73 as subdata are images of photographs of the jacket of an album containing pieces of music whose names are used as the items of the pull-down menu 72. Sound data as subdata is obtained by combining the sound data of the heads of the pieces of music whose names are used as the items of the pull-down menu 72. Accordingly, the speaker 53 sequentially outputs the heads of the pieces of music whose names are used as the items of the pull-down menu 72. The operation panel 74 contains a rewind button 74A for instructing the rewinding of music output from the speaker 53, a fast-forward button 74B for instructing fast forwarding, a play button 74C for instructing the playing of music, a stop button 74D for instructing a stop of an operation, and a select button 74E for instructing selection of music.

Accordingly, the displayed text enables the user to know the music names and to listen to the pieces of music actually. In addition, the user can view the image of the jacket of the album containing the pieces of music.

When the heads of the pieces of music as the subdata are sequentially reproduced from the speaker 53, by moving the cursor 61 onto the select button 74E, and performing, for example, left-clicking, selection of the sound data of the pieces of music which is being reproduced that time is detected, a content identifier as link data for sound which corresponds to the sound data is transmitted to the package server 1 in a form in which the content identifier is included in a request signal.

In this case, when the main data of multimedia package data specified by the content identifier is, for example, sound data of the entirety of the piece of music selected by the user, multimedia package data in which such sound data is used as main data is transmitted from the package server 1 to the user terminal 3. In the user terminal 3, an icon 75 representing the sound data which is used as the main data of the multimedia package data is displayed in the link display part 62A of the dedicated browser 62, and the piece of music corresponding to the sound data is output from the speaker 53, as shown in FIG. 22.

Figure 22:
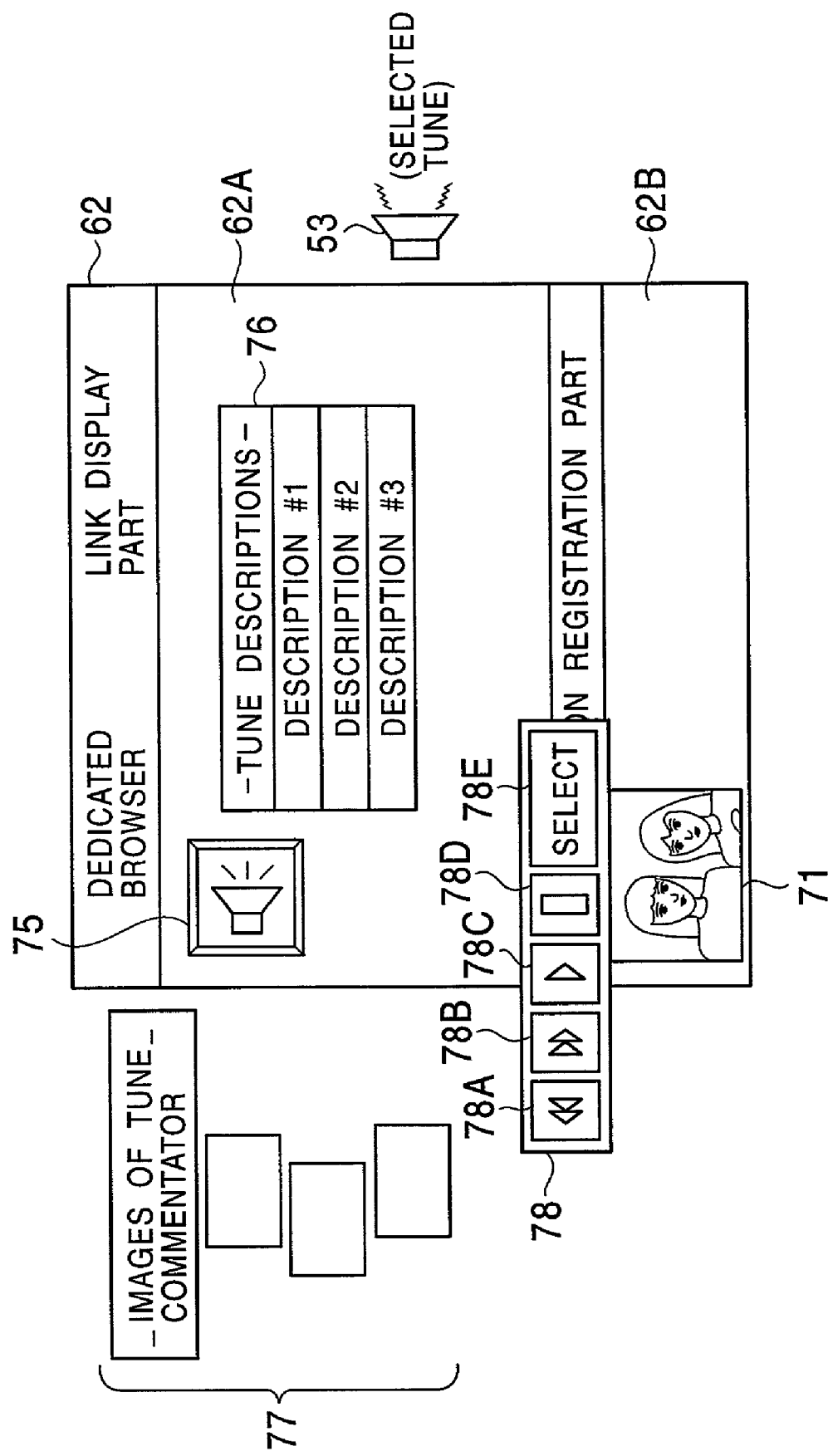
FIG. 22 is an illustration of an example of a screen displayed by the user terminal 3.

After the icon 75 is displayed in the link display part 62A of the dedicated browser 62, by moving the cursor 61 onto the icon 75 and performing right-clicking, the subdata is output and necessary things are displayed, as shown in FIG. 22.

In FIG. 22, the pull-down menu 76 containing text data as subdata is displayed on the display unit 51. Also, images 77 as subdata are displayed on the display unit 51, and an operation panel 78 for performing control of reproduction of sound and selection of sound is displayed on the display unit 51.

In FIG. 22, the pull-down menu 76 corresponding to subdata has text form representing detailed comments of each commentator which are directed to pieces of music corresponding to sound data as main data paired with the subdata. The images 77 corresponding to subdata are images of photographs of commentators whose descriptions are the items of the pull-down menu 76.

In FIG. 22, sound data as subdata is obtained by combining sound data of the descriptions as the items of the pull-down menu 76. However, just after multimedia package data is downloaded, the speaker 53 outputs a piece of music corresponding to sound data which is the main data of the multimedia package data. The description corresponding to the sound data as subdata is not output.

The description corresponding to the sound data as subdata is output from the speaker 53 by, for example, operating an operation panel 78. The operation panel 78 contains a rewind button 78A, a fast-forward button 78B, a play button 78C, a stop button 78D, and a select button 78E which are respectively identical in construction to the rewind button 74A, the fast-forward button 74B, the play button 74C, the stop button 74D, and the select button 74E of the operation panel 74. For example, when the user clicks on the play button 78C, the reproduction of a piece of music corresponding to the sound data as main data is stopped and the reproduction of the description corresponding to the sound data as subdata is initiated.

However, if the reproduction of the description corresponding to the sound data as subdata is initiated, it is possible that, without stopping the reproduction of the piece of music corresponding to the sound data as main data, the reproduction of the piece of music be continued by sufficiently reducing the volume of the piece of music.

As described above, the user can read the details of descriptions of music in text form and can listen to the details of descriptions of music in the form of sound. Moreover, the user can view images of commentators.

In the above case, as is described using FIG. 21, when the image 71 is an image of a photograph of an artist's face, text data representing songs of the artist, image data corresponding to an image of a photograph of the jacket of an album containing the songs, and sound data corresponding to the songs are used as subdata. However, the text data, the image data, and the sound data which are used as the subdata do not need to be data having a single content, but may be data having different contents. For example, concerning the subdata, the text data can correspond to the words of the songs of the artist, the image data can correspond to a video clip of the artist, and the sound data can correspond to commentators' descriptions about the artist's songs.

In the above case, concerning the multimedia package data which is supplied from the package server 1 to the user, its link structure and the content of each of the multimedia package data are determined at the package server side. Thus, multimedia package data that has a single content and a single link structure is provided to all users.

Figure 23A:
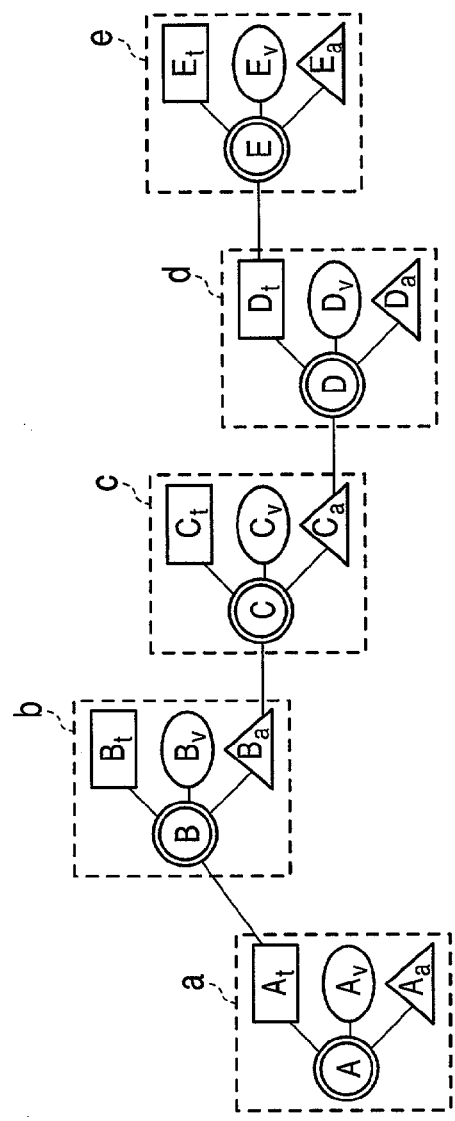
FIGS. 23A and 23B are illustrations of multimedia package data stored in the database 31 shown in FIG. 3.

In other words, when in the package server 1, as shown in FIG. 23A, multimedia package data a, b, c, d, and e are sequentially linked, all users cannot be provided with the multimedia package data e unless they follow links in the order given. When in the package server 1, as shown in FIG. 23B, there are pieces of text data, pieces of image data, and pieces of sound data, which are pieces of subdata paired with main data, the pieces of subdata are provided to all users.

Figure 23B:
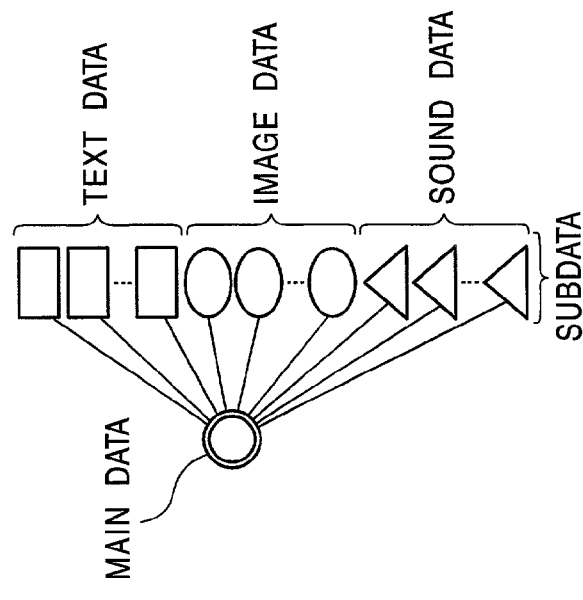

Similarly to FIG. 16, in FIGS. 23A and 23B (also in FIGS. 24A and 24B described later), each double circle indicates main data in multimedia package data, and each rectangle, each circle, and each triangle indicate text data, image data, and sound data, respectively, which are subdata in the multimedia package data.

By way of example, when the user follows a link on the multimedia package data a, for a user who can reach the multimedia package data e, it definitely takes time to follow links on the multimedia package data a, b, c, d, and e in this order. For example, for a user who needs both text data and image data but does not need sound data, outputting sound data as subdata is not necessary.

Accordingly, the package server 1 can provide multimedia package data by customizing, for each user, the link structure of multimedia package data and the content of each piece of the multimedia package.

Figure 24A:
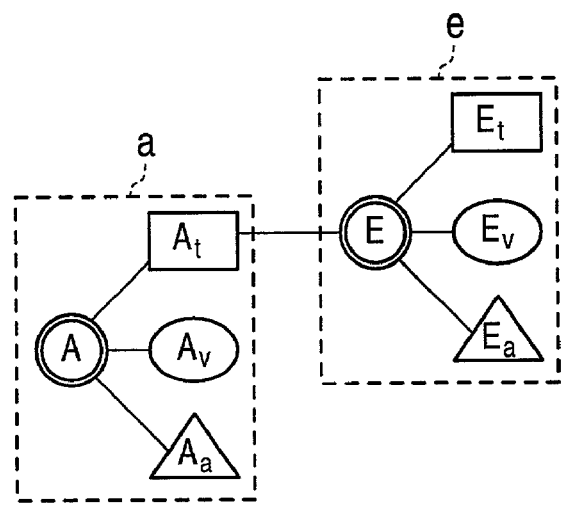
FIGS. 24A and 24B are illustrations of customizing of multimedia package data provided to the user terminal 3.
Figure 24B:
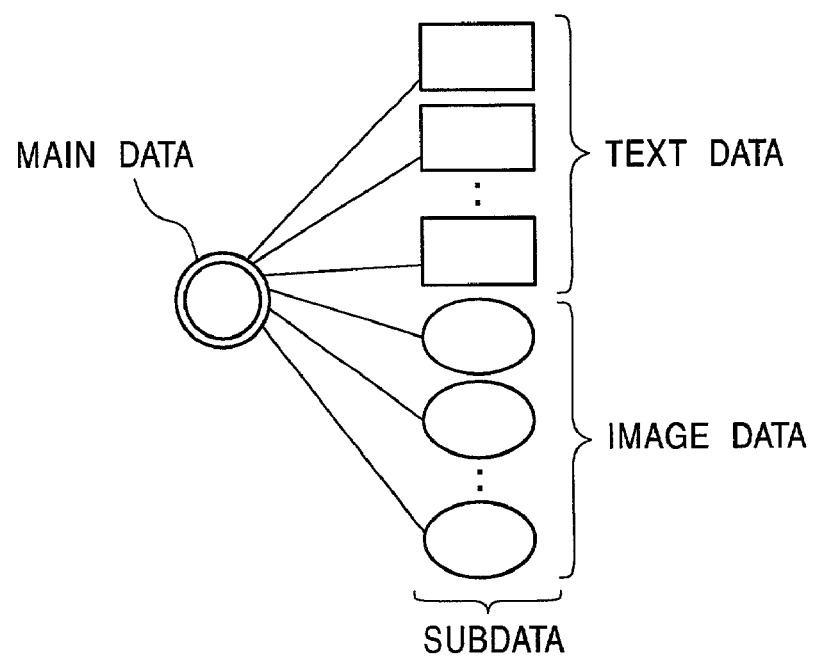

Specifically, in the package server 1, the link structure can be changed so that the multimedia package data a is linked to the multimedia package data e, as shown in FIG. 24A. Also, in subdata form changed so that text data and image data are included and sound data is excluded, as shown in FIG. 24B, multimedia package data can be provided.

Subdata can be customized, such as a change of (including deletion of and addition to) items of each pull-down menu which are made up of text data as subdata, and a change in the order of the items. Since subdata is accompanied by link data, addition to or deletion of items (text data as subdata) of the pull-down menu is addition to or deletion of multimedia package data.

Figure 25:
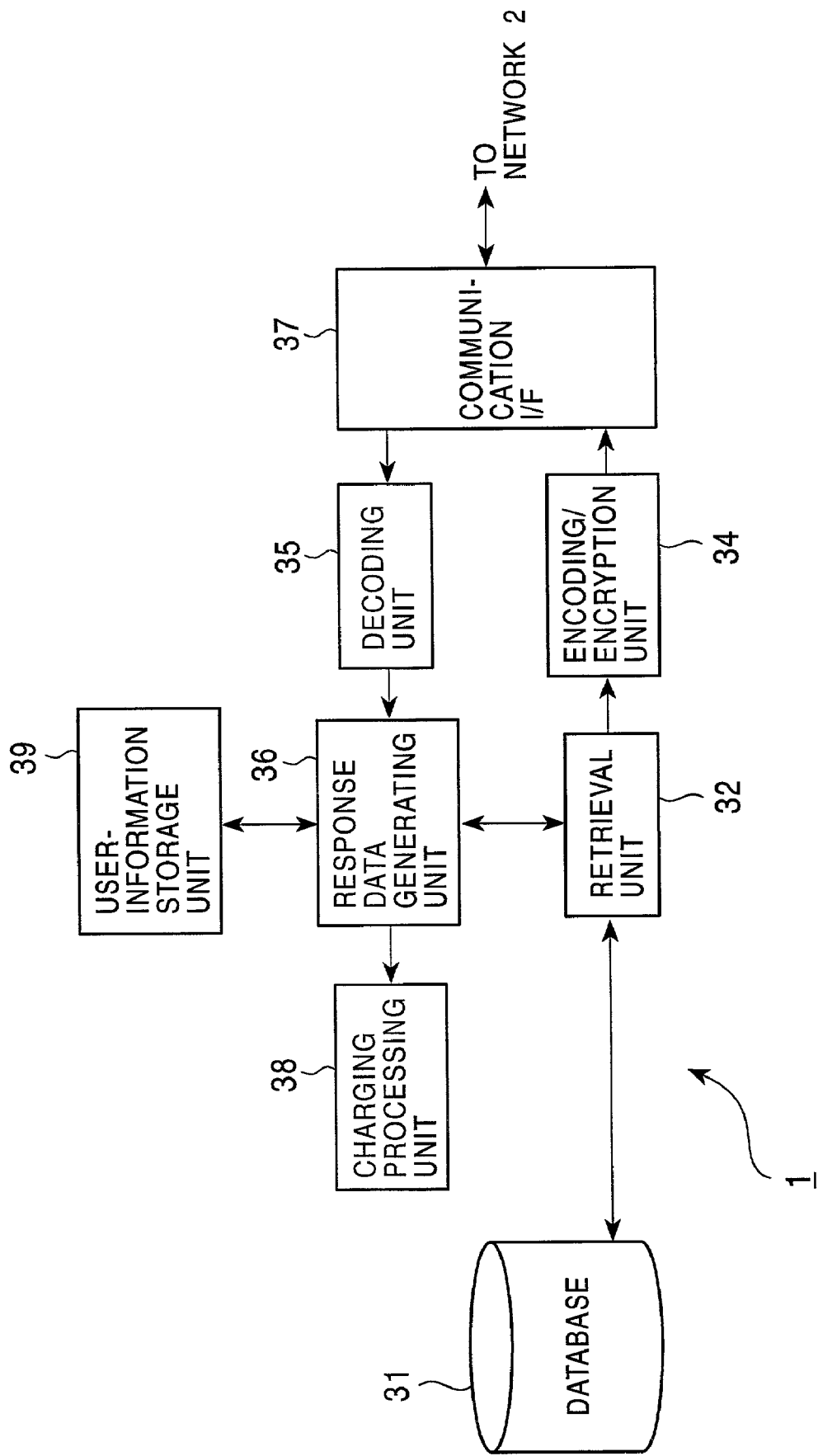
FIG. 25 is a block diagram showing a second functional construction of the package server 1 shown in FIG. 1.

FIG. 25 shows an example of the package server 1 in which the link structure of multimedia package data and the content of each of the multimedia package data can be customized. In FIG. 25, by using identical reference numerals to denote blocks corresponding to those in FIG. 3, descriptions of the blocks are omitted, as required. In other words, the package server 1 in FIG. 25 is basically identical in structure to that shown in FIG. 3, except that a user-information storage unit 39 is provided.

User information on users is collected and is stored in the user-information storage unit 39.

The user information stored in the user-information storage unit 39 consists of user-preference information shown in FIG. 26A and change information shown in FIG. 26B.

As shown in FIG. 26A, the user-preference information includes a user ID for identifying each user and request-frequency information representing the frequency of requests. The request-frequency information is classified corresponding to categories of multimedia package data. For example, as shown in FIG. 26A, concerning music-related multimedia package data, the frequency of requests for multimedia package data is counted for each genre of music (e.g., pops, rock, enka (traditional-style Japanese popular song, etc.), each area of artist's activities (e.g., Japan, U.S.A., European countries, etc.), and each sex of artist (male, female). The counted value is registered as the request-frequency information.

As shown in FIG. 26B, the change information consists of a user ID, package-content-change information created based on request-frequency information corresponding to the user ID, and link-data-change information.

A changed part of subdata customized (changed) based on the request-frequency information is registered as a piece of the package-content-change information. A changed part of the link structure of multimedia package data customized based on the request-frequency information is registered as a piece of the link-data-change information.

In the package server 1 in FIG. 25, when a request signal is transmitted from the user terminal 3, a response-data generating unit 36 updates request-frequency information which corresponds to a user ID included in the request signal and which corresponds to the category of multimedia package data requested by the request signal. Based on the updated request-frequency information, the response-data generating unit 36 updates the package-content-change information and the link-data-change information.

By considering the updated package-content-change information and the updated link-data-change information, the response-data generating unit 36 controls a retriever unit 32 to retrieve multimedia package data, or changes the content of the retrieved multimedia package data, whereby response data is formed.

Accordingly, in this case, in the package server 1, from multimedia package data requested in the past by users, user information such as users' preferences and habits is collected, and based on the collected user information, the link structure and content of multimedia package data is customized and provided to the user.

As a result, the user can be provided with the multimedia package data in a form which is highly convenient to the user.

In this case, as the user is provided with the multimedia package data, the user can be provided with multimedia package data whose content and link structure are more preferable to the user, so that the user's convenience increases. This indicates, to the service provide side, that the users continuously use service and the number of users can be increased.

In the above case, in the package server 1, information such as users' preferences is collected, and based on the collected information, the link structure and content of multimedia package data to be provided to the user is automatically customized. This customizing can be performed such that the user registers package-content-change information and link-data-change information in the package server 1. Also, by providing the user terminal 3 with the user-information storage unit 39 (FIG. 25), the user can perform customizing by using the user terminal 3.

However, when customizing is performed by the user so that the destination of the link is changed, multimedia package data to which the changed destination is linked cannot be provided to the user. This prevents the user from arbitrarily changing customizing.

In addition, the destination of the link on multimedia package data can be changed to, not multimedia package data, for example, a Web page, etc. In this case, it may be prohibited or allowed that the Web page is linked to multimedia package data.

The user-preference information and the change information shown in FIGS. 26A and 26B can be created in the user terminal 3. In this case, the user terminal 3 transmits the change information in a form in which it is included in a request signal. In the package server 1, multimedia package data having a link structure and content based on the change information included in the request signal is created and is transmitted to the user terminal 3. Also in this case, the user can be provided with the multimedia package data in a form highly convenient to the user.

Next, when package data is provided as described above from the package server 1 to the user terminal 3, it is convenient to ensure that advertisement information is shown to the user.

For ensuring that advertisement information is shown to the user in accordance with the output of package data, there is a method in which the user terminal 3 is provided with package data and advertisement information which are correlated to each other and the dedicated browser 62 of the user terminal 3 outputs the package data and the advertisement information. In this method, after the advertisement information is erased in the storage unit 52 (FIG. 8) of the user terminal 3, the advertisement information cannot be output when the package data is output. If the advertisement information is not erased in the storage unit 52, when the file of the package data is opened by an application other than the dedicated browser 62, the advertisement information also cannot be output.

In addition, there is a method in which, by using, for example, a conventional digital watermark technique to position advertisement information in several lower bits of image data and sound data constituting package data, instead of the original part of the package data, the dedicated browser 62 of the user terminal 3 outputs the package data and the advertisement information. In even this method, when the file of the package data having lower bits used for the advertisement information is opened by an application other than the dedicated browser 62, the advertisement information cannot be output.

Accordingly, concerning the method for ensuring that the advertisement information is shown to the user in accordance with the output of package data by the user terminal 3, for example, embedded coding/decoding that has been proposed in U.S. patent applications assigned to the assignee of the present application can be used.

This technique is disclosed in U.S. patent application Ser. Nos. 09/352,241, 09/366,872, 09/413,134, 09/413,983, 09/448,543, 09/587,838, and 09/636,138. These applications are assigned to the assignee of the present application and hereby incorporated by reference. Techniques in some of the applications are described below.

Figure 27:
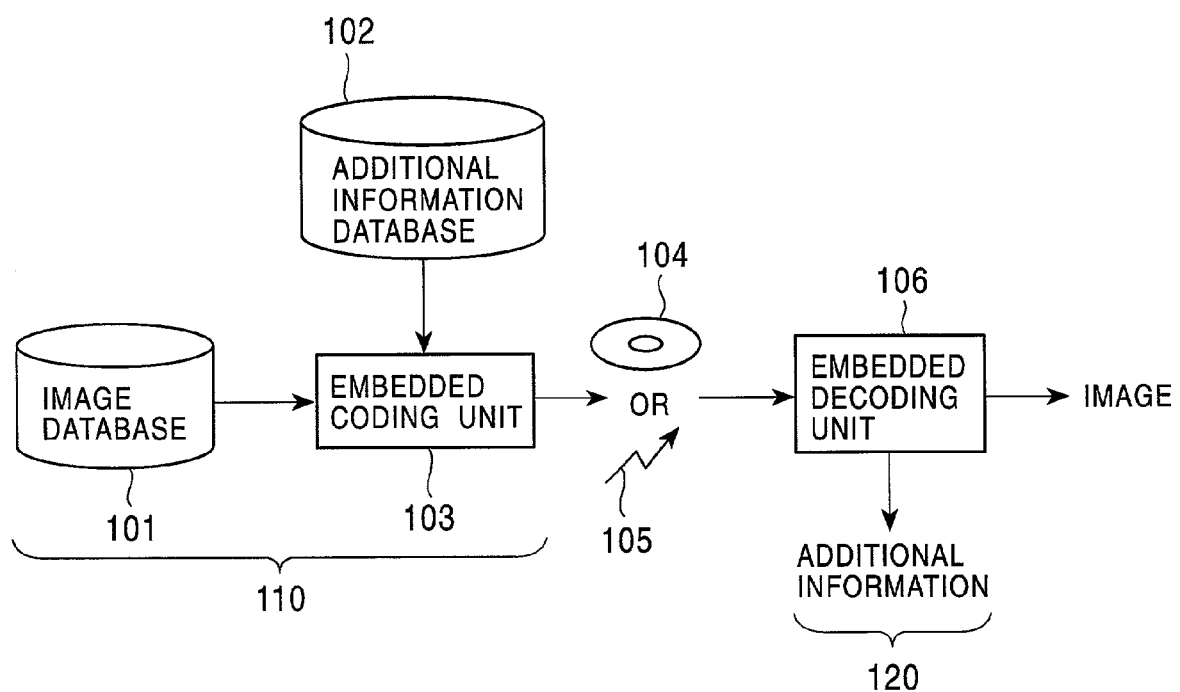
FIG. 27 is a block diagram showing an embodiment of embedded coding/decoding system.

FIG. 27 shows an embodiment of an embedded coding/decoding system for performing embedded coding/decoding.

The embedded coding/decoding system includes an encoding apparatus 110 and a decoding apparatus 120. The encoding apparatus 110 outputs encoded data by encoding, for example, an image to be encoded, and the decoding apparatus 120 decodes the encoded data to generate the original image.

An image database 101 stores images (e.g., digital images) to be encoded. An image is read from the image database 101, and is supplied to an embedded coding unit 103.

An additional information database 102 stores additional information (digital data) as information to be embedded in an image to be encoded. From the additional information database 102, additional information is read and supplied to the embedded coding unit 103.

The embedded coding unit 103 receives the image supplied from the image database 101 and the additional information supplied from the additional information database 102. The embedded coding unit 103 outputs encoded data by encoding the received image based on the received additional information so that the energy distribution of the received image is used to perform decoding. In other words, the embedded coding unit 103 encodes the image by embedding the additional information in the image so that the energy distribution of the image is used to perform decoding, and outputs the encoded data. The encoded data is recorded to a recording medium 104 such as a magneto-optical disk, a magnetic disk, an optical disk, a magnetic tape, or a phase-change disk, or is transmitted to the decoding apparatus 120 via a transmission medium such as terrestrial waves, a satellite link, the Internet, or a public line.

The decoding apparatus 120 includes an embedded decoding unit 106, and receives the encoded data supplied via the recording medium 104 or the transmission medium 105. The embedded decoding unit 106 uses the energy distribution of the image to perform decoding for generating the original image and additional information. The reproduced image is supplied and displayed on a monitor (not shown).

In addition to text data relating to the original image, sound data, and an image obtained by reducing the original image, data unrelated to the original image can be used as the additional information.

Next, the principle of encoding (embedded coding) by the embedded coding unit 103 (FIG. 27) and the principle of decoding (embedded decoding) by the embedded decoding unit 106 (FIG. 27) are described below.

In general, what is called "information" has a distribution of energy, and the distribution is recognized as information (valuable information). For example, an image obtained by photographing a scene is recognized as a scene image by people because the image (the pixel levels, etc., of pixels constituting the image) has an energy distribution corresponding to the scene. An image having no energy distribution is nothing but noise or the like, and does not have a value in use as information.

Therefore, even when some process is performed on valuable information, and the original distribution of the energy of the information is broken, by restoring the broken energy distribution, the processed information can be restored to the original information. In other words, encoded data obtained by encoding information can be restored to the original valuable information by using the original distribution of the energy of the information.

Here, things representing the energy (distribution) of the information include, for example, interrelation, continuity, and similarity.

The interrelation of information means interrelation (e.g., self-interrelation, the distance between a component and another component, etc.) among elements (e.g., when the information is an image, the components of the image, such as pixels and lines) constituting the information. For example, what represents the interrelation of an image is an interrelation between lines of the image, and an interrelation value representing the interrelation may be, for example, the sum of the squares of differences of pixel levels corresponding to two lines. In this case, a small interrelation value represents a large interrelation between lines, while a large interrelation value represents a small interrelation between lines.

Figure 28:
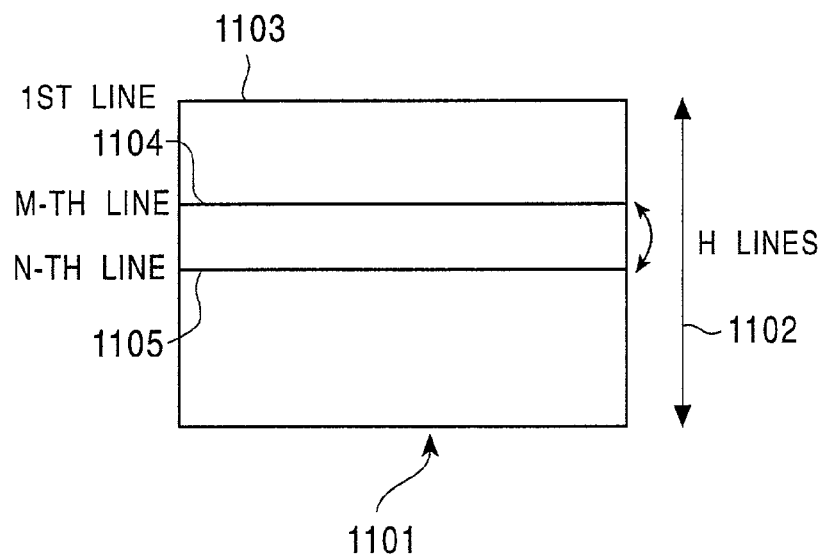
FIG. 28 is an illustration of an image to be encoded.

By way of example, when there is an image 1101 including horizontal (H) lines 1102 as shown in FIG. 28, the interrelation between the first line 1103 and another line is as follows: in general, as shown in the graph (A) of FIG. 29, a line (having an upper position in the image 1101 in FIG. 28) having a smaller distance from the first line 1103 has a larger interrelation as indicated by the interrelation 1201 between the first line 1103 and the M-th line 1104, and a line (having a lower position in the image 1101 in FIG. 28) having a larger distance from the first line 1103 has a smaller interrelation as indicated by the interrelation 1202 between the first line 1103 and the N-th line 1105. Therefore, there is the distribution of interrelation in that the smaller the distance from the first line 1103, the larger the interrelation from the first line 1103, and the larger the distance from the first line 1103, the smaller the interrelation from the first line 1103.

Figure 29:
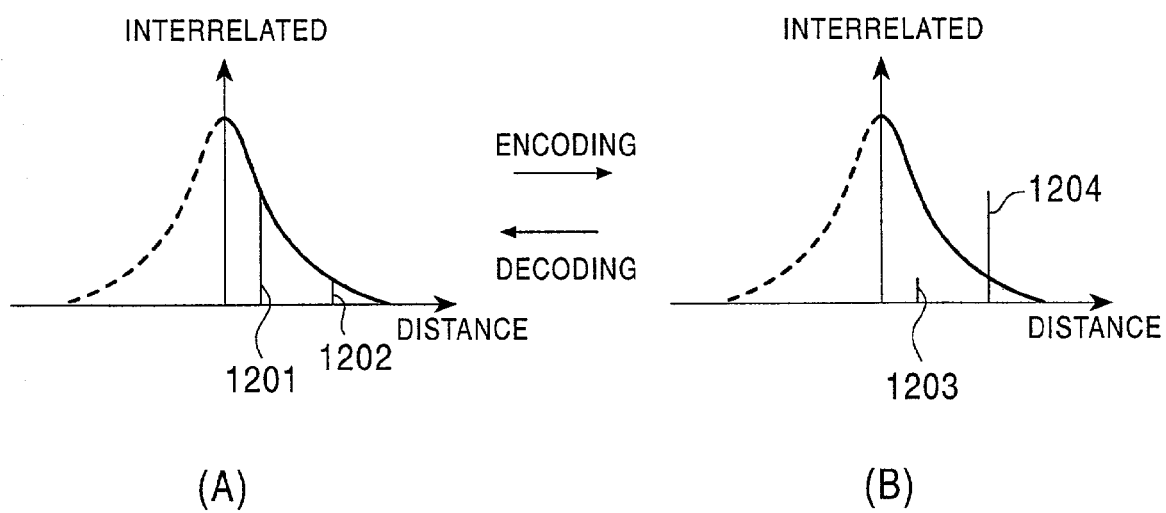
FIG. 29 consists of graphs (A) and (B) illustrating encoding/decoding using interrelation.

Accordingly, when the image 1101 in FIG. 28 is processed so that the pixel level of the M-th line 1104, which is relatively close to the first line 1103, and the pixel level of the N-th line 1105, which is relatively far from the first line 1103, are switched (1<M<N≦H), and in the processed image, interrelations of the first line 1103 to other lines are calculated, the calculated results are as shown in the graph (B) of FIG. 29.

In the processed image, the interrelation between the first line 1103 and the M-th line (the N-th line 1105 before the switching) which is close thereto is small, and the interrelation between the first line 1103 and the N-th line (the M-th line 1104 before the switching) which is far therefrom is large.

Therefore, in the graph (B) of FIG. 29, the distribution of interrelation is lost in which a line having a smaller distance from the first line 1103 has a larger interrelation thereto and a line having a larger distance from the first line 1103 has a smaller interrelation thereto. However, by using the distribution of interrelation in which a line having a smaller distance from the first line 1103 has a larger interrelation thereto and a line having a larger distance from the first line 1103 has a smaller interrelation thereto, the lost distribution of interrelation can be restored. In other words, referring to the graph (B) of FIG. 29, according to the original distribution of interrelation of the image 1101, it is obviously unnatural (strange) that the interrelation 1203 between the first line 1103 and the M-th line close thereto is small and the interrelation 1204 between the first line 1103 and the N-th line far therefrom is large. Therefore, the M-th line and the N-th line should be switched. By switching the M-th line and the N-th line in the graph (B) of FIG. 29, an image having the original distribution of interrelation shown in the graph (A) of FIG. 29, that is, the original image 1101 can be restored.

In the cases shown in FIGS. 28 and 29, the switching of lines performs image encoding. In the encoding, the embedded coding unit 103 determines, based on the additional information, which lines should be moved, and which lines should be switched. The embedded decoding unit 106 decodes an image by using interrelations of an encoded image (i.e., an image having switched lines) to switch lines to original positions thereof so that the original image is restored. In the decoding, that the embedded decoding unit 106 detects, for example, which lines have been moved, and which lines have been switched, is the decoding of additional information embedded in the image.

Figure 30:
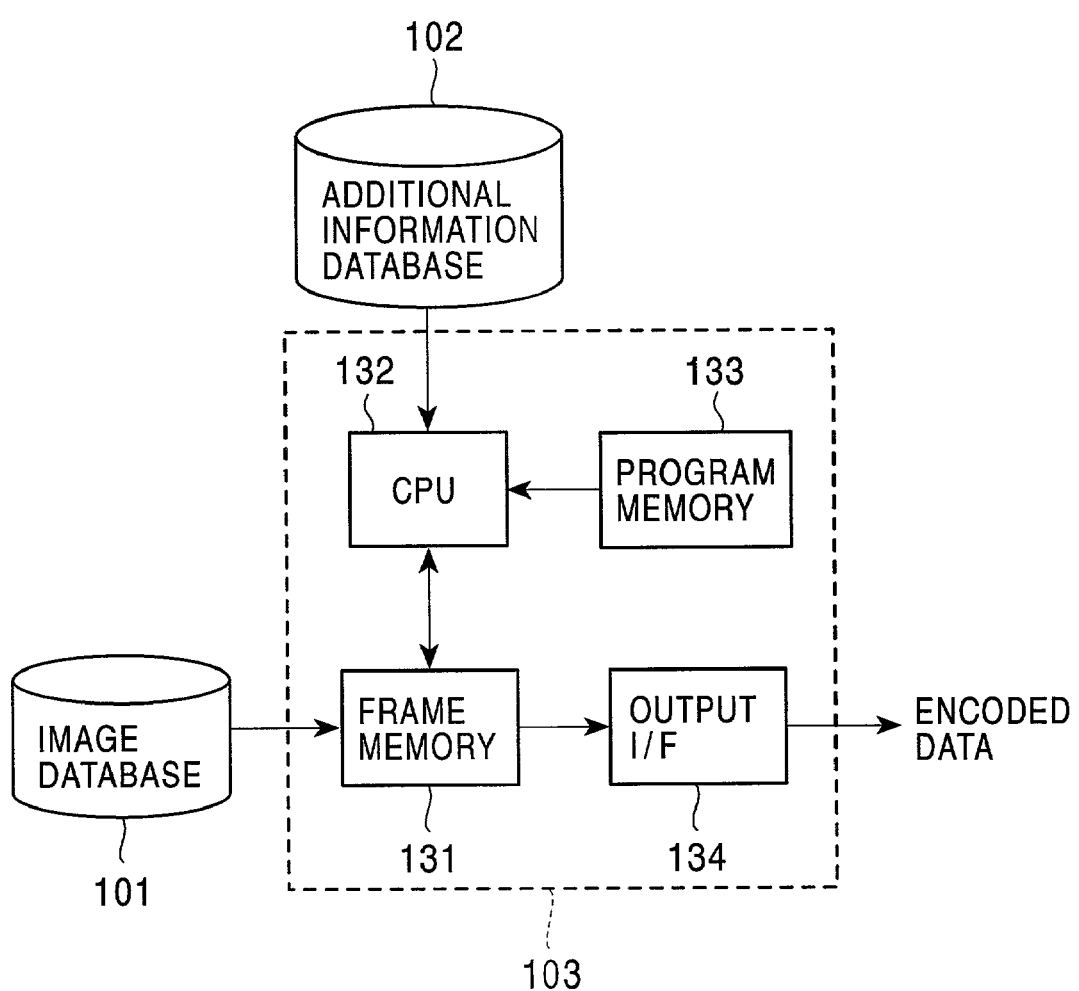
FIG. 30 is a block diagram showing a construction of the embedded coding unit 103 shown in FIG. 27.

FIG. 30 shows a construction of the embedded coding unit 103 shown in FIG. 27 when it performs embedded coding in which additional information is embedded in an image so that the image can be restored using image interrelation.

An image is supplied from the image database 101 to a frame memory 131. The frame memory 131 temporarily stores the image in, for example, units of frames.

A CPU 132 can perform an embedded coding process (described later) by executing a program stored in a program memory 133. In other words, the CPU 132 can receive, in units of a predetermined number of bits, additional information supplied from the additional information database 102, and can embed the additional information in the image stored in the frame memory 131 in the units of the predetermined number of bits. Specifically, the CPU 132 selects some pixels from among pixels constituting the image stored in the frame memory 132 and processes the selected pixels so as to correspond to the additional information and so that the processed pixels can be restored using interrelation in the image, whereby the additional information is embedded in the selected pixels.

The program memory 133 is made of, for example, a ROM or a RAM, and stores a computer program for controlling the CPU 132 to perform embedded coding.

An output I/F 134 outputs, as encoded data, the additional-information-embedded image read from the frame memory 131.

The frame memory 131 consists of a plurality of banks for storing a plurality of frames. By switching the banks, the frame memory 131 can simultaneously perform the storing of an image supplied from the image database 101, the storing of an image to be processed using embedded coding by the CPU 132, and the output of an image (encoded data) obtained by performing embedded coding. This makes it possible to output encoded data in real time, even if the image supplied from the image database 101 is a moving picture.

Figure 31:
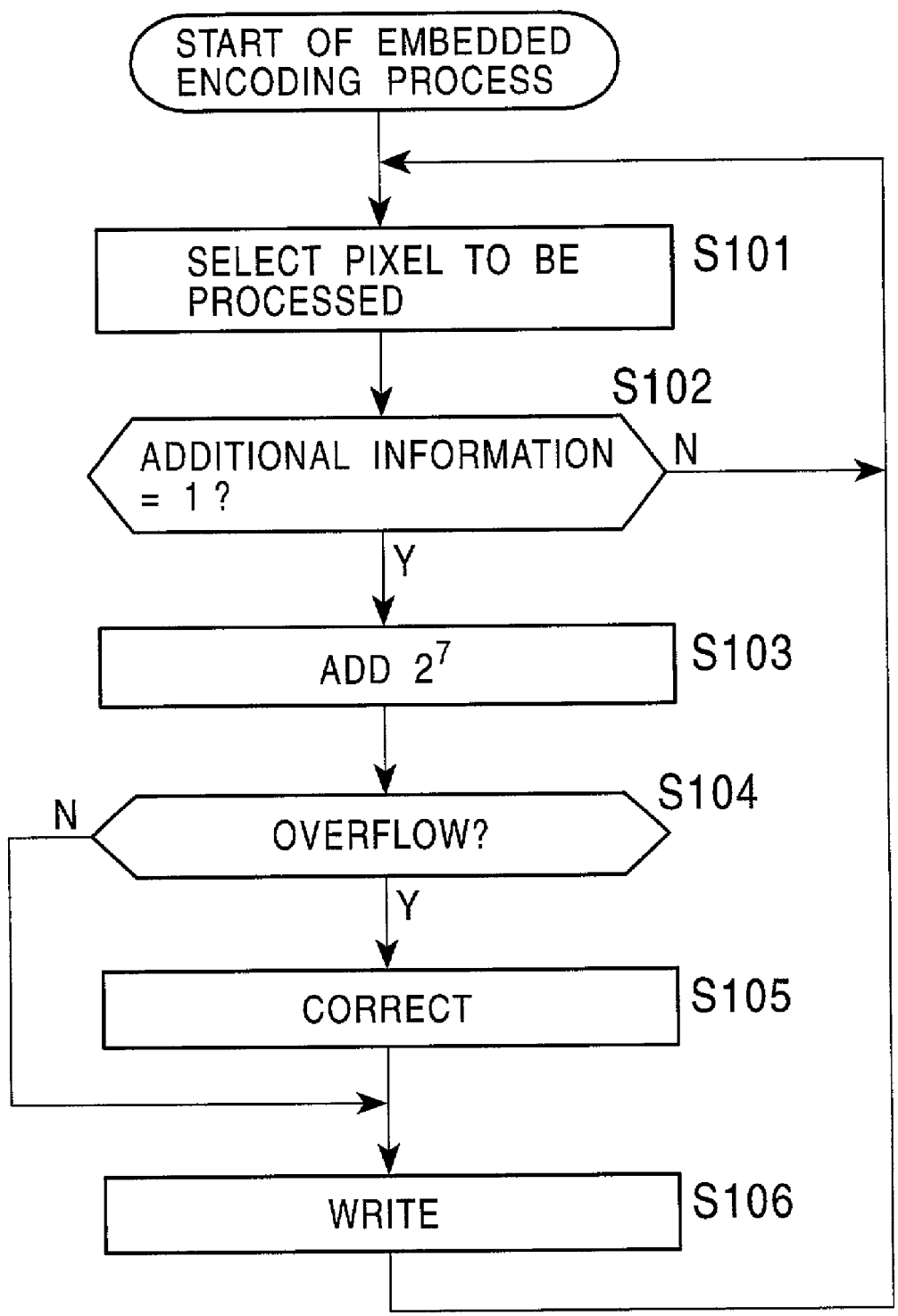
FIG. 31 is a flowchart illustrating an embedded coding processing.

Next, with reference to the flowchart shown in FIG. 31, the embedded coding process performed by the embedded coding unit 103 is described below.

An image read from the image database 101 is supplied and stored in units of frames in the frame memory 131.

The CPU 132 receives additional information bit by bit from the additional information database 102. When receiving 1-bit additional information, in step S101, the CPU 132 selects, from the image stored in the frame memory 131, pixels (pixels to be processed) in which the 1-bit additional information is embedded.

In this embodiment, as shown in FIG. 32, from the image stored in the frame memory 131, pixels are selected in a predetermined pattern. Specifically, whenever step S101 is performed, the CPU 132 can sequentially select pixels which are not hatched in FIG. 32, as pixels to be processed, in the order of, for example, line scanning (raster scanning). In FIG. 32, p(x, y) represents a pixel positioned in the x-th column from the left and the y-th row from the top (this applies to FIG. 36 which is described later).

After that, in step S102, the CPU 132 determines whether the additional information received from the additional information database 102 is either "1" or "0". If the CPU 132 has determined that the received additional information is, for example, "0", the CPU 132 goes back to step S101. In other words, when the received additional information is "0", the CPU 132 goes back to step 101 without processing the pixels to be processed (after adding "0" as a predetermined constant). In step S101, the CPU 132 waits for the next 1-bit additional information to be transmitted from the additional information database 102. When receiving the next 1-bit additional information, the CPU 132 selects the next pixels to be processed, and repeats the same processing.

In step S102, if the CPU 132 has determined that the additional information is, for example, "1", the CPU 132 proceeds to step S103, and performs a predetermined process on the pixels to be processed. Specifically, the CPU 132 adds, to the pixel levels of the pixels to be processed, predetermined constant, for example, 2 to the power of (the number of bits assigned to pixels constituting the image—1).

Accordingly, when, for example, eight bits are assigned as the pixel level of each pixel constituting the image, in step S103, $2^7$ is added to the pixel level of each pixel to be processed.

The addition may be performed on luminance component Y or color components U and V when the pixel level is expressed by, for example, YUV. When the pixel level is expressed by, for example, RGB, the addition may be performed on any one of R, G, and B.

After in step S103, $2^7$ is added to the pixel level of each pixel to be processed, the CPU 132 proceeds to step S104, and determines whether or not the result of the addition overflows. In step S104, if the CPU 132 has determined that the result of the addition does not overflow, the CPU 132 skips over step S105 and proceeds to step S106. In step S106, the CPU 132 writes (overwrites), in the frame memory 131, the result of the addition as the pixel level of each pixel to be processed. After that, the CPU 132 goes back to step S101.

In step S104, if the CPU 132 has determined that the result of the addition overflows, that is, when the result of the addition is $2^8$ or greater, the CPU 132 proceeds to step S105, and the result of the addition is corrected. In other words, in step S105, the overflowing result is corrected to, for example, the overflowing amount (value obtained by subtracting $2^8$ from the overflowing result). Proceeding to step S106, the CPU 136 writes, in the frame memory 131, the corrected result as the pixel level of each pixel to be processed, and goes back to step S101 when receiving the next 1-bit additional information transmitted from the additional information database 102.

After a 1-frame image stored in the frame memory 131 is processed, the frame memory 131 reads the processed 1-frame image (additional-information-embedded image) as encoded data, and the CPU 132 continues to process the next 1-frame image stored in the frame memory 131.

As described above, by processing some pixels selected from among pixels constituting an image stored in the frame memory 131 so as to correspond to additional information and so that the original image can be restored using image interrelation, the additional information is embedded in the image. This makes it possible to suppress deterioration in image quality and to embed the additional information in the image without increasing the amount of data.

In other words, the pixels having the embedded additional information can be decoded to generate (can be restored to) the original pixels and additional information without any overhead by using image interrelation, that is, interrelation to pixels having no embedded additional information. Therefore, in the resultant decoded image (reproduced image), deterioration in image quality does not basically occur due to the embedding of the additional information.

Figure 33:
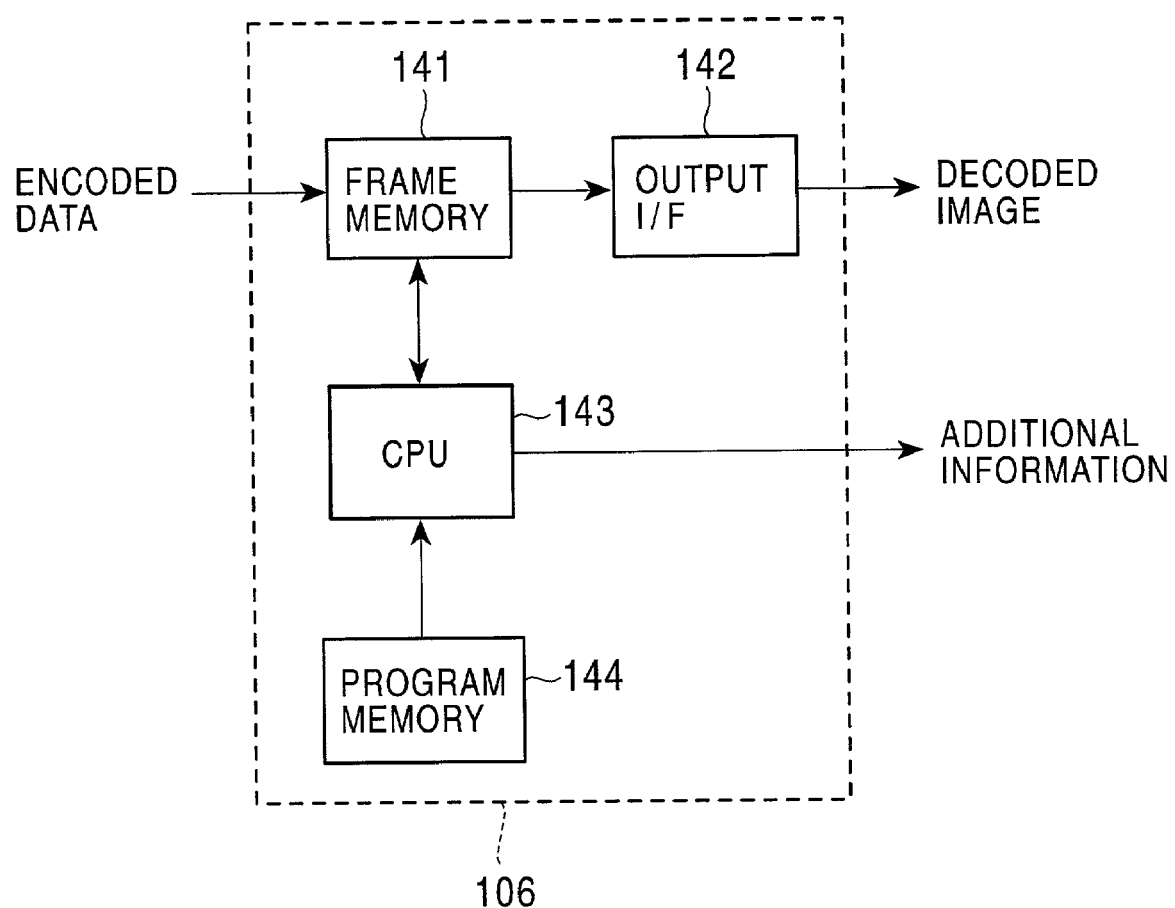
FIG. 33 is a block diagram showing a construction of the embedded decoding unit 106 shown in FIG. 27.

Next, FIG. 33 shows a construction of the embedded decoding unit 106 (FIG. 27) that uses image interrelation to decode the encoded data output from the embedded coding unit 103 to generate the original image and additional information.

The encoded data, that is, the image (hereinafter referred to as the "embedded-coded image") having the embedded additional information is supplied to a frame memory 141. The frame memory 141 temporarily stores the supplied embedded-coded image, for example, in units of frames. The frame memory 141 is identical in structure to the frame memory 131 shown in FIG. 30. By switching banks, the frame memory 141 can also process the embedded-coded image in real time, even if the embedded-coded image is a moving picture.

An output I/F 142 can read and output an image (reproduced image) obtained as a result of an embedded decoding process (described later) performed by a CPU 143.

Figure 34:
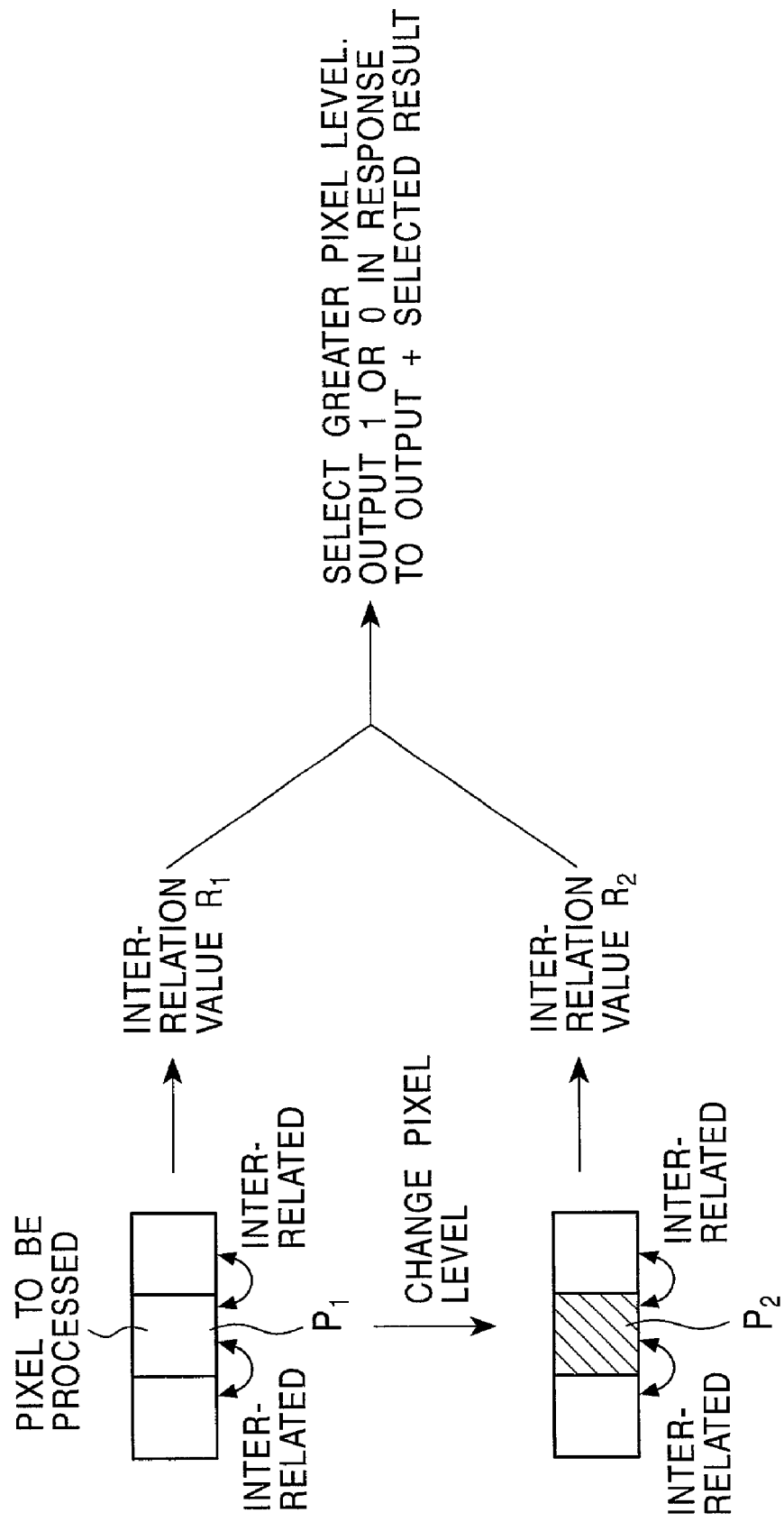
FIG. 34 is an illustration of processing performed by the CPU 143 shown in FIG. 33.

By executing a program stored in a program memory 144, the CPU 143 performs the embedded decoding process. In other words, by using image interrelation, the CPU 143 can decode the embedded-coded image stored in the frame memory 141 to generate the original image and additional information. Specifically, the CPU 143 selects, as a pixel to be processed, one of pixels constituting the embedded-coded image, and changes the pixel level of the pixel to be processed, by processing the pixel to be processed inversely to the process performed by the CPU 132 shown in FIG. 30, as shown in FIG. 34. Referring to FIG. 34, the CPU 143 calculates interrelation value $R_1$ (first interrelation) between the pixel to be processed, which is a value before changing, and peripheral pixels (right and left adjacent pixels in the example shown in FIG. 34), and interrelation value $R_2$ (second interrelation) between the pixel to be processed whose pixel level has been changed and peripheral pixels with respect thereto, and compares interrelation values R1 and R2. Based on the result of comparison, the CPU 143 uses, as the decoding result, one of the pixel to be processed which is a value before changing, and the pixel to be processed whose pixel level has been changed. The CPU 143 also decodes the additional information (one of the values "1" and "0" in one bit in the example shown in FIG. 34) embedded in the pixel to be processed.

The program memory 143 is identical in structure to the program memory 133 shown in FIG. 30, and stores a computer program for controlling the CPU 143 to perform the embedded decoding process.

Figure 35:
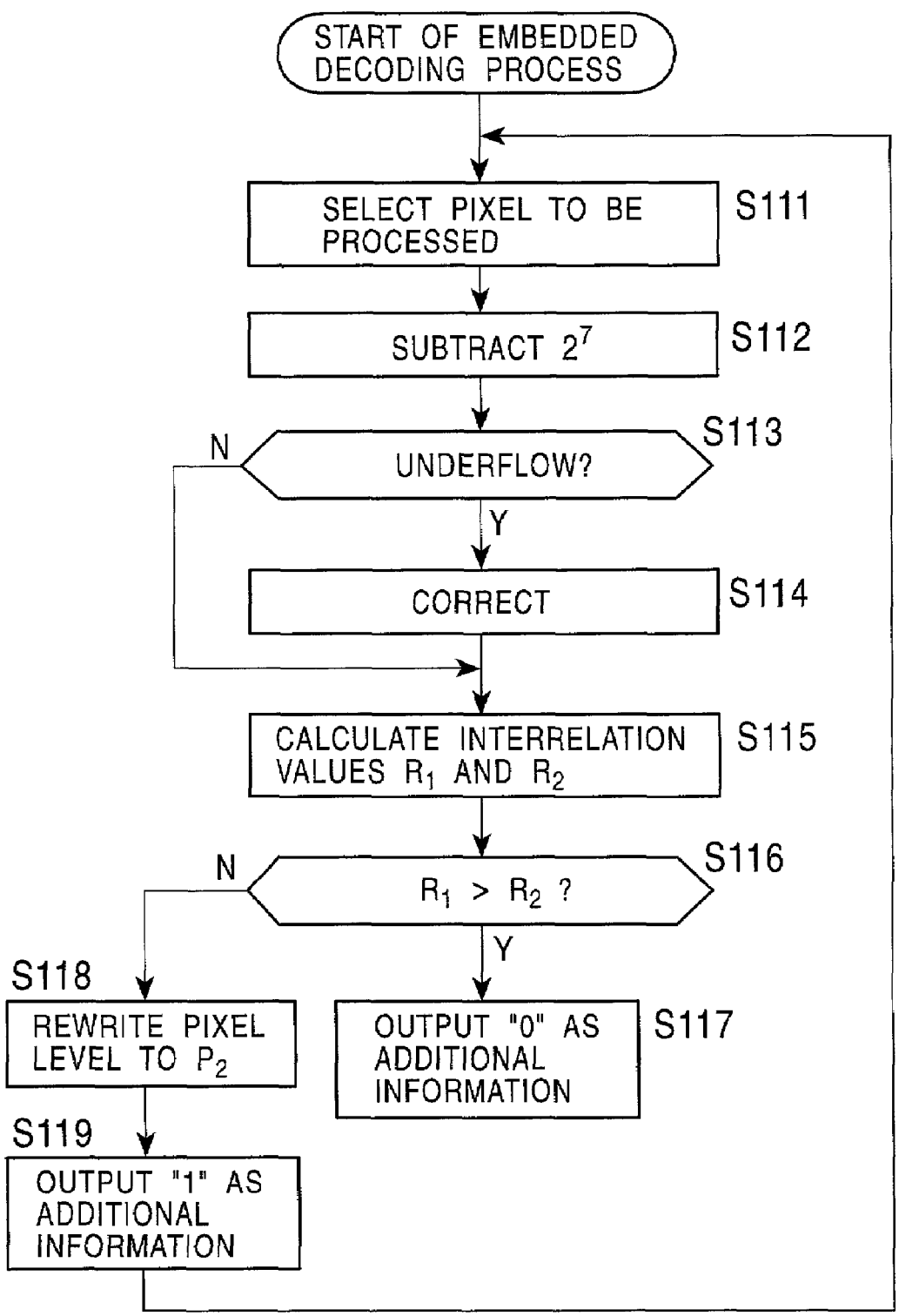
FIG. 35 is a flowchart illustrating an embedded decoding process.

With reference to the flowchart shown in FIG. 35, the error-detecting circuit performed by the embedded decoding unit 106 is described below.

The frame memory 141 sequentially stores the supplied image, for example, in units of frames.

In step S111, the CPU 143 selects, from an embedded-coded image for a frame, a pixel (pixel to be processed) to be processed for decoding.

Here, as shown in FIG. 32, similarly to the CPU 132 shown in FIG. 30, the CPU 143 selects, from an embedded-coded image stored in the frame memory 141, pixels in the form of a grid. In other words, whenever step S111 is performed, the CPU 143 sequentially selects, as pixels to be processed, pixels which are not hatched in the order of line scans, as shown in FIG. 32.

After that, the CPU 143 proceeds to step S112, and processes the pixels to be processed inversely to the process performed by the CPU 132. Specifically, the CPU 143 subtracts, from the pixels values of the pixels to be processed, 2 to the power of (the number of bits assigned to pixels constituting the image—1) which is a predetermined constant.

Therefore, as described above, for example, when eight bits are assigned for the pixel levels of the pixels constituting the image, in step S112, $2^7$ is subtracted from the pixel level of each pixel to be processed.

This subtraction may be performed on any one of luminance component Y and color components U and V when the pixel level is expressed by, for example, YUV. Also, the subtraction may be performed on one of R, G, and B when the pixel level is expressed by, for example, RGB. However, the subtraction in step S112 must be performed on the same value processed by addition in step S103 in FIG. 31. For example, when the pixel level is expressed by, for example, YUV, and the addition in step S103 in FIG. 31 is performed on the Y component among YUV, the subtraction in step S112 must be performed on the Y component.

After $2^7$ is subtracted from the pixel level of each pixel to be processed, the CPU 143 proceeds to step S113, and determines whether or not the result of subtraction underflows. In step S113, if the CPU 143 has determined that the result of subtraction does not underflow, the CPU 143 skips over step S114 and proceeds to step S115.

Conversely, in step 113, if the CPU 143 has determined that the result of subtraction underflows, that is, when the result of subtraction is less than "0", the CPU 143 proceeds to step S114, and corrects the result of subtraction. In other words, in step S114, the CPU 143 corrects the underflowing result of subtraction to a value obtained by adding $2^8$ to the underflowing result, and proceeds to step S115.

In step S115, concerning each of the pixel level $P_1$ (value from which $2^7$ is not subtracted in step S112) (hereinafter referred to also as the "first pixel level") of a pixel to be processed, and a subtraction value $P_2$ (this includes a value corrected in step S114 in the following description) (hereinafter referred to also as the "second pixel level") obtained by subtracting $2^7$ from the pixel level $P_1$, interrelation values with respect to right and left adjacent pixels (as peripheral pixels from a pixel to be processed) are calculated.

In other words, in step S115, the absolute values of differences from the first pixel level $P_1$ of the pixel to be processed to the pixel levels of right and left pixels with respect to the pixel to be processed are calculated, and the sum of the two absolute values is found as interrelation value $R_1$ concerning the first pixel level $P_1$. Also in step S115, the absolute values of differences from the first pixel level $P_2$ of the pixel to be processed to the pixel levels of right and left pixels with respect to the pixel to be processed are calculated, and the sum of the two absolute values is found as interrelation value $R_2$ concerning the second pixel level $P_2$.

In step S115, the pixels for interrelation to the pixel to be processed are not limited to right and left pixels adjacent the pixel to be processed, but may be pixels which are upward and downward adjacent to the pixel to be processed and pixels which are time-adjacent to the pixel to be processed. For finding interrelation to the pixel to be processed, it is preferable to use the hatched pixels in FIG. 32, that is, pixels having no embedded additional information. This is because, since interrelation concerning the original image cannot be obtained if interrelation between the pixel to be processed and each pixel having embedded additional information, impossibility of image interrelation makes it difficult to accurately restore the original pixel levels and additional information from the pixels having embedded additional information. Since image interrelation is used to decode the pixels to be processed, it is preferable that pixels for finding an interrelation value with respect to a pixel to be processed have a small spatial or temporal distance to the pixel to be processed.

After calculating interrelation value $R_1$ concerning the first pixel level $P_1$ and interrelation value $R_2$ concerning the second pixel level $P_2$, the CPU 143 proceeds to step S116, and compares interrelation values $R_1$ and $R_2$.

In step S116, if the CPU 143 has determined that interrelation value $R_1$ is greater than (not less than) interrelation value $R_2$, the CPU 143 proceeds to step S117. In step S117, the CPU 143 outputs "0" as the result of decoding the additional information, and goes back to step S111. In this case, the value stored in the frame memory 141 is not rewritten. Thus, the result of decoding the pixel level of the pixel to be processed remains unchanged as the pixel level $P_1$.

In other words, that interrelation value $R_1$ concerning the first pixel level $P_1$ is greater than interrelation value $R_2$ concerning the second pixel level $P_2$ is that pixel level $P_1$ is more probable as the pixel level of the pixel to be processed than pixel level $P_2$. Thus, the more probable pixel level $P_2$ is used as the result of decoding the pixel level of the pixel to be processed. Since pixel level $P_1$ is a value in which $2^7$ is not subtracted in step S112, it is possible that $2^7$ is not added in step S103. In the embedded coding process in FIG. 31, $2^7$ is not added when the additional information is "0". Accordingly, when pixel level $P_1$ is more probable as the pixel level of the pixel to be processed since interrelation value $R_1$ concerning the first pixel level $P_1$ is greater, it is determined that the embedded additional information is "0".

In step S116, if the CPU 143 has determined that interrelation value $R_2$ is greater than (not less than) interrelation value $R_1$, the CPU 143 proceeds to step S118. In step S118, the CPU 143 rewrites the pixel level of the pixel to be processed which is stored in the frame memory 141 into a value obtained by subtracting $2^7$ from the stored pixel level, that is, the second pixel level $P_2$. Accordingly, in this case, the result of decoding the pixel level of the pixel to be processed is the second pixel level $P_2$. The CPU 143 proceeds to step S119, and outputs "1" as the result of decoding the additional information. After that, the CPU 143 goes back to step S111.

In other words, that interrelation value $R_2$ concerning the second pixel level $P_2$ is greater than interrelation value $R_1$ concerning the first pixel level $P_1$ is that pixel level $P_2$ is more probable as the pixel level of the pixel to be processed than pixel level $P_1$. Thus, the more probable pixel level $P_2$ is used as the result of decoding the pixel level of the pixel to be processed. In addition, since pixel level $P_2$ is a value in which $2^7$ is subtracted from pixel level $P_1$, it is possible that $2^7$ is added to the original pixel level in step S103. In the embedded coding process shown in FIG. 31, $2^7$ is added when the additional information is "1". Accordingly, when pixel level $P_2$ is probable as the pixel level of the pixel to be processed since interrelation value $R_2$ concerning the second pixel level $P_2$ is greater, it is determined that the embedded additional information is "1".

Here, when the difference between the interrelation values $R_1$ and $R_2$ obtained as described above is small, it is impossible to simply determine whether either pixel level $P_1$ or pixel level $P_2$ is more probable as the pixel level of the pixel to be processed. In such a case, not only right and left pixels adjacent to the pixel to be processed, but also other pixels are used to find interrelation values concerning pixel levels $P_1$ and $P_2$, and the interrelation values are compared, whereby it can be determined whether either pixel level $P_1$ or pixel level $P_2$ is probable as the pixel level of the pixel to be processed.

As described above, encoded data corresponding to an image having embedded additional information is decoded to reproduce the original image and additional information, whereby the encoded data can be decoded to reproduce the original image and additional information without any overhead for the decoding. Therefore, in the decoded image (reproduced image), deterioration in image quality does not basically occur due to the embedding of additional information.

In this embodiment, the absolute values of differences from the pixel level of a pixel to be processed to the pixel levels of other pixels are used as interrelation values from the pixel to be processed to the other pixels. However, the interrelation values are not limited to the absolute values.

In this embodiment, as shown in FIG. 32, pixels are selected in the form of a grid from an image, and additional information is embedded in the selected pixels. However, the selection pattern for embedding the additional information is not limited to the grid form. For decoding pixels having embedded additional information, it is preferable to find interrelation by using pixels having no embedded additional information. Basically, interrelation between pixels decreases in proportion to the spatial or temporal distance between the pixels. Accordingly, for performing accurate decoding, it is preferable that pixels in which additional information is embedded be selected so as to have spatially or temporally distances among the pixels. In addition, for embedding a lot of additional information, that is, from the point of view of compression factor, the number of pixels in which additional information is embedded needs to be increased. Therefore, it is preferable to select pixels in which additional information is embedded so that accuracy of decoding and the compression factor can be balanced.

Although in this embodiment, 1-bit additional information is embedded in one pixel selected as a pixel to be processed, additional information having two or more bits can be embedded in one pixel. For example, when 2-bit additional information is embedded in one pixel, one of, for example, 0, $2^6$, $2^7$, $2^6+2^7$ may be added to the pixel level in accordance with the 2-bit additional information.

Although in this embodiment, additional information is embedded by adding one of 0 or $2^7$ (by not adding or adding $2^7$) to the pixel level, the value added to the pixel level is not limited to $2^7$. When adding a value that influences only the lower bits of the pixel level, the result of addition and the original pixel level do not so differ from each other. Accordingly, interrelation values $R_1$ and $R_2$ found in step S115 in FIG. 35 do not so differ from each other. Since this causes deterioration in the precision of the result of decoding the pixel level and additional information, it is preferable that the value added to the pixel level in accordance with the additional information be a value that influences the upper bits of the original pixel level.

Although in this embodiment, the embedding of additional information is performed by adding a predetermined value to a pixel level, the embedding of additional information can be performed by performing processing other than addition on the pixel level, such as bit inversion. As described above, from the point of view of prevention of deterioration in the precision of the result of decoding the pixel level and additional information, it is preferable that the processing on the pixel level be such that interrelation concerning the original pixel level and interrelation concerning the processed pixel level do not so differ from each other.

In this embodiment, 1-bit additional information is embedded in one pixel selected as a pixel to be processed. However, 1-bit additional information can be embedded in a plurality of pixels. For example, in four pixels indicated by the circles shown in FIG. 36, 1-bit additional information can be embedded.

Specifically, in FIG. 36, when noting four pixels, p(1,4), p(5,4), p(1,8), and p(5,8), in encoding, by identically processing the pixel levels of p(1,4), p(5,4), p(1,8), and p(5,8) in accordance with 1-bit additional information, the additional information is embedded. In decoding, concerning each of the four pixels, p(1,4), p(5,4), p(1,8), and p(5,8), interrelation values $R_1$ and $R_2$ of first and second pixel levels $P_1$ and $P_2$ as described above are calculated, and the interrelation values $R_1$ and $R_2$ are compared in magnitude. By performing determination by majority of results of comparison, the results of decoding the pixel levels of the four pixels, p(1,4), p(5,4), p(1,8), and p(5,8), and the additional information may be determined. In addition, by calculating the total sum of interrelation values $R_1$ of first pixel levels $P_1$ and interrelation values $R_2$ of second pixel levels $P_2$ concerning the four pixels, p(1,4), p(5,4), p(1,8), and p(5,8), the result of decoding the pixel level and additional information of each of the four pixels, p(1,4), p(5,4), p(1,8), and p(5,8) may be determined based on the relationship in magnitude between the two total sums.

Here, as shown in FIG. 32, when pixels are selected as pixels to be processed in the form of a grid from an image, and 1-bit additional information is embedded in each of the selected pixels, additional information having a number of bits which is approximately half of the number of pixels constituting the image can be embedded. When 1-bit additional information is embedded in four pixels, as described above, additional information that can be embedded in an image has a number of bits which is ¼ of approximately half of the number of pixels constituting the image.

Next, the continuity of information is described. For example, when noting a line of an image, if a waveform 1301 having a continuous pixel-level-change pattern is observed as shown in the graph (A) of FIG. 37, it is observed that another line at a distance from the noted line has a pixel-level-change pattern different from that of the noted line. Accordingly, the noted line and the line at a distance therefrom have different pixel-level-change patterns, so that there is a distribution of continuity. In other words, noting the pixel-level-change pattern of a portion of an image, a portion adjacent thereto has a similar pixel-level-change pattern, and there is a distribution of continuity in that more different pixel-level-change patterns exist in proportion to the distance from the noted portion.

Figure 37:
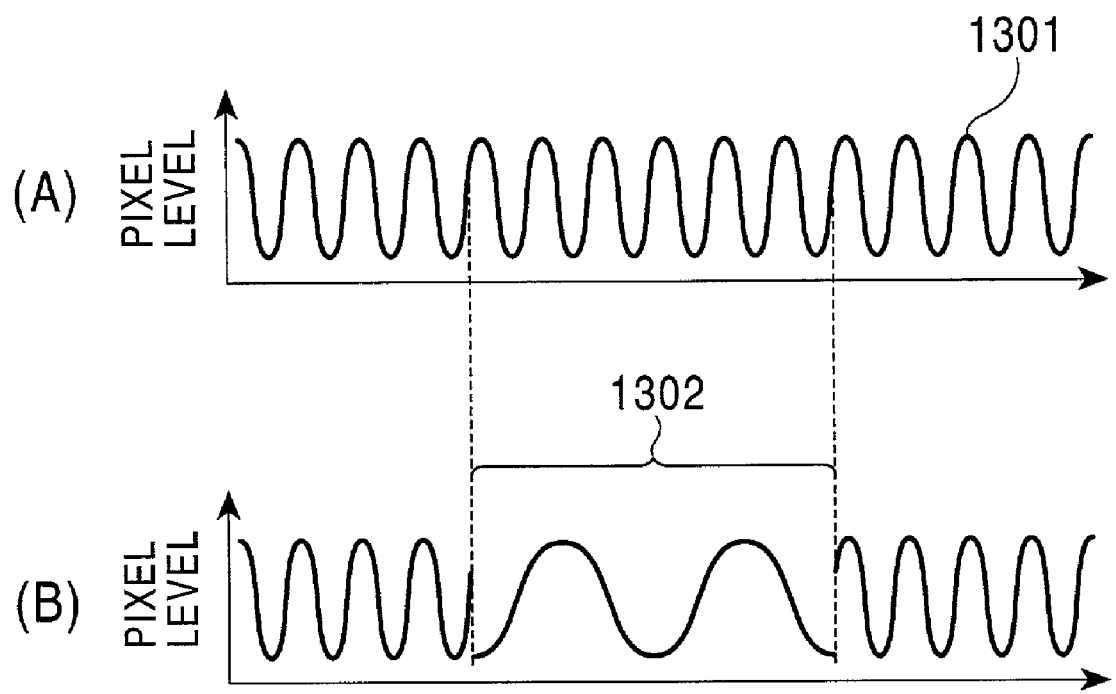
FIG. 37 consists of graphs (A) and (B) illustrating encoding/decoding using continuity.

Accordingly, part of the noted line shown in the graph (A) of FIG. 37, is switched to, for example, the waveform 1302 of the line at a distance from the noted line, as shown in the graph (B) of FIG. 37.

In this case, the distribution of image continuity is lost. However, since an adjacent portion has a continuous pixel-level-change pattern, by using the distribution of continuity in that more pixel-level-change patterns exist in proportion to the distance from the noted portion, the lost distribution of continuity can be restored. In other words, according to the distribution of the original continuity of the waveform, it is obviously unnatural that the change pattern of the pixel level of the waveform part 1302 greatly differs from that of the pixel level of the other waveform part. The waveform part 1302 having the different pixel-level-change pattern must be switched to a waveform having a pixel-level-change pattern similar to that of the other waveform part. By performing this switching, the distribution of continuity is restored, which makes it possible to restore the original waveform shown in the graph (A) of FIG. 37 from the waveform shown in the graph (B) of FIG. 37.

In the case described using FIG. 37, the switching of a waveform part to a waveform having a pixel-level-change pattern greatly different from that of a peripheral pixel level is the encoding of an image. In this encoding, the embedded coding unit 103 determines, in accordance with additional information, for example, in which waveform part the change pattern of the pixel level should be switched, how large the pixel-level-change pattern should be changed, etc. By using the distribution of continuity in which a peripheral pixel has a continuous pixel-level-change pattern and the pixel-level-change pattern differs in proportion to the distance from the noted pixel, the embedded decoding unit 106 restores a signal obtained after encoding, that is, a waveform partly having a greatly different pixel-level-change pattern, to the original waveform, whereby decoding for generating the original waveform is performed. In addition, in the decoding, the embedded decoding unit 106 detects, for example, in which waveform part the pixel-level-change pattern has greatly changed, how large the pixel-level-change pattern has changed, etc., whereby decoding for generating the embedded additional information is performed.

Next, the embedded coding process that uses image continuity to embed additional information in an image so that the embedded additional information can be generated by decoding is described below. A construction of the embedded coding unit 103 is identical to that shown in FIG. 30, and a description thereof is omitted.

Figure 38:
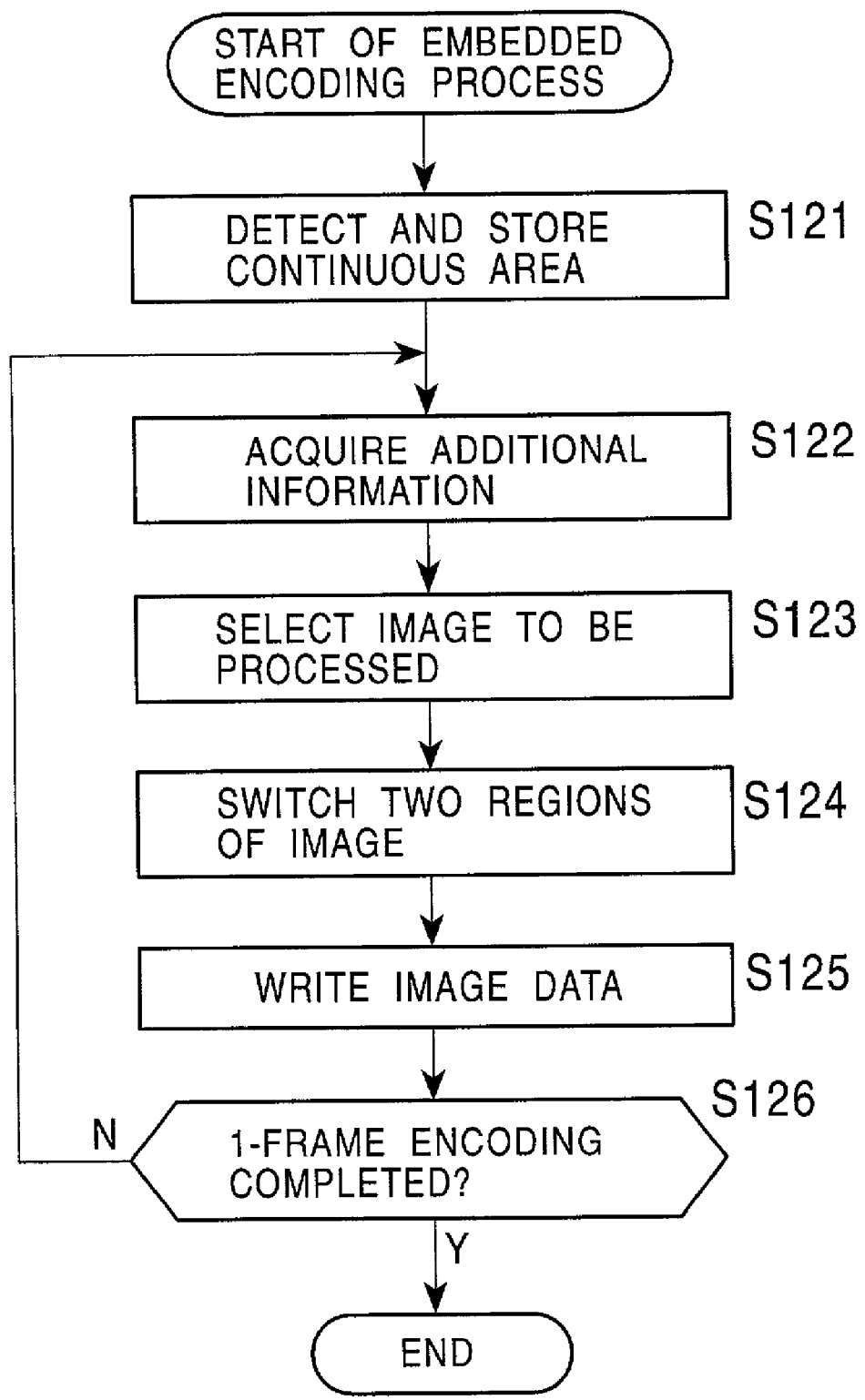
FIG. 38 is a flowchart illustrating an embedded decoding process.

FIG. 38 shows a flowchart showing the embedded coding process using image continuity.

First, in step S121, the CPU 132 controls the embedded coding unit 103 so that image data for one frame is transferred from the image database 101 to the frame memory 131. The CPU 132 detects a continuous area of the image data, and stores, in a work memory (not shown), continuous-area data representing the position of the continuous area.

When the CPU 132 detects a continuous area of image data composed of 224 (equals 7 by 32) by 1600 pixels, the CPU 132 divides the image data into image blocks each having 32 by 1 pixels, and calculates a discrete cosine transform (DCT) coefficient for each image block by performing DCT processing on each image block.

The CPU 132 scans the image blocks in the order of raster scanning and sequentially uses the scanned image blocks as image blocks of reference. The CPU 132 sequentially calculates each difference between a DCT coefficient corresponding to one image block of reference and a DCT coefficient corresponding to a left image block adjacent to the image block of reference. The calculated differences are stored as values of evaluating image-block-of-reference continuity. Each image block in which the calculated value of evaluating image-block-of-reference continuity is not greater than a predetermined threshold value is recognized as a continuos area by the CPU 132, and the position of the image block is stored in the work memory. Here, there is a possibility that the CPU 132 determines, due to influence of noise, etc., that some image block in the calculated continuous area is not a continuous area. Accordingly, after detecting the continuous areas, the CPU 132 performs processing for continuous-area enlargement and reduction, thereby performing correcting processing for converting a non-continuous image block as part of the continuous areas into an image block in the continuous areas.

After that, in step S122, the CPU 132 receives, from the additional information database 102, additional information, for example, every six bits (3 bits+3 bits), and proceeds to step S123.

Figure 39:
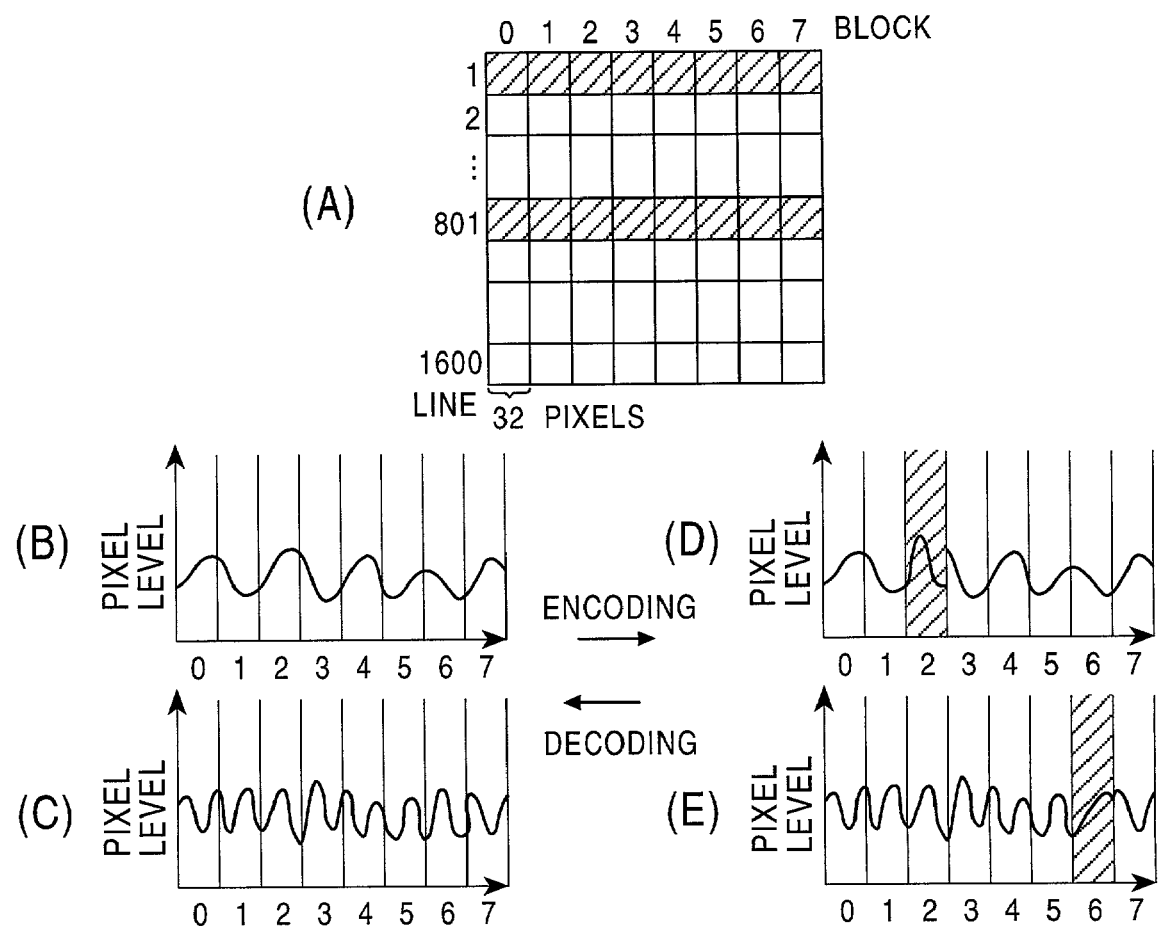
FIG. 39 is an illustration of an embedded coding process and an embedded decoding process.

In step S123, the CPU 132 selectively extracts, for example, the 1st line and the 801st line of the image shown in the illustration (A) of FIG. 39, which are used as image portions to be processed. At this time, by referring to the continuous area data stored in the work memory, the CPU 132 selectively extracts only the continuous areas of the 1st line and the 801st line. In the example shown in the illustration (A) of FIG. 39, the entire areas of the 1st line and the 801st line are selectively extracted.

The CPU 132 proceeds to step S124, and embeds additional information in image data by switching the image portion in the 1st line and the image portion in the 801st line.

The illustration (B) of FIG. 39 shows the pixel level of the image data in the 1st line before the additional information is embedded. The illustration (C) of FIG. 39 shows the pixel level of image data in the 801st line before the additional information is embedded. As shown in the illustrations (B) and (C) of FIG. 39, the 1st-line area and the 801st-line area have different pixel-level-change patterns (frequency characteristics).

By way of example, assuming that additional information which have upper three bits representing "2" and lower three bits representing "6" is embedded in image data, the CPU 132 selects the second block from the left in the illustration (B) of FIG. 39 in order to embed "2" represented by the upper three bits, and selects the sixth block from the left in the illustration (C) of FIG. 39 in order to embed "3" represented by the lower three bits. By switching the image data in the selected second block and the image data in the sixth block, the CPU 132 performs encoding to generate the image data shown in the illustration (D) of FIG. 39 and the image data.

After that, in step S125, the CPU 132 writes (overwrites) the encoded image data corresponding to the 1st and 801st lines in the frame memory 131, and proceeds to step S126.

In step S126, the CPU 132 determines whether or not the encoding of image data for one frame is completed. If the CPU 132 has determined that the encoding has not been completed yet, the CPU 132 goes back to step S122 and receives additional information again. In step S123, the CPU 132 selects the next lines, that is, the 2nd line and the 802nd line, and repeats the same steps.

In step S126, if the CPU 132 has determined that the encoding has been completed, encoded data stored in the frame memory 131 is output via the output I/F 134, and the process ends.

Next, the embedded decoding process that uses image continuity to decode encoded data having embedded additional information is described below. A construction of the embedded decoding unit 106 is identical to that shown in FIG. 33, and a description thereof is omitted.

Figure 40:
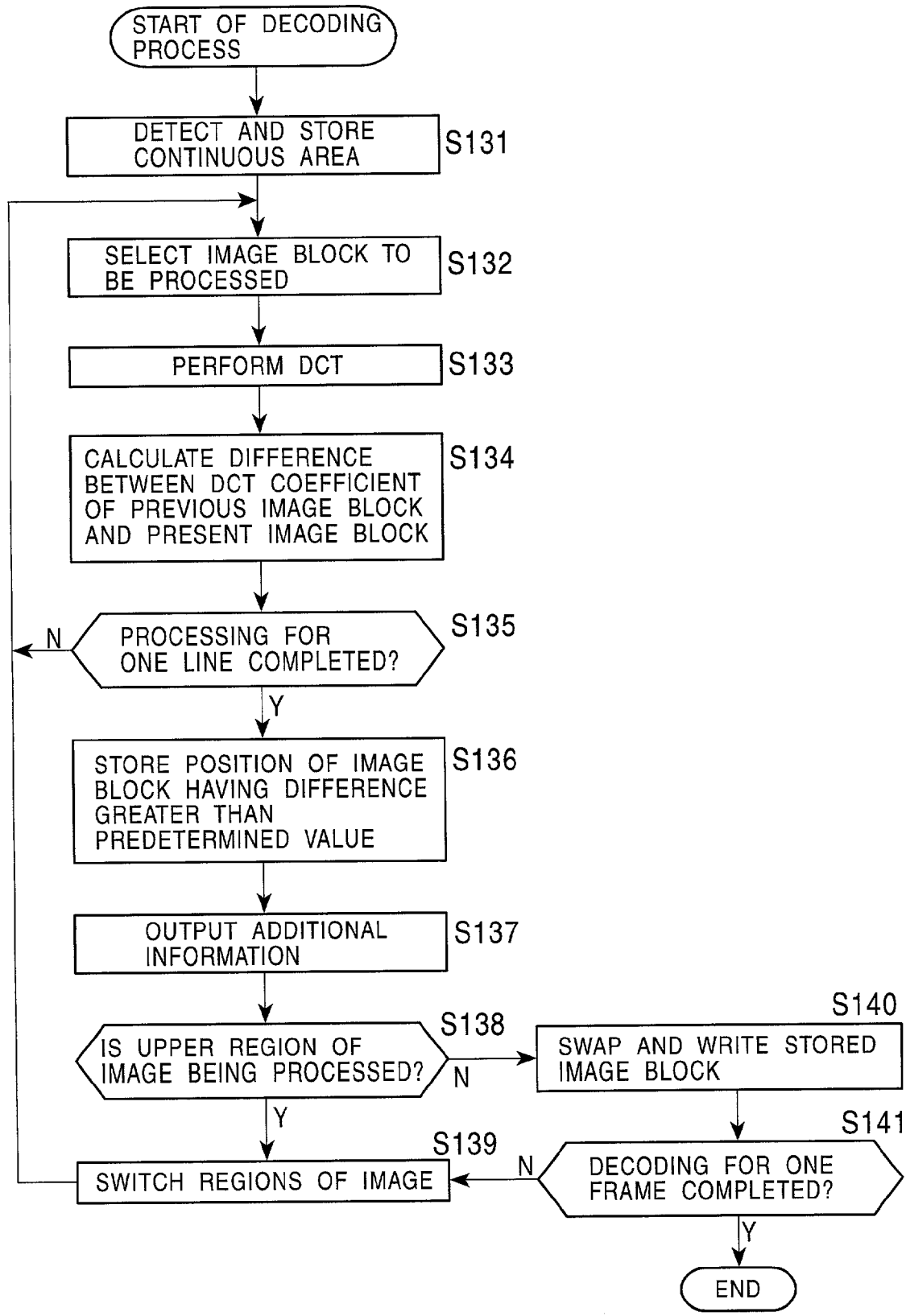
FIG. 40 is a flowchart illustrating an embedded decoding process.

FIG. 40 shows a flowchart showing an embedded decoding process that uses image continuity to decode the encoded data obtained by the embedded coding process shown in FIG. 38.

In step S131, the CPU 143 sequentially stores the encode data in units of frames in the frame memory 141. The CPU 143 uses a technique identical to that described using FIG. 38 to extract a continuos area as image blocks from the encoded data, and stores the position of the image blocks in a work memory (not shown). Here, as described using FIG. 39, 3-bit additional information is embedded in one line. Accordingly, by changing one image block in one line, image data is encoded. Thus, in the continuous area, a non-continuous part corresponding to one image block is converted into part of the continuous area by enlargement and reduction processing performed when the continuous area is extracted.

In step S132, the CPU 143 selectively extracts one image block (e.g., the top left image block shown in the illustration (A) of FIG. 39) as an image to be processed for decoding 6-bit additional information. At this time, in step S131, referring to the continuous area data stored in the work memory, the CPU 143 selectively extracts only image blocks in the continuous area. As described above, the entire areas of the 1st line and the 801st line are selectively extracted as continuous areas.

In step S133, the CPU 143 generates a DCT coefficient by performing DCT processing on the image block extracted in step S132.

In step S134, the CPU 143 calculates a difference value between the DCT coefficient of the previous image block of reference and the DCT coefficient of the present image block of reference, and stores the difference value and the DCT coefficient of the present image block of reference in the work memory. When the DCT coefficient of the previous image block of reference is not stored in the work memory, the difference value is zero.

In step S135, the CPU 143 determines whether or not processing for one line has been completed. If the processing has not been completed yet, the CPU 143 goes back to step S132. If the CPU 143 has determined in step S135 that the processing has been completed, the CPU 143 proceeds to step S136.

In step S136, among the image blocks corresponding to one line which are stored in the work memory, two image blocks each having a large difference value as described above are detected by the CPU 143. The CPU 143 stores the positions of the detected image blocks in the work memory.

In step S137, among the image blocks corresponding to one line which are stored in the work memory, the two image blocks, which each have a difference value not less than a predetermined value, are used to output additional information by the CPU 143. When the two image blocks are adjacent to each other, the position of the left image block is stored in the work memory and is output as additional information by the CPU 143. For example, in the case shown in the illustration (D) of FIG. 39, the second and third image blocks from the left have large difference values, and the second image block corresponds to the left image block. Thus, "2" is used as additional information.

Here, when additional information is embedded in 0th image block or the 7th image block from the left, it is highly possible that the number of image blocks having a difference value not less than the predetermined value will be one. Accordingly, when only the 1st image block has a large difference value, "0" is used as additional information, and when only the 7th image block has a large difference value, "7" is used as additional information, whereby special processing is performed for the border between image data.

In step S138, the CPU 143 determines whether either an upper region of image from the 1st line to the 800th line (in the illustration (A) of FIG. 39) or a lower region of image from the 801st line to the 1600th line (in the illustration (A) of FIG. 39) is to be presently processed. If the CPU 143 has determined that the upper image part is to be presently processed, the CPU 143 proceeds to step S139, and switches the image processing region from the upper region to the lower region. Specifically, when the line being presently processed is, for example, the 1st line, "800" is added to the line number, and the obtained 801st line is to be processed. After switching the upper region to the lower region, the CPU 143 goes back to step S132.

In step S138, if the CPU 143 has determined that the lower region is to be presently processed, the CPU 143 proceeds to step S140. In step S140, the CPU 143 switches the positions of the two image blocks last stored in step S137, and stores the switched positions in the frame memory 141.

In step S141, the CPU 143 determines whether image-data decoding for one frame has been completed. If the CPU 143 has determined that the image-data decoding has not been completed yet, the CPU 143 proceeds to step S139. In step S139, the image processing region is switched from the lower region to the upper region, and the same steps are performed. If the CPU 143 has determined that the image-data decoding has been completed, the process ends.

Image data stored in the frame memory 141, which is decoded to reproduce the original image, may be sequentially output every two lines such as the 1st line and the 801st line via the output I/F 142, and may be output from the output I/F 142 after decoding for all lines is completed.

Figure 41A:
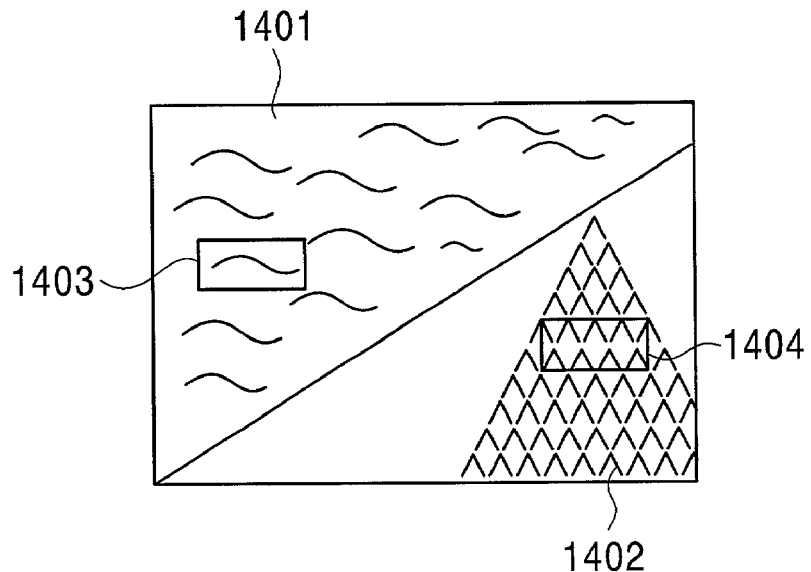
FIGS. 41A and 41B are illustrations of encoding/decoding using similarity.

Next, concerning similarity of image, for example, the generation of part of an image photographing a scene by using fractality (selfsimilarity) of image is known. By way of example, in an image in which the sea 1401 and a wood 1402 are photographed as shown in FIG. 41A, there is a distribution of similarity in that the pixel-level-change pattern of the entirety of the sea 1401 and the pixel-level-change pattern of part of the sea 1401 have high similarity, and these pixel-level-change patterns and the pixel-level-change pattern of the pixel level of the wood 1402 having a distance from the sea 1401 have low similarity. Here, the similarity of image may be considered not by comparing the pixel-level-change patterns, as described above, but by comparing edge shapes.

Accordingly, in FIG. 41A, a portion 1403 of the sea 1401 and a portion 1404 of the wood 1402 are switched.

Figure 41B:
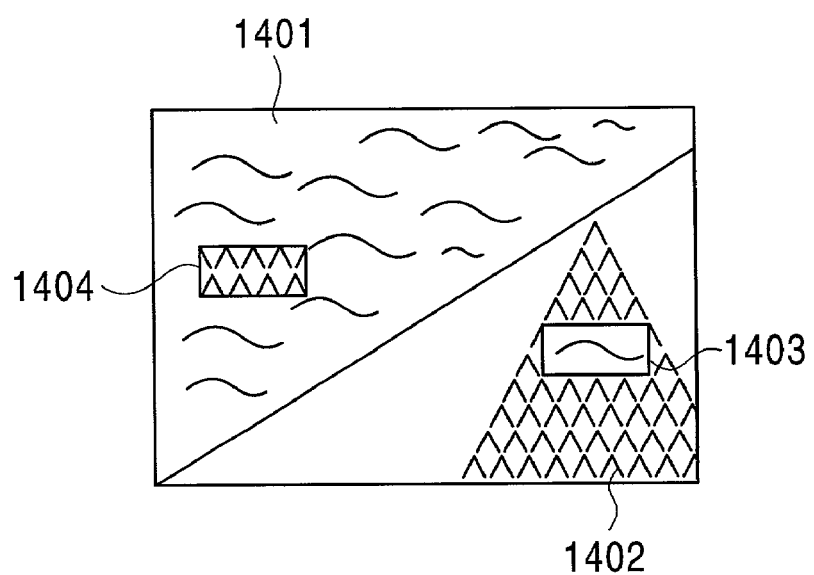

In this case, the distribution of similarity of image is lost, so that an image as shown in FIG. 41B is obtained. However, by using the distribution of similarity in which the pixel-level-change patterns of adjacent portions have high similarity and portions having a larger distance from each other have lower similarity in the pixel-level-change pattern, the lost distribution of similarity can be restored. According to the original distribution of the image, it is obviously unnatural that in FIG. 41B, a portion of the sea 1401 is the portion 1404 of the wood 1402 having low similarity to the sea 1401, and it is obviously unnatural that a portion of the wood 1402 is the part 1403 of the sea 1401 having low similarity to the wood 1402. Specifically, in FIG. 41B, similarity of the image of the sea 1401 to the portion 1404 of the image of the wood 1402 is extremely lower than similarity to the other portions of the sea 1401, and similarity of the image of the wood 1402 to the portion 1403 of the image of the sea 1401 is extremely lower than similarity to the other portions of the wood 1402.

Therefore, according to the original distribution of similarity in the image, the portion 1404 of the image of the wood 1402, which is included in the image of the wood 1401, and the portion 1403 of the image of the sea 1401, which is included in the image of the wood 1402, must be switched. By performing the switching, the distribution of similarity of image can be restored. This makes it possible to restore the original image shown in FIG. 41A from the image shown in FIG. 41B.

In the case described using FIGS. 41A and 41B, the switching of the portion 1403 of the image of the sea 1401 and the portion 1404 of the image of the wood 1402 is the encoding of an image. In this encoding, the embedded coding unit 103 determines, in accordance with additional information, which portion of the image of the sea 1401 and which portion of the image of the wood 1402 should be switched. By using the distribution of similarity in which the pixel-level-change patterns of adjacent portions have high similarity and portions having a larger distance from each other have lower similarity in the pixel-level-change pattern, the embedded decoding unit 106 decodes an encoded signal, that is, restores the original image from the image in which part of the sea 1401 is the portion 1404 of the wood 1402 and part of the wood 1402 is the portion 1403 of the sea 1401, whereby the original image is reproduced. In addition, in the decoding, it is the decoding of the embedded additional information that the embedded decoding unit 106 determines which portion of the image of the sea 1401 and which portion of the image of the wood 1402 have been switched.

With reference to FIGS. 42A and 42B, the similarity is further described below.

By way of example, when a fractal image as shown in FIG. 42A is encoded, the embedded coding unit 103 switches, in response to additional information, a portion of the fractal image to an image that is not similar to the fractal image, thereby encoding the fractal image. Specifically, the embedded coding unit 103 switches portions of the fractal image having leaf shapes to, for example, triangles as shown in FIG. 42B. In FIG. 42B, portions denoted by D1 and D2 are triangular. In accordance with the additional information, the embedded coding unit 103 determines, for example, the position of each fractal image which is switched to a triangle, the size of each triangle to which the fractal image is switched, the number of triangles for switching, etc.

In this case, the embedded decoding unit 106 decodes the fractal image and the additional information in the following manner. For example, in FIG. 42B, without switching a portion surrounded by the dotted-line square to a triangle, the embedded decoding unit 106 treats the dotted-line-square portion as a training image, and retrieves each portion (a triangle in this case) which is not similar to the training image. Also, by switching the triangle as a portion which is not similar to the training image to an image generated from a reference figure for the fractal image, which is included in the training image, the embedded decoding unit 106 reproduces the original fractal image (FIG. 42A). Based on the retrieved positron and size of each triangle, the number of triangles, etc., the embedded decoding unit 106 decodes the embedded additional information.

In the above-described case, it is required that the embedded decoding unit 106 detects the reference figure for the fractal image, which is included in the training image. This detection is performed, for example, as follows: based on similarity between the training image and the other portions in the image shown in FIG. 42B, and selfsimilarity of the training image, a reference figure for a fractal image is retrieved from the image shown in FIG. 42B, and a figure that most efficiently indicates a portion other than the training image is detected as the reference figure.

The embedded decoding unit 106 recognizes rules for generating the original fractal image. Based on the generating rules, the embedded decoding unit 106 uses the reference figure to generate an image to which the triangle is switched. In other words, based on the generating rules, the embedded decoding unit 106 specifies, the size, position, and rotation of the reference figure for generating an image to which the triangle is switched, and generates an image (fractal image) to which the triangle is switched, by manipulating the reference figure in accordance with the specified size, position, and rotation of the reference figure.

Next, the embedded coding process that uses image similarity to embed additional information in an image so that the embedded additional information can be restored is described below. Also, in this case, a construction of the embedded coding unit 103 is identical in structure to that shown in FIG. 30, and a description thereof is omitted.

Figure 43:
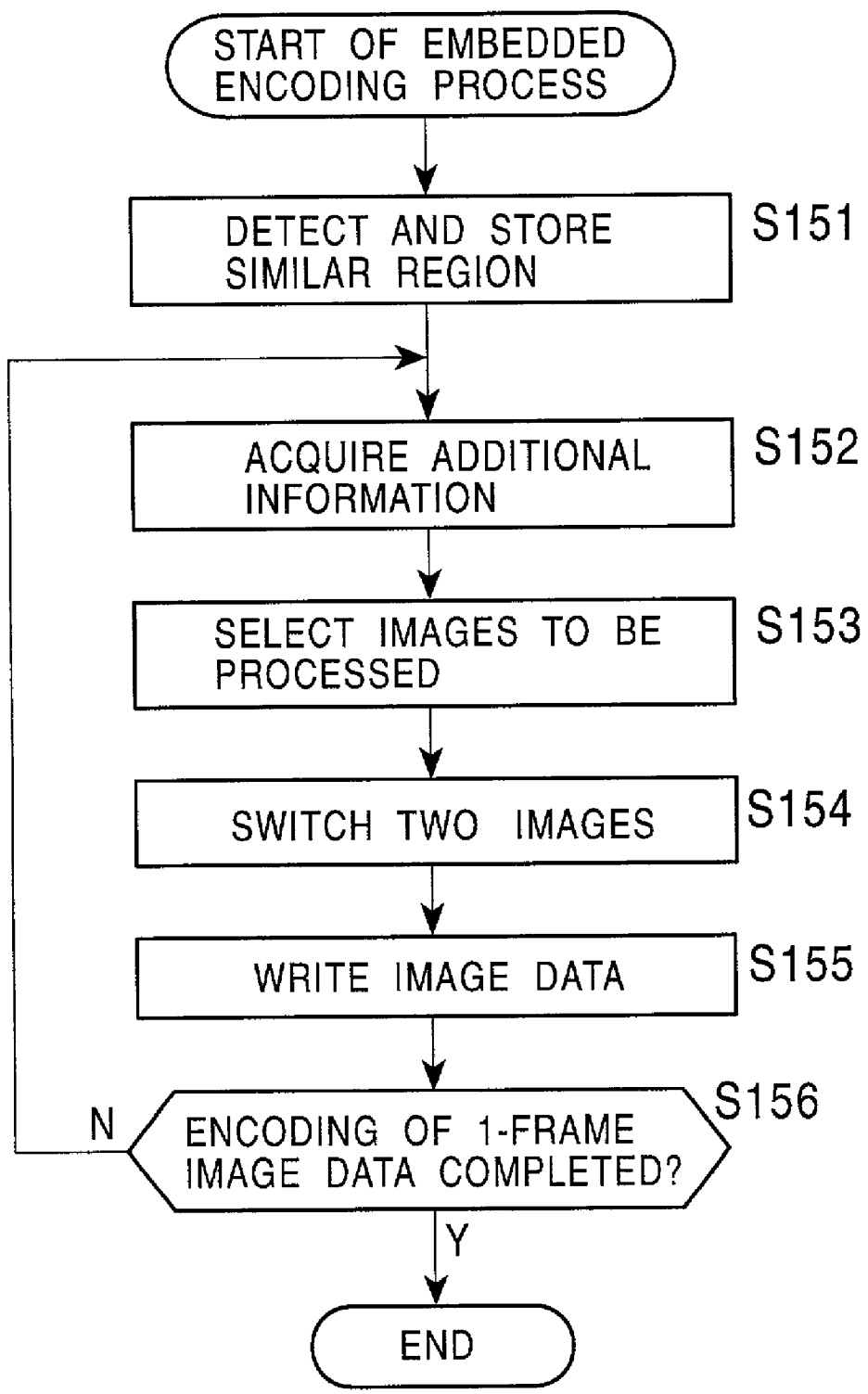
FIG. 43 is a flowchart illustrating an embedded coding process.

FIG. 43 is a flowchart showing an embedded coding process using similarity.

In step S151, under control of the CPU 132, image data for one frame is transferred from the image database 101 to the frame memory 131, a similar region of the image data is detected, and similar-region data representing the position of the similar region is stored in the work memory.

Specifically, when the CPU 132 detects, from the image data, a similar region of the image data which is composed of 56 by 1600 pixels, the CPU 132 divides the image data into image blocks each having 8 by 8 pixels, and detects similarity between an image block of reference and peripheral image blocks.

In other words, the CPU 132 scans image blocks of reference in the order of raster scanning and calculates similarity of each image block of reference to right and left peripheral image blocks. Specifically, the CPU 132 performs matching with right and left adjacent image blocks, while changing a predetermined amount in each of the size, position, and rotation of the image block of reference, and normalizing the degrees of matching. The CPU 132 averages the normalized degrees of matching, and stores, in the work memory, the averaged degree as similarity-evaluation value with respect to the periphery of the image block of reference. Here, when the right-end and left-end image blocks are used as image blocks of reference, the degree of matching for one image block is unchanged and used as the degree of matching for the other image block. The CPU 132 recognizes, as a similar region, each image block having a calculated similarity-evaluation value (the degree of matching) not less than a predetermined threshold value, and stores the position of the similar region in the work memory. At this time, there is a possibility that some image block in the recognized similar regions can be regarded as a nonsimilar region. Accordingly, after detecting the similar regions, the CPU 132 performs correcting processing for converting the nonsimilar region in the similar regions into an image block as a similar region by performing processing for similar region enlargement and reduction.

In step S152, the CPU 132 receives the additional information from the additional information database 102 in, for example, units of 6 bits (3 bits+3 bits).

Figure 44:
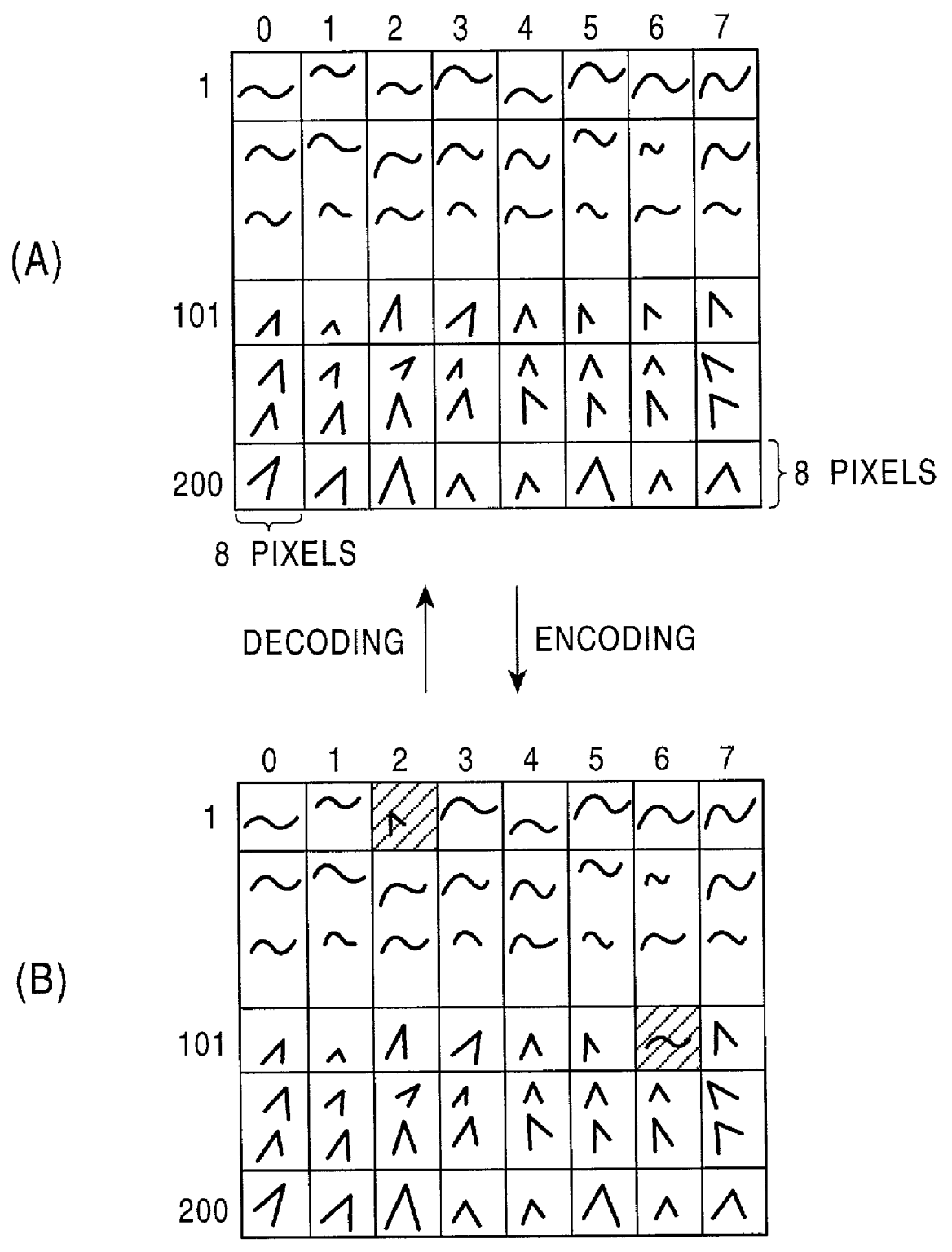

In step S153, the CPU 132 selectively extracts, for example, the 1st line and the 101st line shown in the illustration (A) of FIG. 44, which are image blocks in which the above 6-bit additional information is embedded. At this time, by referring to the similar region data stored in the work memory in step S151, the CPU 132 selectively extracts only the similar regions in the 1st line and 101st line. In the example shown in the illustration (A) of FIG. 44, all the regions in the 1st line and 101st line are selectively extracted as similar regions.

In step S154, the CPU 132 embeds additional information in the image data by switching the image blocks in the 1st line and the image blocks in the 101st line.

In other words, the illustration (A) of FIG. 44 shows the pixel levels of the image data in the 1st line and the 101st line before the additional information is embedded. As shown in the illustration (A) of FIG. 44, the regions in the 1st line and the 101st line have different pixel-level-change patterns, namely, different types of figure similarity in image block.

By way of example, assuming that in the 6-bit additional information the upper three bits represents "2" and the lower three bits represents "6", the CPU 132 selects the 2nd block in the 1st line in the illustration (A) of FIG. 44 in order to embed "2" of the upper three bits, and selects the 6th block in the 101st line in order to embed "6" represented by the lower three bits. Also, by switching the image data in the selected 2nd block and the image data in the selected 6th block, the CPU 132 performs encoding to generate the image data shown in the illustration (B) of FIG. 44.

In step S155, the CPU 132 writes (overwrites), in the frame memory 131, the encoded data in the 1st and 101st lines, and proceeds to step S156.

In step S156, the CPU 132 determines whether the encoding of image data for one frame has been completed. If the CPU 132 has determined that the encoding has not been completed yet, the CPU 132 goes back to step S152, and receives additional information again. In step S157, the CPU 132 sequentially selects the next image portions in the 2nd line and the 102nd line.

In step S156, if the CPU 132 has determined that the encoding has been completed, the encoded data stored in the frame memory 131 is output via the output I/F 134, and the process ends.

Next, an embedded decoding process that uses image similarity to decode encoded data having embedded additional information is described below. Also in this case, a construction of the embedded decoding unit 106 is identical to that shown in FIG. 33, and a description thereof is omitted.

Figure 45:
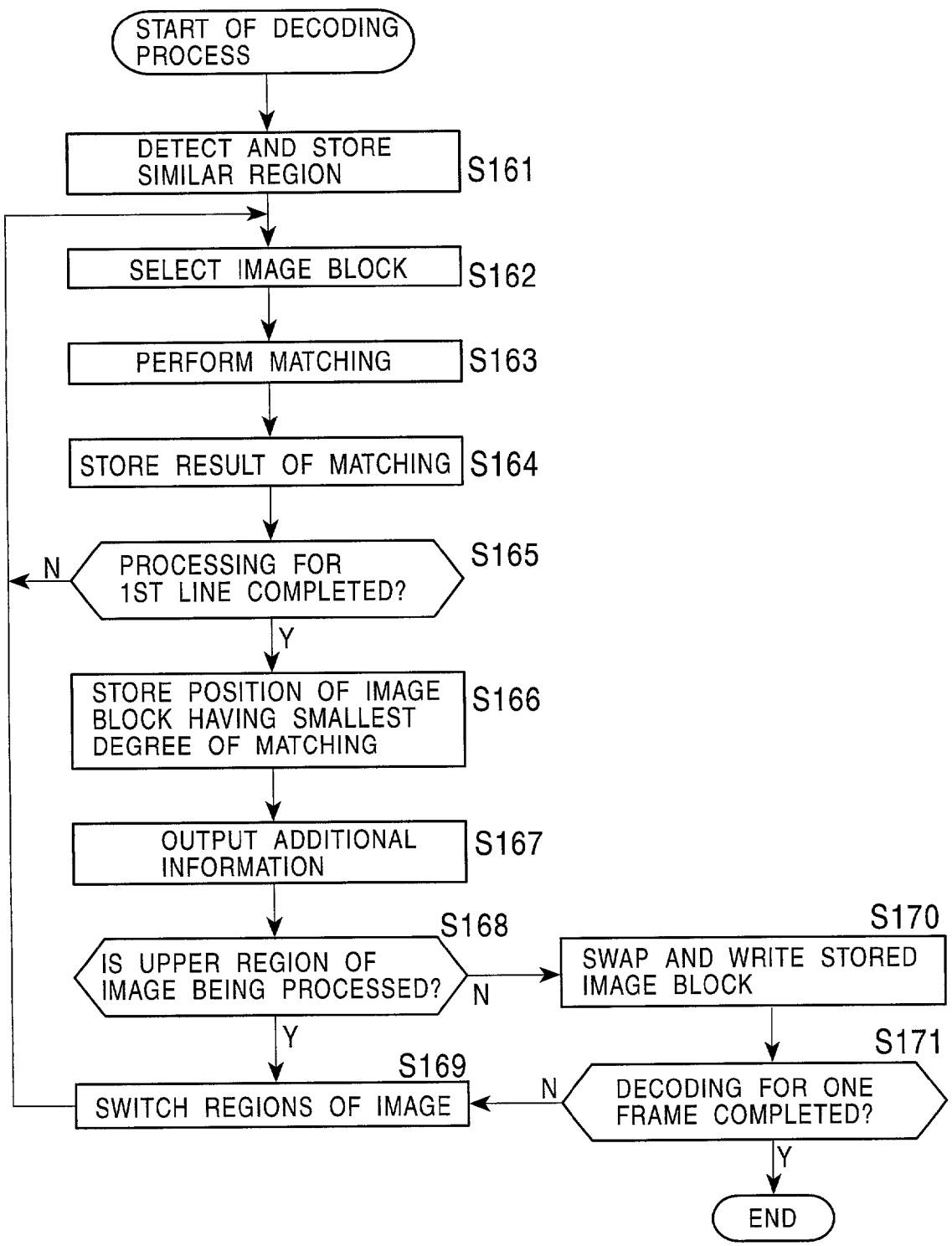
FIG. 45 is a flowchart illustrating an embedded decoding process.

FIG. 45 is a flowchart illustrating the embedded decoding process using image similarity.

In step S161, the CPU 143 sequentially stores, in the frame memory 141, encoded data in units of frames. The CPU 143 uses a technique identical to that described in FIG. 43 to extract image blocks as similar regions from the encoded data, and stores the positions of the image blocks as similar region data in the work memory. In this embodiment, 3-bit data is embedded in one line corresponding to eight pixels, as described above. Thus, image data is encoded such that in one line corresponding to eight pixels, one image block is changed. Hence, one nonsimilar image block in the similar region is converted into a similar region by performing enlarging and reducing processing for similar region extraction.

In step S162, the CPU 143 selectively extracts an image block to be processed which is used for decoding 6-bit additional information, for example, one image block (e.g., the top left-end image block) in the illustration (A) of FIG. 44. At this time, in step S161, by referring to the similar region data stored in the work memory, the CPU 143 selectively extracts only image blocks in the similar regions. Here, for example, the entire areas in the 1st line and the 101st line are regarded as similar regions and are selectively extracted.

In step S163, the CPU 143 treats the image block extracted in step S162 as an image block of reference, and calculates similarity of the image block of reference to right and left peripheral image blocks. In other words, the CPU 143 performs matching with the right and left peripheral image blocks, while changing each of the magnitude, position, and rotation of the image block of reference by a predetermined amount, and normalizes and averages the degree of matching. In step S164, the work memory stores the average value is stored as a value of evaluating the similarity of the image block of reference to the periphery. Here, when the right-end and left-end image blocks are used as image blocks of reference, the degree of matching of one image block is unchanged and used as the degree of matching of the image block of reference.

Although the average value of the degrees of matching of the image block of reference to the right and left image blocks is stored, the smaller degree may be stored.

In step S165, the CPU 143 determines whether processing for the 1st line has been completed. If the processing has not been completed yet, the CPU 143 goes back to step S162, and repeats the processing. In step S165, if the CPU 143 has determined that the processing has been completed, the CPU 143 proceeds to step S166.

In step S166, the CPU 143 stores, in the work memory, the position of an image block having the smallest degree of matching among the degrees of matching of the image blocks in the 1st line which are stored in the work memory.

In step S167, the CPU 143 outputs additional information based on the position of the image block which is stored in step S166. For example, in the illustration (B) of FIG. 44, an image block having the smallest degree of matching is the 2nd image block. As a result, "2" is used as additional information.

In step S168, the CPU 143 determines which of the upper image region from the 1st to 100th lines and the lower image region from the 101st to 200th lines is being processed. If the CPU 143 has determined that the upper image region is being processed, the CPU 143 proceeds to step S169, and changes the image processing region from the upper region to the lower region. Specifically, when, for example, the 1st line is being processed, the CPU 143 adds 100 to the line number and uses the 101st line for processing. After the upper region is switched to the lower region, the CPU 143 goes back to step S162, and the same steps are repeatedly performed.

In step S168, if the CPU 143 has determined that the lower image region is being processed, the CPU 143 proceeds to step S170. In step S170, two image blocks finally stored in step S167 which correspond to two positions are switched, and the switched image blocks are stored in the frame memory 141.

In step S171, the CPU 143 determines whether decoding of image data for one frame has been completed. If the CPU 143 has determined that the decoding has not been completed yet, the CPU 143 proceeds to step S169, and repeats the same processing. In step S171, if the CPU 143 has determined that the decoding has been completed, the decoding process ends.

The image data that is decoded to reproduce the original image and that is stored in the frame memory 141 may be output via the output I/F 142 for each set of two lines such as the 1st line and the 101st line, or may be output from the output I/F 142 after all of the decoding processing is completed.

In the above-described case in which in order that the embedded coding unit 103 may perform decoding using the distribution of energy of an image to be encoded, the image is encoded in accordance with additional information and the encoded data is output, the embedded decoding unit 106 decodes, by using the distribution of the image, the encoded data into the original image and additional information, without any overhead for decoding.

In addition, by embedding additional information in an image to be encoded, an image obtained by performing the embedding is an image different from the original image and is an image that cannot be recognized as valuable information by man. Thus, encryption of an image to be encoded is realized without any overhead.

Moreover, completely reversible electronic watermarking is realized. In conventional electronic watermarking, lower bits of a pixel level which do not so influence image quality are simply changed before the lower bits correspond to electronic watermarking. In this case, it is impossible to restore the low bits to the original values. Accordingly, the image quality of a decoded image deteriorates, to no small extent, due to the change of the lower bits as electronic watermarking. Conversely, when encoded data is decoded using the distribution of energy of the original image, the original image having no deterioration and additional information can be obtained. Therefore, by using additional information as an electronic watermark, electronic-watermark-caused deterioration in the image quality of the decoded image is eliminated.

The embedded advertisement information can be extracted by decoding the encoded data to generate an image. Thus, side information can be provided without any overhead, together with the result of encoding an image. In other words, without any overhead for extracting additional information, the additional information can be embedded, so it may be said that encoded data obtained by the embedding is compressed (embedded-compressed) for the amount of the additional information. Accordingly, when a half of an image is used as part to be encoded, and the other half is used as additional information, the other half can be embedded in the half of the image, so that the image is simply compressed to a half.

Since the encoded data is decoded by using the distribution of energy of the original image, that is, a statistic, strong durability against error is obtained. In other words, robust encoding (statistical encoding) which is encoding having high robustness is realized.

The encoded data is decoded by using the distribution of energy of the original image. Thus, concerning, for example, an image, the higher the activity of the image or the lower the redundancy of the image, the more the amount of additional information capable of being embedded. As described above, it may be said that encoded data obtained by embedding additional information is compressed by the amount of the additional information. From a point of compression, according to a method (embedded coding method) in which in order that decoding may be performed by using the distribution of energy of information to be encoded, the information is encoded, the higher the activity of an image or the lower the redundancy of the image, the higher the compression factor of the image. In this respect, the embedded coding method greatly differs from conventional encoding methods. In a conventional method, for example, in the MPEG method, basically, the higher the activity of the image or the lower the redundancy of the image, the lower the compression factor of the image.

Moreover, in addition to the above-described encoding of an image, by using a format different from an image, for example, sound, an image can be provided by using the sound as a key. For example, in the encoding apparatus 110, "Open Sesame" spoken by a contract person is embedded as additional information in an image. In the decoding apparatus 120, a user is requested to speak "Open Sesame", and the speech and the speech embedded in the image are used to identify a speaker. In this method, for example, only when the user is the person to the contract as a result of identifying the speaker, the image can be automatically displayed. In this case, not so-called "characteristics parameters" but sound waves themselves can be used as the speech as the additional information.

In addition to the encoding of sound, by using a format different from sound as additional information, sound can be provided using an image as a key, such as speech response after recognition of a face. Specifically, in the encoding apparatus 110, the image of the face of a user is embedded in speech as a response to the user, and in the decoding apparatus 120, the face of the user is photographed, and the speech having the embedded face image matching the photographed image is output, whereby a speech response system that performs different speech response for each user is realized.

In addition, in information having a format, other information having the same format can be embedded, such as the embedding of speech in speech, and the embedding of an image in an image. Otherwise, by embedding speech and face image of a contract person in an image, a double key system, etc., is realized in which only when user's speech and face image match those embedded in the image, the image can be displayed.

Moreover, in a synchronized picture and sound which constitute a television broadcast signal, one can be embedded in the other. In this case, so-called "integrated encoding" is realized in which various types of information having different formats are integrated.

In the embedded coding method, as the distribution of energy of information has more characteristics, more information can be embedded, as described above. Therefore, for example, when there are two pieces of information, by adaptively selecting one piece having a characteristic distribution of energy, and embedding the other piece in the selected piece, the total amount of data can be controlled. In other words, between two pieces of information, one piece of information can absorb the amount of information of the other piece. As a result of control of the total amount of data, information transmission (environment-adapted network transmission) adapted for the transmission band and operating condition of a transmission link and other transmission environments can be performed.

By way of example, by embedding in an image a reduced image thereof (or by embedding, in sound, the result of reducing the sound in amount), layered encoding is realized in which information in lower layers is reduced to generate information in upper layers.

For example, by embedding, in a first image, a second image as a key for retrieving the first image, a database that retrieves the first image based on the second image as the key is realized.

Figure 46:
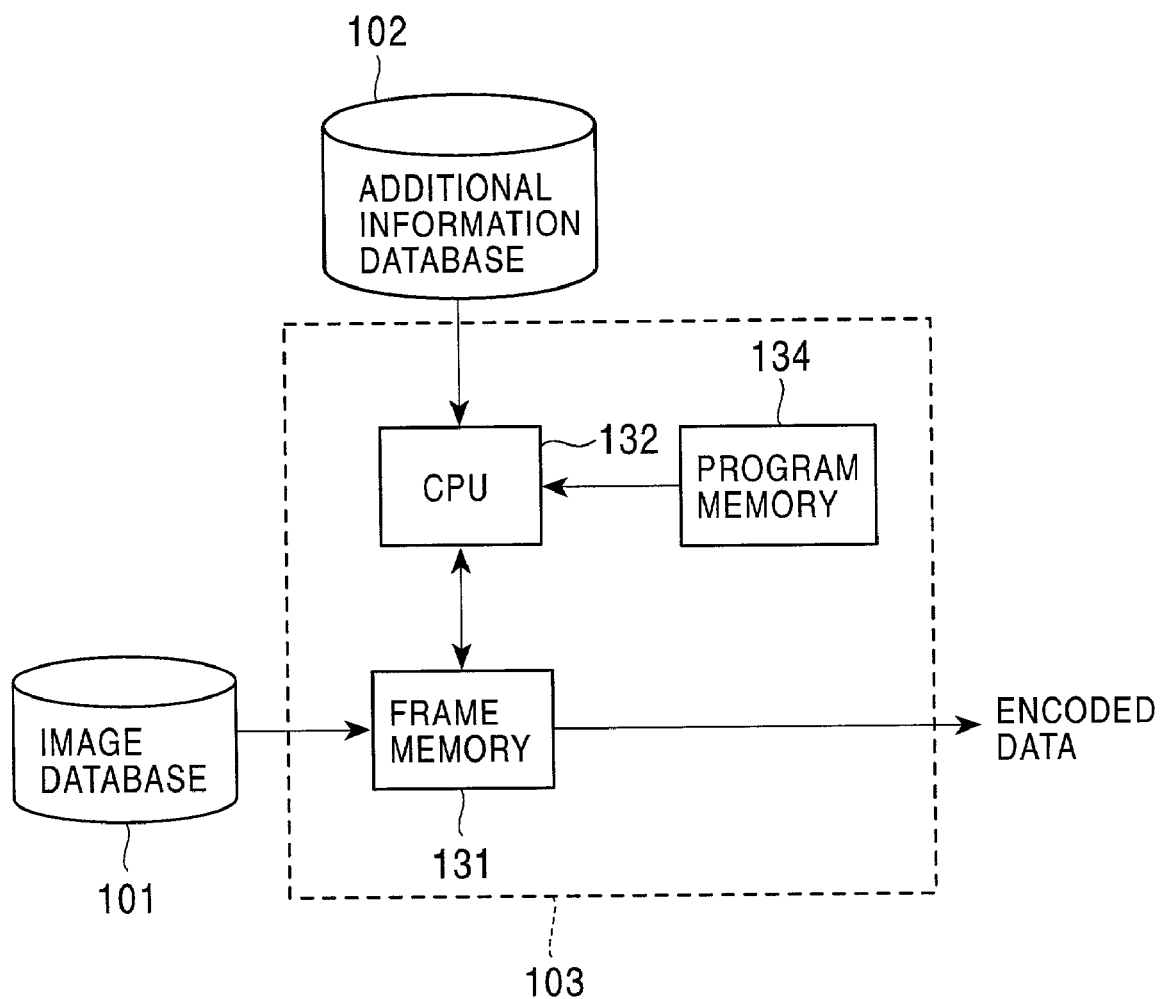
FIG. 46 is a block diagram showing a hardware configuration of the embedded coding unit 103.

Next, FIG. 46 shows another hardware configuration of the embedded coding unit 103 when it performs embedded coding for embedding additional information in an image so that the original image can be restored using image interrelation.

The embedded coding unit 103 shown in FIG. 46 is identical in structure to that shown in FIG. 30, except that the output I/F 133 is not provided.

An image is supplied from an image database 101 to a frame memory 131. The frame memory 131 temporarily stores the image in, for example, units of frames.

A CPU 132 performs an embedded coding process (described later) by executing a program stored in a program memory 134. In other words, in accordance with the program stored in the program memory 134, the CPU 132 receives additional information supplied from an additional information database 102, and embeds the additional information in the image stored in the frame memory 131. Specifically, the CPU 132 switches (swaps), based on the additional information, the positions of pixels constituting the image stored in the frame memory 131, for example, in units of columns (columns of vertically arranged pixels), thereby embedding the additional information in each column of pixels. The image having the embedded additional information is output as encoded data.

The program memory 134 is made of, for example, a ROM or a RAM, and stores a computer program for controlling the CPU 132 to perform embedded coding.

Figure 47:
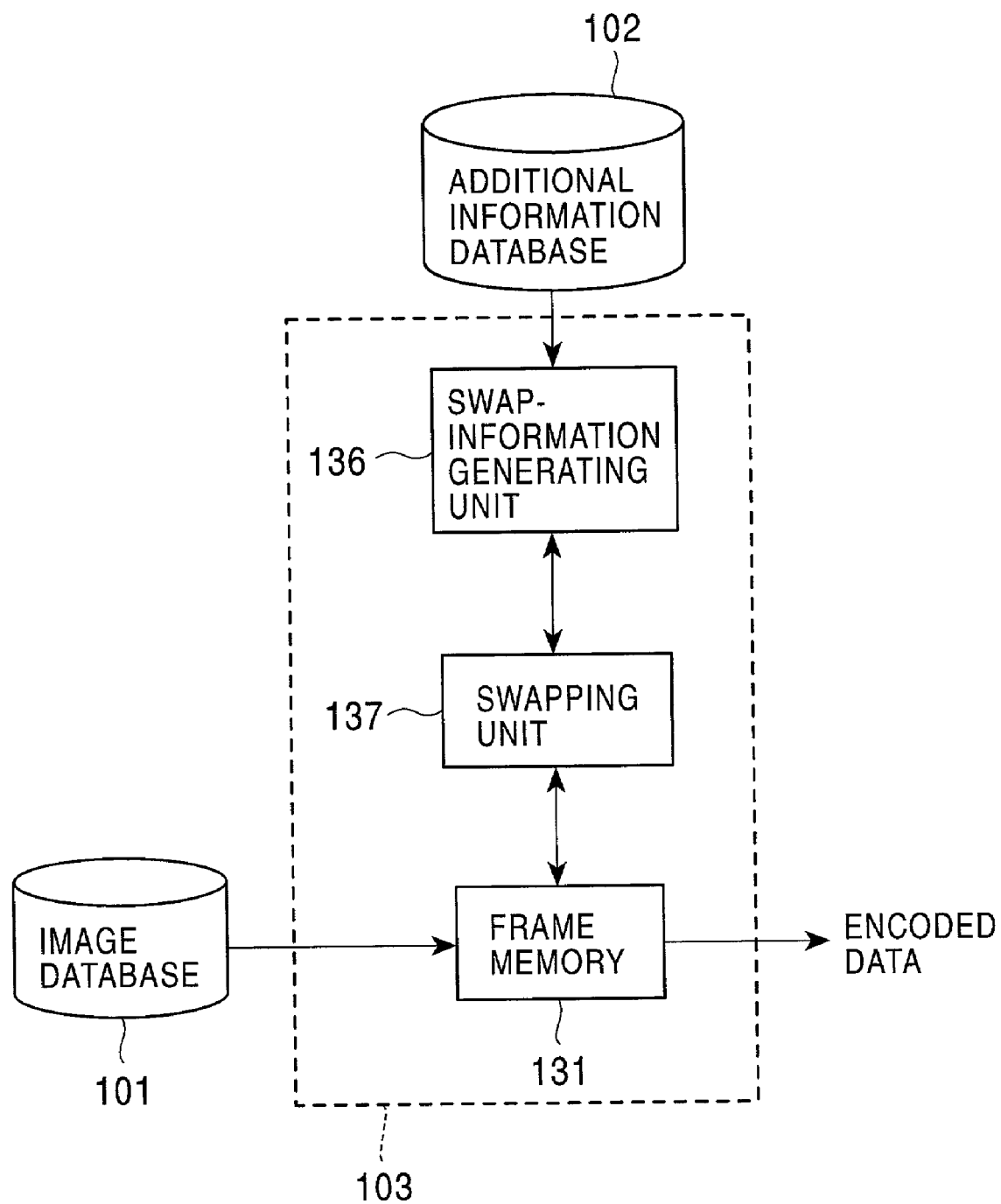
FIG. 47 is a block diagram showing a functional construction of the embedded coding unit 103.

FIG. 47 shows a functional construction of the embedded coding unit 103 shown in FIG. 46. The functional construction shown in FIG. 47 can be formed such that the CPU 132 executes a computer program stored in the program memory 134.

As described using FIG. 46, the frame memory 131 temporarily stores the image supplied from the image database 101.

A swap-information generating unit 136 can read additional information from the additional information database 102, and can generate, based on the additional information, swap information indicating how the positions of columns of the 1-frame image stored in the frame memory 131 should be switched. In other words, in a case in which the 1-frame image is formed by M rows of pixels by N columns of pixels, when the n-th column of pixels in the image is switched to the n'-th column, the swap-information generating unit 136 generates swap information in which n and n' are correlated to each other, where each of n and n' is an integer not less than 1 and not greater than N.

Here, when the 1-frame image has N columns, and all the N columns are to be switched, the number of ways of the switching is N!, where N! represents a fractorial. Thus, in this case, in one frame, additional information having a maximum of log 2(N!) bits can be embedded.

The swap information generated by the swap-information generating unit 136 is supplied to a swapping unit 137. In accordance with the swap information supplied from the swap-information generating unit 136, the swapping unit 137 switches the positions of the columns of the 1-frame image stored in the frame memory 131.

Next, with reference to the flowchart shown in FIG. 48, the embedded coding process performed by the embedded coding unit 103 shown in FIG. 47 is described below.

An image is read from the image database 101 and is sequentially supplied and stored in the frame memory 131.

In step S181, the swap-information generating unit 136 reads, from the additional information database 2, additional information having an amount of data which can be embedded in a 1-frame image. In other words, for example, as described above, when the 1-frame image has N columns, and all the N columns are to be switched, additional information having a maximum of log 2(N!) bits can be embedded in one frame. Accordingly, additional information having a number of bits not greater than log 2(N!) is read from the additional information database 102.

Proceeding to step S182, the swap-information generating unit 136 generates swap information based on the additional information read in step S181. Based on the additional information, the swap-information generating unit 136 generates swap information indicating for which columns, for example, the 2nd to N-th columns excluding the 1st column should be switched among the 1st to N-th columns of the frame to be processed which is stored in the frame memory 131. The generated swap information is supplied to the swapping unit 137.

When receiving the swap information from the swap-information generating unit 136, the swapping unit 137 proceeds to step S183, and swaps the positions of the columns of the frame to be processed which is stored in the frame memory 131. The frame having the swapped positions of the columns is read from the frame memory 131, and is output as encoded data.

The swapping of the positions of the columns of the frame can be performed by changing positions at which (pixels constituting) image data are stored in the frame memory 131. However, for example, by controlling addresses when the frame is read from the frame memory 131, a frame having resultant swapped positions of columns may be read from the frame memory 131.

In this embodiment, although the swap information includes the information indicating for which columns the 2nd to N-th columns should be swapped, it does not include information indicating for which column the 1st column should be swapped. Accordingly, the swapping unit 137 performs swapping of the 2nd to N-th columns, but does not perform swapping of the 1st column.

After the swapping of all the 2nd to N-th columns of the frame to be processed is completed, the process proceeds to step S184, and determines whether the frame memory 131 stores a frame which has not been processed yet. If the frame memory 131 stores a frame which has not been processed yet, the process goes back to step S181, and the frame which has not been processed yet is similarly processed.

In step S184, if the process has determined that the frame memory 131 does not store a frame which has not been processed yet, the embedded coding process is terminated.

According to the above-described embedded coding process, a 1-frame image is encoded to generate the following encoded data.

Assuming that the additional information corresponds to each of the swapping (in the frame to be processed which has N columns shown in FIG. 49A) of the 2nd column for the 6th column (FIG. 49B), the swapping of the 3rd column for the 9th column (FIG. 49C), the swapping of the 4th column for the 7th column (FIG. 49D), the swapping of the 5th column for the 3rd column (FIG. 49E), the swapping of the 6th column for the 8th column (FIG. 49F), the swapping of the 7th column for the 4th column (FIG. 49G), the swapping of the 8th column for the 5th column (FIG. 49H), the swapping of the 9th column for the 2nd column (FIG. 49I), and the swapping of the N-th column for the N-th column, swap information representing the above types of swapping is generated by the swap-information generating unit 136. In the swapping unit 137, in accordance with the above swap information, the frame shown in FIG. 49J is processed so that the 2nd column is swapped for the 6th column, the 3rd column is swapped for the 9th column, the 4th column is swapped for the 7th column, the 5th column is swapped for the 3rd column, the 6th column is swapped for the 8th column, the 7th column is swapped for the 4th column, the 8th column is swapped for the 5th column, the 9th column is swapped for the 2nd column, and the N-th column is swapped for the N-th column. As a result, the image in FIG. 49J is encoded to generate the image shown in FIG. 49K.

Noting the 1st to 9th columns in FIGS. 49A to 49K, the embedded coding process is further described below.

In this embodiment, the swapping of the 1st column is not performed (prohibited). Accordingly, concerning the 2nd column, among the 1st to 9th columns, eight columns from the 2nd column to the 9th column excluding the 1st column are used for swapping. Since this case has eight columns for which the 2nd column is swapped, one of eight values from "0" to "7" can be embedded as additional information. Assuming that "0" to "7" are assigned as additional information for the 2nd to 8th columns, when the 2nd column is swapped for the 6th column, as shown in FIG. 49B, "4" which is assigned for swapping for the 6th column is embedded as additional information.

After the 2nd column is swapped for the 6th column, seven columns from the 2nd to 5th columns and from 7th to 9th columns remain as columns for which one column is swapped. The 3rd column is swapped for one of the seven columns. Accordingly, in this case, for example, one of seven values from "0" to "6" can be embedded as additional information. Similarly to the above case, assuming that "0" to "6" are assigned as additional information in order to swap the 2nd to 5th columns and the 7th to 9th columns, when the 3rd column is swapped for the 9th column, as shown in FIG. 49C, "6" which is assigned for swapping for the 9th column is embedded as additional information.

Subsequently, additional information is similarly embedded in an image. In the above-described embedding technique, as the embedding of additional information proceeds, the number of bits capable of being embedded decreases.

As described above, by swapping, in response to additional information, the positions of pixels in each column which are a set of at least one pixel constituting the image stored in the frame memory 131, and, when additional information is embedded in each column of pixels, performing reverse swapping, the original image can be restored, and the used way of swapping can be used as additional information. Therefore, additional information can be embedded, eliminating image-quality deterioration in the image to the utmost, without increasing the amount of data.

The columns of the image which has the embedded additional information, that is, which has the swapped positions of columns, can be swapped for those in the original positions, without any overhead, by using interrelation in the image, that is, interrelation to columns in position identically to those in the original image. Also, the swapping manner is used to decode the additional information. Accordingly, in the resultant decoded image (reproduced image), image-quality deterioration due to the embedding of the additional information basically does not occur.

However, when columns in position do not exist in encoded data, it is impossible to reproduce an image and additional information by using image interrelation, as described above. Accordingly, here, in the embedded coding process shown in FIG. 48, the 1st column of each frame is unchanged and output as encoded data, without being swapped.

Nevertheless, embedded coding can be performed by swapping all columns including the 1st column. In this case, by including at least one original position of swapped columns as an overhead in encoded data, an image and additional information can be easily reproduced.

In addition to the embedding of additional information in an image by successively swapping columns of pixels, the embedding of additional information can be performed by simultaneously swapping all columns of pixels. In this case, the number of patterns in which all the columns are simultaneously swapped is the fractorial of the number of columns. Among the patterns, which pattern is selected is determined by the additional information. The decoding of the embedded additional information is performed such that in the image having the embedded additional information, all columns of pixels are swapped a number of times equal to the fractorial of the number of columns, and among the swap patterns corresponding to the fractorial of the number of columns, one swap pattern is determined based on interrelation.

In this example, each column of the image is swapped in accordance with additional information itself. However, the swapping of columns can be performed in accordance with, for example, characteristics values of additional information, such as a histogram, dispersion, and a dynamic range of the additional information.

Figure 50:
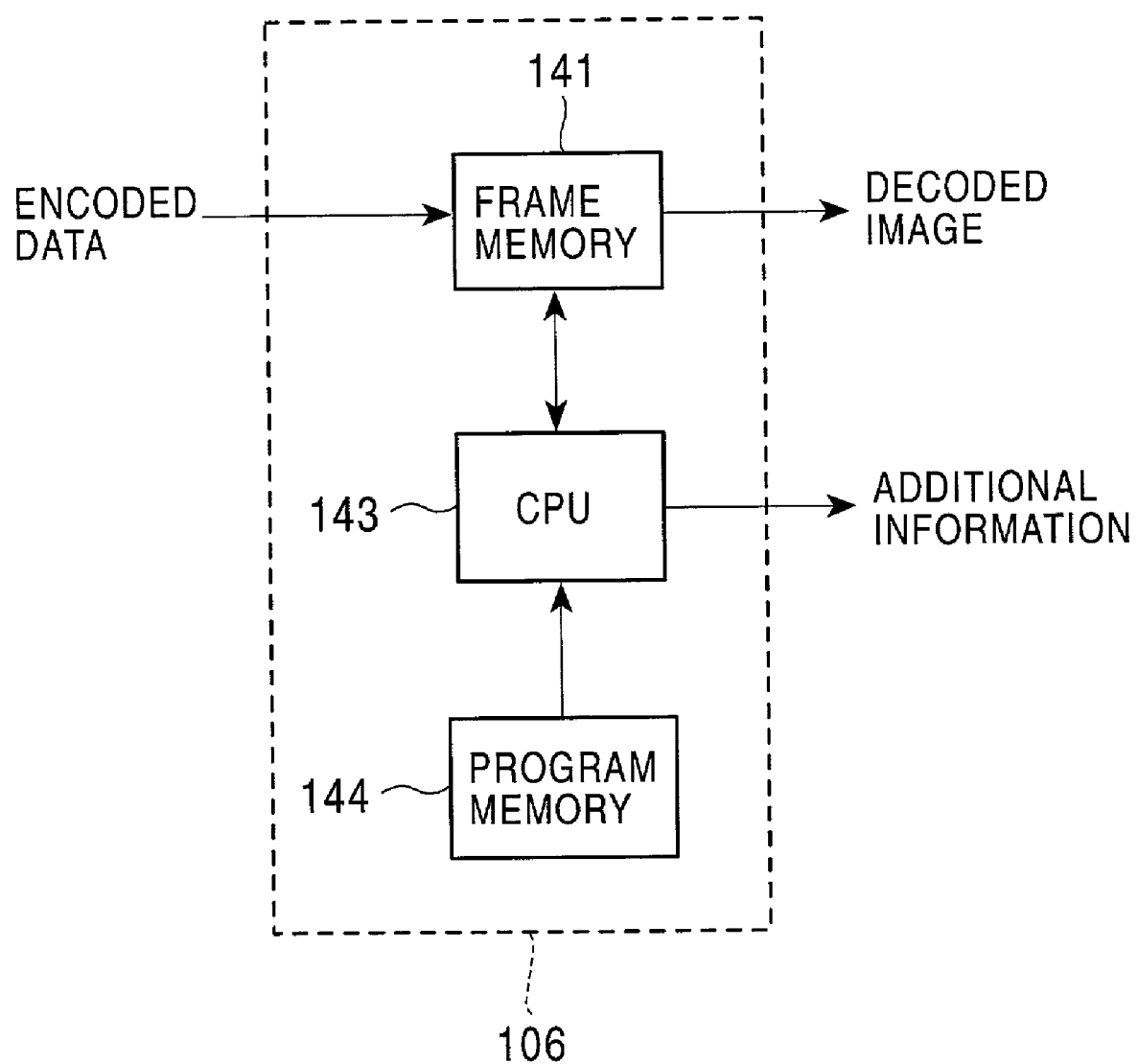
FIG. 50 is a block diagram showing a hardware configuration of the embedded decoding unit 106.

Next, FIG. 50 shows a hardware configuration of the embedded decoding unit 106 that reproduces the original image and additional information by using interrelation in image to decode the encoded data output by the embedded coding unit 103 shown in FIG. 47. The embedded decoding unit 106 shown in FIG. 30 is identical in structure to that shown in FIG. 33, except that the output I/F 142 is not provided.

An encoded data, that is, an image (hereinafter referred to as the "embedded-coded image") having embedded additional information is supplied to a frame memory 141. The frame memory 141 temporarily stores the embedded-coded image, for example, in units of frames.

A CPU 143 performs the embedded decoding process by executing a program stored in a program memory 141. In other words, the CPU 143 reproduces the original image and additional information by using interrelation in image to decode the embedded-coded image stored in the frame memory 141. Specifically, among columns of pixel constituting the embedded-coded image, the interrelation between the last column that has already been decoded and another column is calculated by the CPU 143. The CPU 143 performs, for all the columns of pixels constituting the embedded-coded image, processing in which a column that maximizes interrelation to an already decoded column is swapped for a column right-adjacent to the already decoded column, whereby the original image is reproduced. Also, based on the swap pattern applied to the columns of the embedded-coded image when the embedded-coded image is decoded to reproduce the original image, the CPU 143 reproduces the additional information.

The program memory 144 stores a computer program for controlling the CPU 143 to perform the embedded decoding process.

Figure 51:
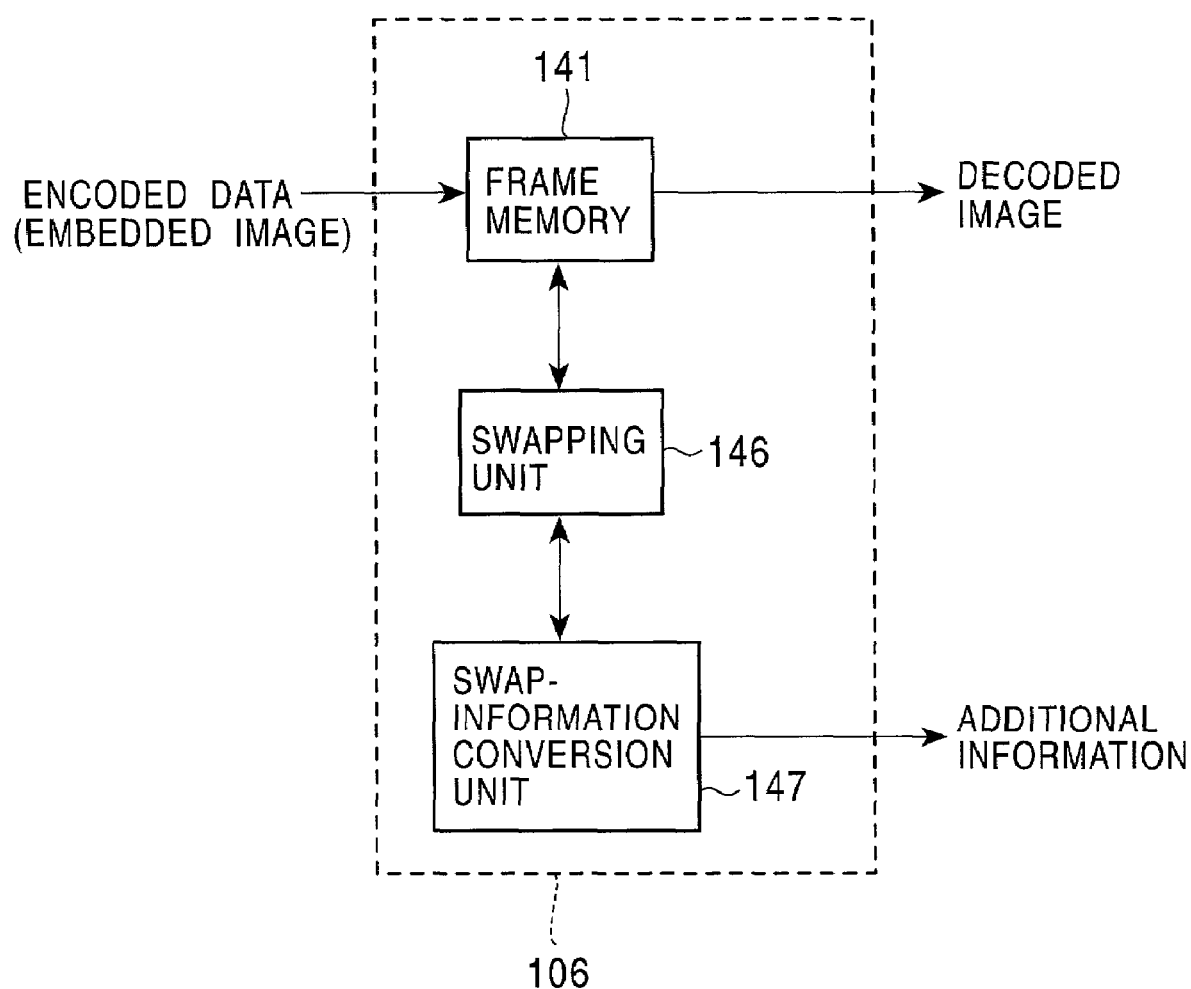
FIG. 51 is a block diagram showing a functional construction of the embedded decoding unit 106.

FIG. 51 shows a functional construction of the embedded decoding unit 106 shown in FIG. 50. This functional construction is realized such that the CPU 143 executes the computer program stored in the program memory 144.

As described using FIG. 50, the frame memory 141 temporarily stores the embedded-coded image.

A swapping unit 146 calculates each interrelation between the last column that has already been swapped to the original position and another column (column that has not been swapped to the original position yet) in a frame to be processed which is stored in the frame memory 141, and can return, based on the calculated interrelations, to the original positions, columns in the frame to be processed which have not been swapped to the original positions yet by performing swapping. The swapping unit 146 supplies a swap-information conversion unit 147 with swap information indicating how the columns of the frame have been swapped.

Based on the swap information from the swapping unit 146, that is, the correspondence between the position of each column (in the frame to be processed) before swapping and the position of each column after swapping, the swap-information conversion unit 147 can decode the embedded additional information of the embedded-coded image.

With reference to the flowchart shown in FIG. 52, the embedded decoding process performed by the embedded decoding unit 106 shown in FIG. 51 is described below.

The frame memory 141 sequentially stores a supplied embedded-coded image (encoded data), for example, in units of frames.

In step S191, the swapping unit 146 sets, for example, an initial value of 1 as variable n for counting the number of columns in frame, and proceeds to step S192. In step S192, the swapping unit 146 determines whether variable n is not greater than N−1 in which 1 is subtracted from N as the number of columns in frame.

In step S192, if the swapping 146 has determined that variable n is not greater than N−1, the swapping unit 146 proceeds to step S193. In step S193, the swapping unit 146 reads the n-th column of pixels from the frame to be processed which is stored in the frame memory 141, and generates vector vn (hereinafter referred to also as "column vector vn") in which the pixels (pixel levels) are arranged as elements. Here, when the frame has M columns of pixels, column vector vn (also column vector vk which is described later) is an M-th order vector.

After that, in step S194, the swapping unit 146 sets an initial value of n+1 as variable k for counting the number of right columns from the n-th column, and proceeds to step S195. In step S195, the swapping unit 146 reads the k-th column of pixels and generates column vector vk having the k-th column of pixels as elements. The swapping unit 146 proceeds to step S196.

In step S196, the swapping unit 146 uses column vectors vn and vk to find the interrelation between the n-th column and the k-th column.

In other words, the swapping unit 146 calculates the distance d(n,k) between column vector vn and column vector vk in accordance with the following expression:

$$d(n, K) = |vn - vk|$$
$$= (\Sigma A(m, n) - A(m, k))^2)^{1/2}$$

where Σ represents summation obtained when m is changed from 1 to M, and A(i,j) represents the pixel (pixel level) positioned in the i-th row and the j-th column of the frame to be processed.

The swapping unit 146 finds the reciprocal of the distance d(n,k) between column vector vn and column vector vk, as (a interrelation value representing) the interrelation between the n-th column and the k-th column.

After calculating the interrelation between the n-th column and the k-th column, the swapping unit 146 proceeds to step S197, and determines whether variable k is not greater than N−1 in which 1 is subtracted from N as the number of columns of the frame. In step S197, if the swapping unit 146 has determined that variable k is not greater than N−1, the swapping unit 146 proceeds to step S198, and variable k is incremented by 1. After that, the swapping unit 146 goes back to step S197, and repeatedly performs steps S195 to S198 until having determined that variable k is greater than N−1. In other words, this can find the interrelation between the n-th column and each of the right columns therefrom in the embedded-coded image.

After that, in step S197, if the swapping unit 146 has determined that variable k is greater than N−1, the swapping unit 146 proceeds to step S198, and finds k that maximizes the interrelation to the n-th column. When k that maximizes the interrelation to the n-th column is represented by, for example, K, the swapping unit 146 performs, in step S200, the swapping of the (n+1)-th column and the k-th column in the frame to be processed which is stored in the frame memory 141, that is, swaps the K-th column for the (n+1)-th column which is right adjacent to the n-th column.

Subsequently, in step S201, variable n is incremented by 1, and the swapping unit 146 goes back to step S192, and repeatedly performs steps S192 to S201 until having determined that variable k is greater than N−1.

In this embodiment, the 1st column in the embedded-coded image remains unchanged as the 1st column of the original image. Thus, when variable n is an initial value of 1, a column in the embedded-coded image which has the highest interrelation to the 1st column is swapped for the 2nd column which is right adjacent to the 1st column. Since the column which has the highest interrelation to the 1st column is basically the 2nd column in the original image from interrelation in image, in this case the 2nd column in the original image which has been swapped for a column in the embedded-coded image in the embedded decoding process is returned to the original position.

When variable n is 2, a column in the embedded-coded image which has the highest interrelation to the 2nd column returned to the original position is swapped for the 3rd column which is right adjacent to the 2nd column. Since the column which has the highest interrelation to the 2nd column is basically the 3rd column in the original image from interrelation in image, in this case the 3rd column in the original image which has been swapped for a column in the embedded-coded image in the embedded decoding process is returned to the original position.

Subsequently, the embedded-coded image stored in the frame memory 141 is similarly decoded to generate the original image.

In step S192, if the swapping unit 146 has determined that variable n is greater than N−1, that is, when the 2nd to N-th columns of pixels constituting the embedded-coded image are returned to the original positions by using interrelation in image, so that the embedded-coded image stored in the frame memory 141 is decoded to reproduce the original image, the swapping unit 146 proceeds to step S202, and the decoded image is read from the frame memory 141. In step S202, the swapping unit 146 outputs, to the swap-information conversion unit 147, swap information representing ways of swapping each of the 2nd to N-th columns in the embedded-coded image when the swapping unit 146 decodes the embedded-coded image to reproduce the original image. Based on the swap information from the swapping unit 146, the embedded additional information in the embedded-coded image is decoded and output by the swap-information conversion unit 147.

After that, in step S203, the process determines whether the frame memory 141 stores a frame of the embedded-coded image which has not been processed yet. If the frame memory 141 stores the frame, the process goes back to step S191, and processes the frame by performing the same steps again.

In step S203, if the frame memory does not store the frame which has not been processed yet, the embedded decoding process is terminated.

As described above, encoded data in which additional information is embedded is decoded to reproduce the original image and additional information by using interrelation in image, whereby the encoded data can be decoded to reproduce the original image and additional information without any overhead. Therefore, deterioration in image quality does not basically occur due to the embedding of the additional information.

Figure 52:
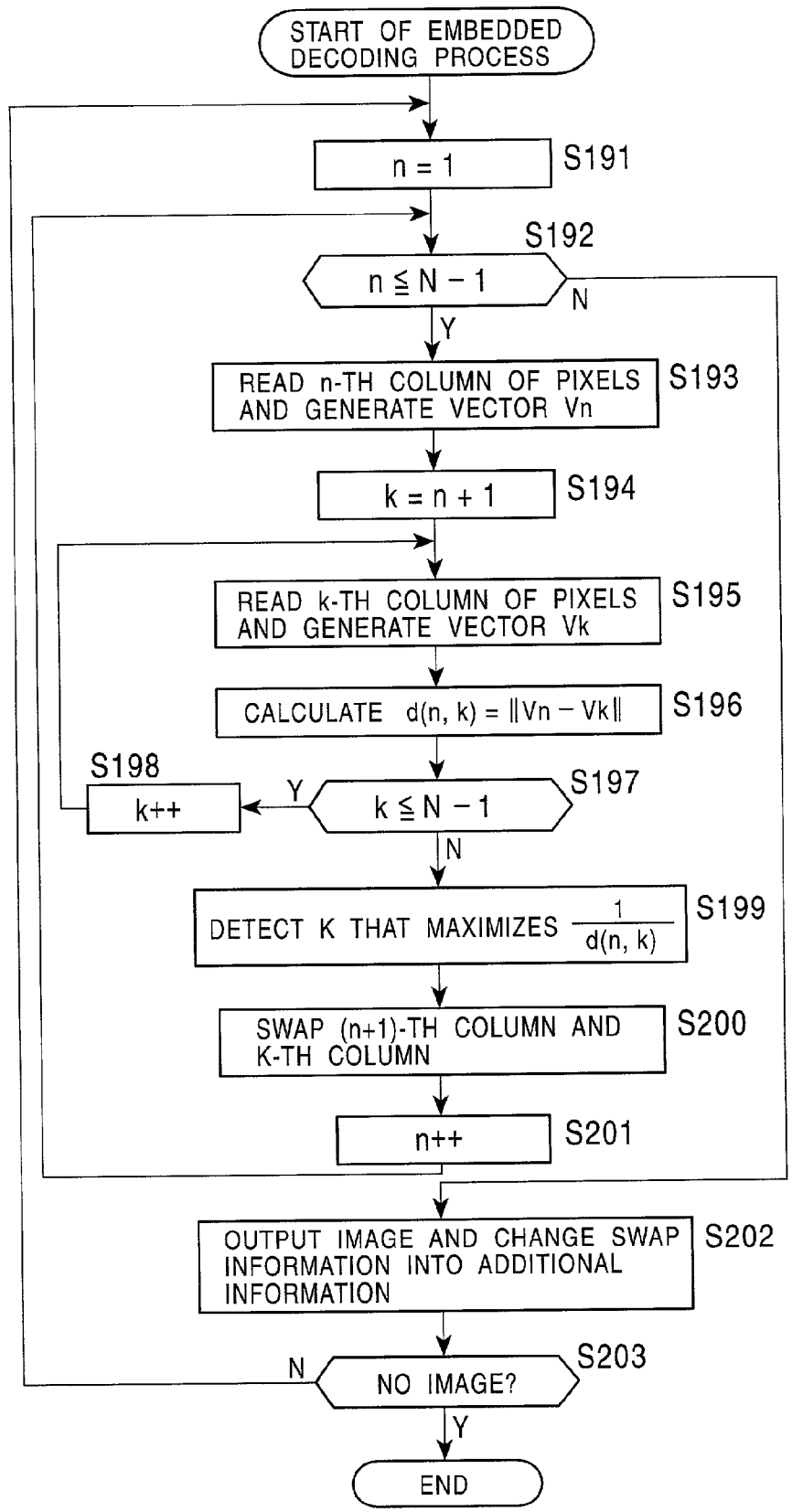
FIG. 52 is a flowchart illustrating an embedded decoding process.

In the embedded decoding process shown in FIG. 52, the interrelation between the last column which has already been decoded (when n=1, the 1st column which is swapped in the embedded coding process) and a column which has not been decoded yet is found, and based on the interrelation, a column which should be swapped for a column right adjacent to the last column which has already been decoded is detected. However, by calculating interrelations of a plurality of columns which have already been decoded to a column which has not been decoded yet, a column which should be swapped for a column right adjacent to the last column which has already been decoded can be detected.

Figure 53:
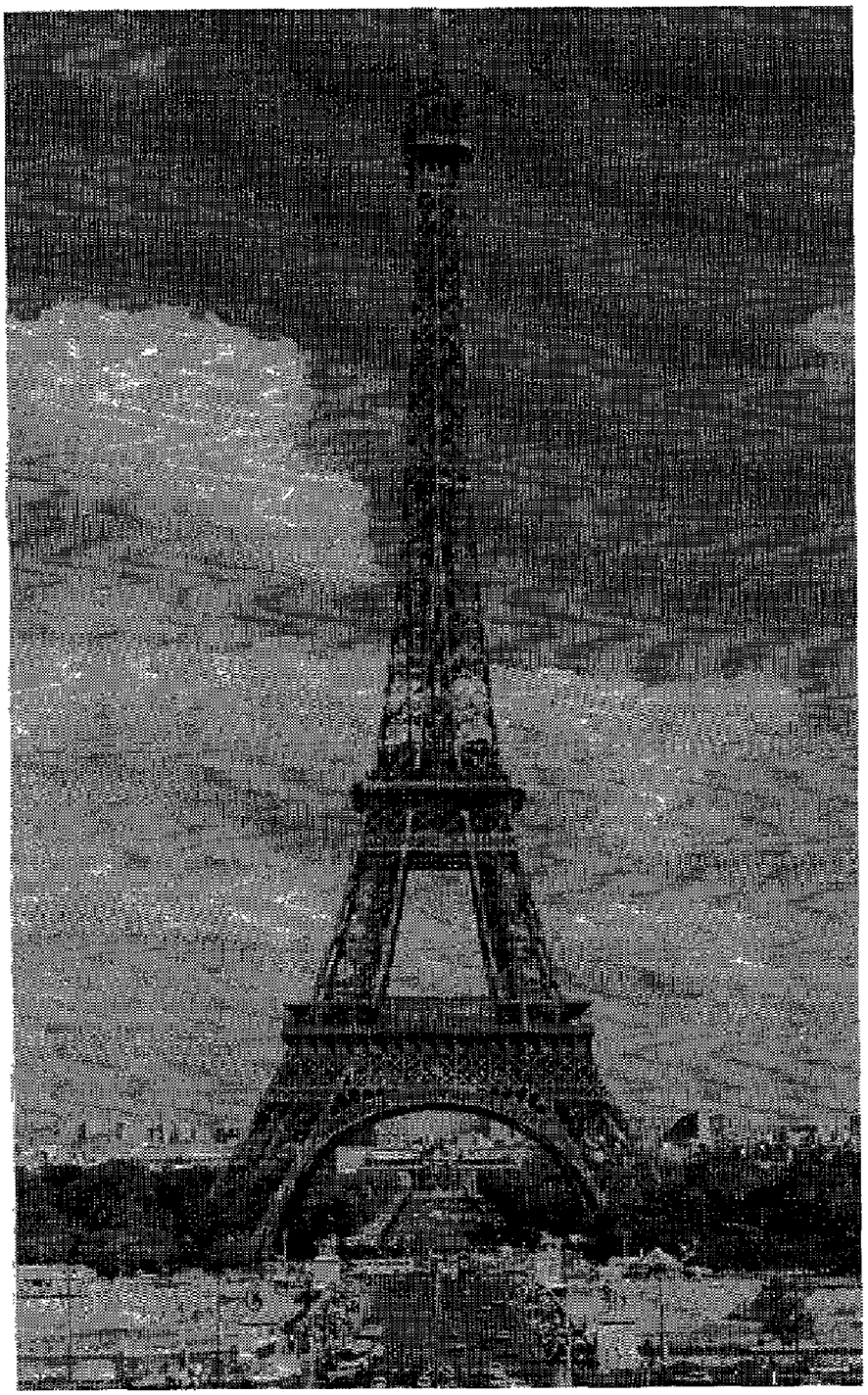
FIG. 53 is an intermediate gradation photograph displayed on a display displaying the original image used for simulation of embedded coding.
Figure 54:
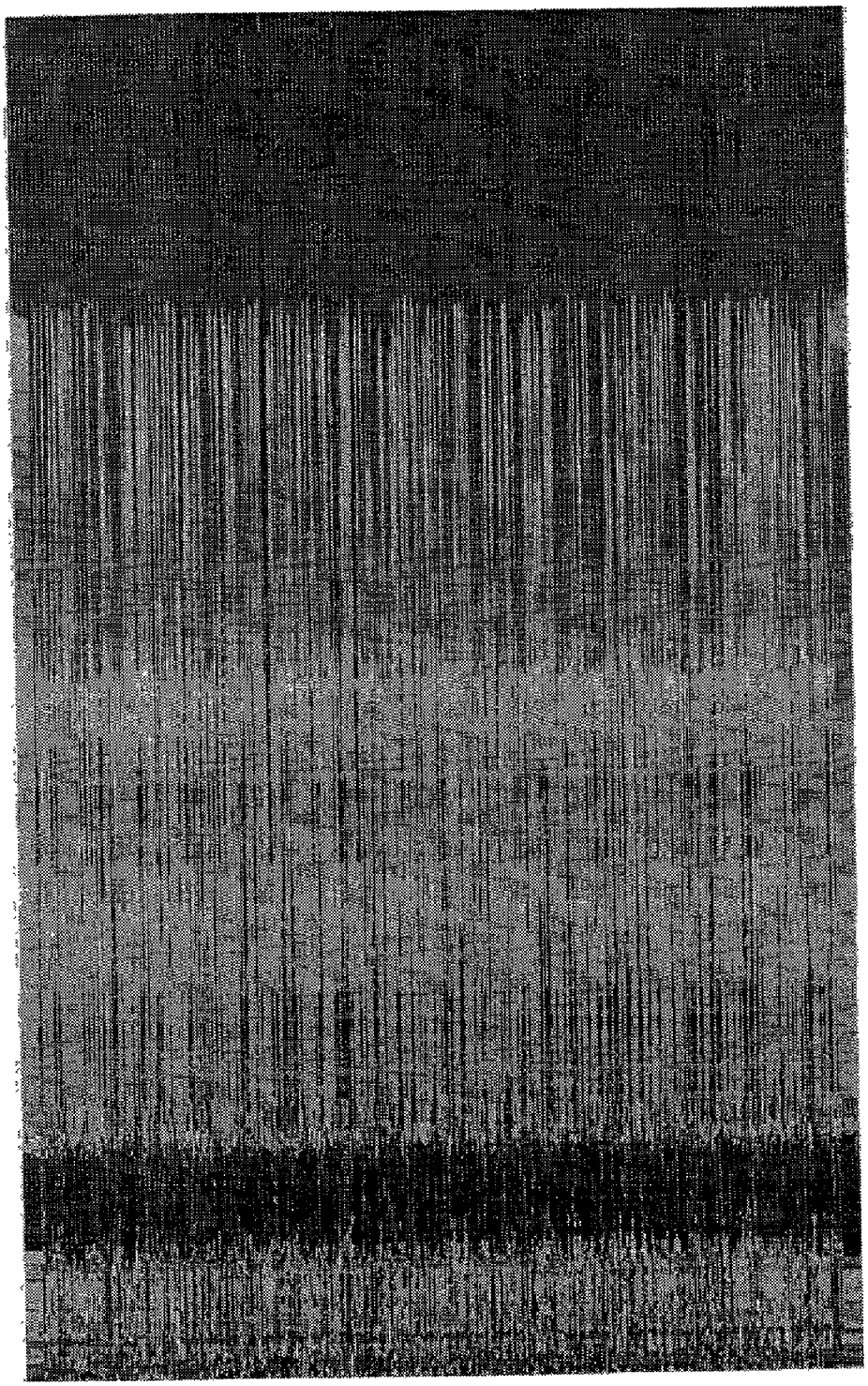
FIG. 54 is an intermediate gradation photograph displayed on a display displaying the result of simulation of embedded coding.
Figure 55:
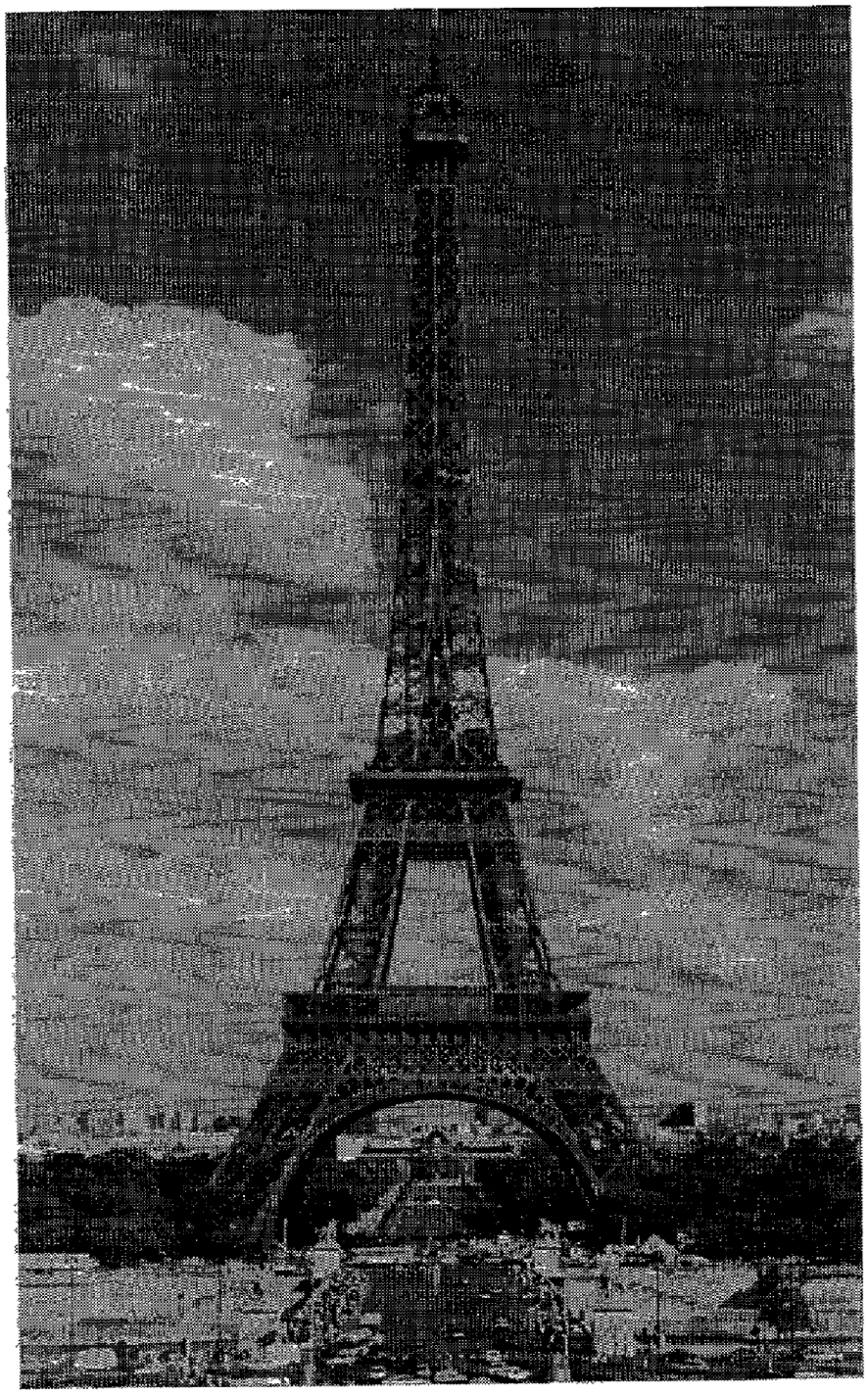
FIG. 55 is an intermediate gradation photograph displayed on a display displaying the result of simulation of embedded decoding.

In FIGS. 53 to 55, simulated results of the above-described embedded coding process and error-detecting circuit are shown.

FIG. 53 is an image (original image) to be processed by the embedded coding process, and is formed by 512 horizontal pixels by 832 vertical pixels when the longitudinal direction of the image is vertical.

FIG. 54 shows the result of performing the embedded coding process on the image in FIG. 53. In the image (embedded-coded image) shown in FIG. 54, additional information having log 2(512!) is embedded. As is clear from FIG. 54, the embedded coding process has a function of image encryption, as described above.

FIG. 55 shows a decoded image obtained by performing the embedded decoding process on the result in FIG. 54 of performing the embedded coding process on the image in FIG. 53. The comparison between FIGS. 53 and 55 indicates that the original image is reproduced without deterioration in image quality. If the embedded decoding process encodes the embedded-coded image to reproduce the original image, also additional information is accurately reproduced based on ways of swapping columns in the embedded-coded image.

Figure 56:
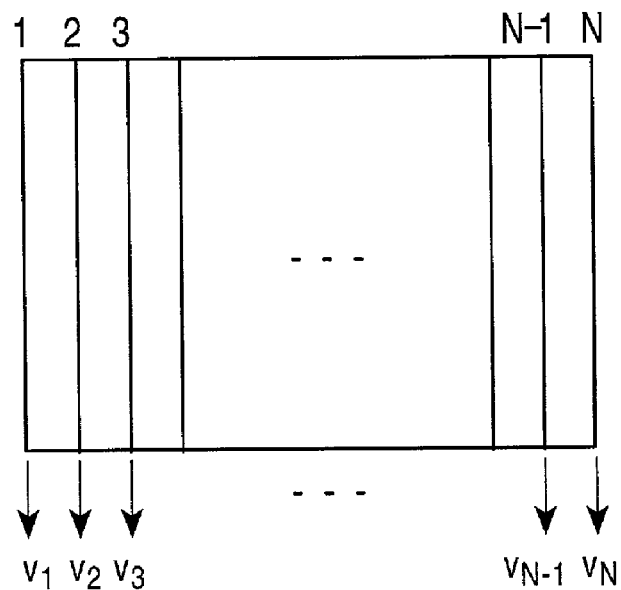
FIG. 56 is an illustration of an image to be encoded.
Figure 57:
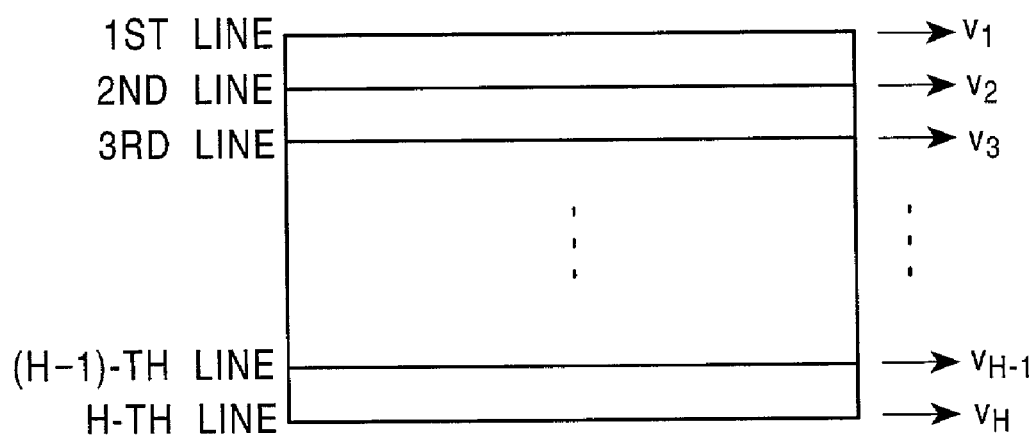
FIG. 57 is an illustration of an image to be encoded.

In the above-described case, the embedded coding unit 103 uses an image formed by N columns as shown in FIG. 56, as an image to be encoded, and is designed to perform the embedded coding process by fixing the 1st column, and swapping the 2nd to N-th columns in accordance with additional information. However, the embedded coding unit 103 can use an image formed by H lines as shown in FIG. 57, and can be designed to perform the embedded coding process by fixing the 1st column, and swapping the 2nd to H-th lines in accordance with additional information.

Although the embedded decoding unit 106 is designed to decode the embedded-coded result by using interrelation in image to reproduce the original image and additional information, the embedded decoding unit 106 can be designed to decode the embedded-coded result by using some of interrelation, continuity, and similarity in image.

In the example in FIG. 52, for each column in the image in FIG. 56, each column vector vn having the pixel levels of pixels constituting the column is used and the reciprocal of the distance between the column vectors is defined as interrelation, whereby only the interrelation is used to decode the encoded data. At this time, the embedded decoding unit 106 first detects a column vector having the smallest distance to the column vector of the 1st column (fixed as described above), and treats a column corresponding to the detected column vector as the 2nd column. The embedded decoding unit 106 detects, from the encoded data, a column vector having the smallest distance to the column vector of the 2nd column, and treats a column corresponding to the detected column as the 3rd column. Subsequently, from the encoded data, similar detection is performed up to the N-th column, whereby the original image is reproduced, and ways of swapping the 2nd to N-th columns are reproduced as the additional information.

Figure 58:
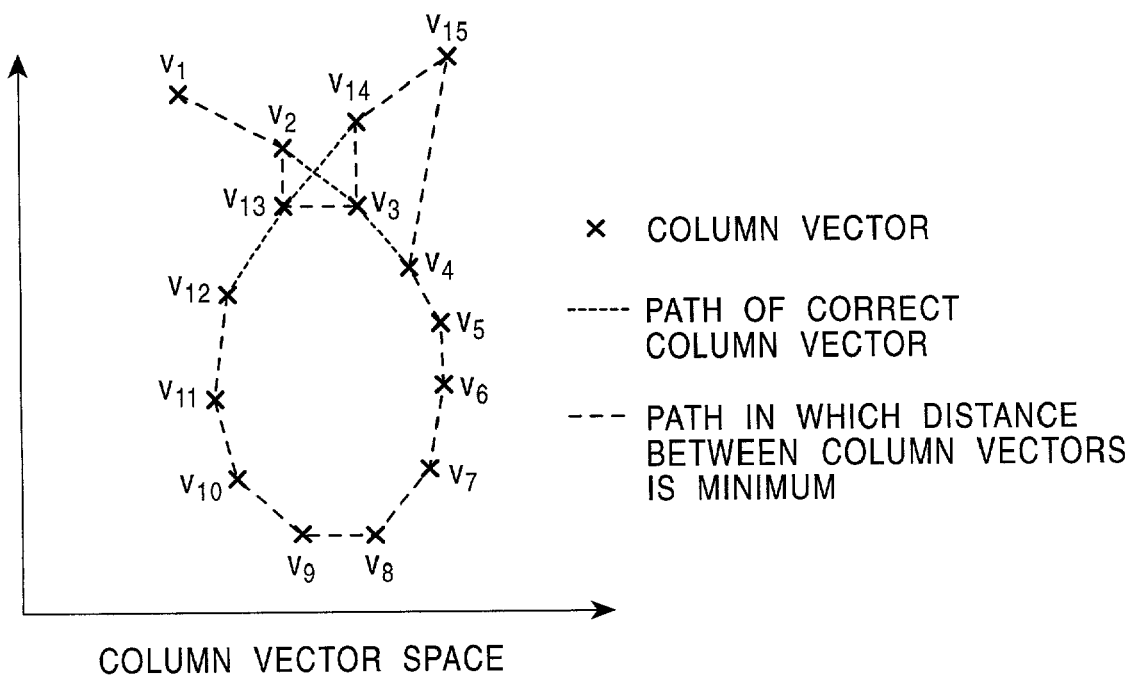
FIG. 58 is a graph showing a column vector space.

It is assumed that a path, drawn by the column vectors $v_1$, $v_2, \ldots, v_N$ of the n-th column (n=1, 2, ..., N) in the image shown in FIG. 56, is represented by, for example, the thin dotted line shown in FIG. 58.

In this case, by sequentially detecting each column vector having the smallest distance from the 1st column, the path represented by the thick dotted line in FIG. 58 is obtained. In other words, the column vectors are detected in the order of $v_1, v_2, v_{13}, v_3, v_{14}, v_4, v_5, v_6$, etc. Therefore, in the example shown in FIG. 58, the column vectors cannot be detected by simply using interrelation (here, the distance between column vectors). As a result, the image and additional information cannot be correctly reproduced.

Figures 59, 60:
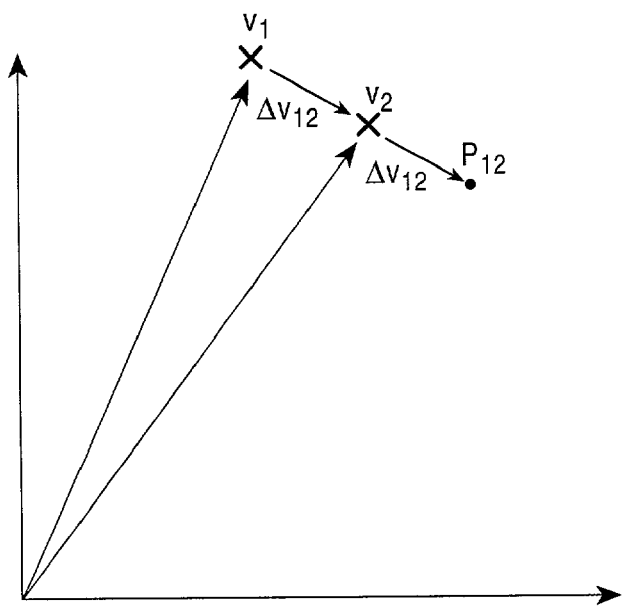
FIG. 59 is a graph showing a column vector space.
FIG. 60 is an illustration of switching of rows and columns.

Accordingly, after detecting a column vector having the smallest distance to the column vector $v_1$ of the 1st column and treating a column corresponding to the detected column vector, as the 2nd column, difference vector $\Delta v_{12}$ between the column vector $v_2$ of the 2nd column and the column vector $v_1$ of the 1st column is found as shown in FIG. 59. Next, a column vector which is closest to point P12 represented by a vector obtained by adding difference vector $\Delta v_{12}$ to column vector $v_2$ is detected, and a column corresponding to the detected column vector is treated as the 3rd column.

Concerning the 4th column, a difference vector between the column vector $v_3$ of the 3rd column and the column vector $v_2$ of the 2nd column is found, a column vector closest to a point represented by a vector obtained by adding the difference vector to column vector $v_3$ is detected, and a column corresponding to the detected column vector is treated as the 4th column. Subsequently, similar processing is performed up to the N-th column.

As described above, by using not only the interrelation between the n-th column and the (n+1)-th column, but also, for example, continuity between the column vector $v_n$ of the n-th column and the column vector $v_{n+1}$ of the (n+1)-th column, in other words, the continuity of change of difference vector $v_{n+1} - v_n$, the column vectors are detected in correct order represented by the path drawn by the thin dotted line in FIG. 58, so that the image and additional information can be correctly reproduced.

In the example described using FIGS. 49A to 49K, the pixels (excluding the 1st column of pixels) of an image to be encoded are swapped in units of columns, whereby the embedding of additional information in the image, that is, the embedded coding process is performed. However, the embedded coding process can be performed, for example, by swapping the pixels of the image to be encoded in units of lines, and by swapping columns of pixels identically positioned in a predetermined number of frames arranged in time domain.

In addition, the embedded decoding process can be performed, for example, by swapping the pixels of an image to be encoded in units of columns, and swapping the pixels of the image having the swapped pixels in units of lines.

By way of example, by swapping, based on additional information, columns of N horizontal pixels by M vertical pixels as shown in FIG. 60, for example, an embedded-coded image as shown in FIG. 61A is formed. In FIG. 61A, the 1st column of the image in FIG. 60 is swapped for the 5th column, the 2nd column is swapped for the N-th column, the 3rd column is swapped for the 1st column, the 4th column is swapped for the 2nd column, the 5th column is swapped for the 4th column, the 6th column is swapped for the 3rd column, . . . , and the N-th column is swapped for the 6th column, respectively.

In addition, by swapping the lines of the image in FIG. 61A, an embedded-coded image as shown in FIG. 61B is formed. In FIG. 61B, the 1st line of the image in FIG. 61A is swapped for the 3rd line, the 2nd line is swapped for the 5th line, the 3rd line is swapped for the 2nd line, the 4th line is swapped for the M-th line, the 5th is swapped for the 1st line, . . . , and the M-th line is swapped for the 4th line, respectively.

If, in the embedded-coded image, on the left of the 1st column there is a column which is not swapped, by using the column as the 1st column and performing the embedded decoding process described using FIG. 52, the embedded-coded image can be decoded to reproduce the original image shown in FIG. 60. In other words, concerning the embedded-coded image obtained by performing swapping in both the column direction and the line direction, the order of terms which are added in Σ in the above expression only changes, and the terms which are added themselves do not change. Therefore, both in the case of swapping only columns and in the case of swapping both columns and lines, distance d(n,k) obtained by the above expression does not change if embedded-coded images obtained by both cases are identical. Thus, the embedded-coded image obtained by swapping both the columns and the lines can be decoded by the embedded decoding process in FIG. 52 to reproduce the original image and additional information, similarly to the embedded-coded image obtained by swapping only the columns.

Accordingly, when both columns and lines are swapped, among columns and lines, which type of items should be swapped first or later does not influence the embedded decoding process. Therefore, in the embedded coding process, among the columns and the lines, either type of items may be swapped first or later, and also in the embedded decoding process, either type of items may be swapped first or later. Also, the swapping of columns and lines can be alternately performed.

In the embedded coding process, when only columns are swapped, the patterns of swapping the embedded-coded image, in the case that the embedded-coded image is decoded to reproduce the original image, form the result of decoding the additional information. However, when both columns and lines are swapped, information about which position (m',n') in the decoded image the pixel at position (m,n) in the m-th line and the n-th column is swapped for is the result of decoding the additional information.

Figure 48:
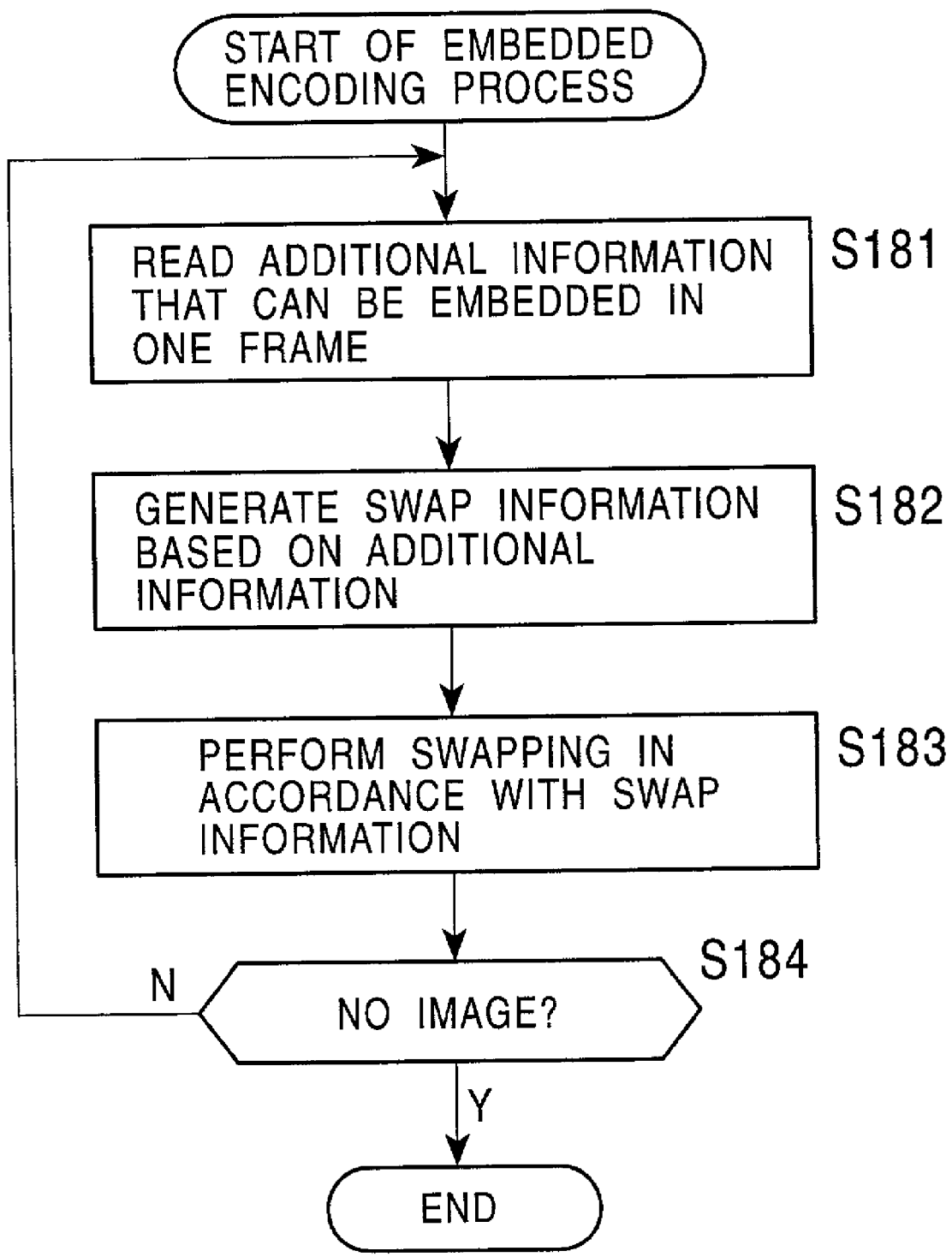
FIG. 48 is a flowchart illustrating an embedded coding process.

In the embedded coding process shown in FIG. 48, only the 1st column of the image to be encoded is fixed, and the embedded decoding unit 106 performs the swapping of other columns by using the fixed 1st column as a reference of decoding. However, the reference of decoding does not need to be the 1st column, but may be the last N-th column or an arbitrary column if the column is set in the embedded coding unit 103 and the embedded decoding unit 106. The reference of decoding does not need to be one column of pixels, but may extremely be one pixel.

By way of example, when the 1st column is used as the reference of decoding, and interrelation in image is used to perform the swapping of other columns of pixels in the embedded-coded image, if swapping for one column fails, there is a high possibility that swapping for the subsequent columns (in this embodiment, right columns from the column in which swapping fails.) may fail. In this case, the original image cannot be reproduced, so that correct additional information cannot be reproduced.

Accordingly, in the embedded coding process, it is possible that a plurality of columns be left (be not used for swapping) (be prohibited from being used for swapping).

Figure 62:
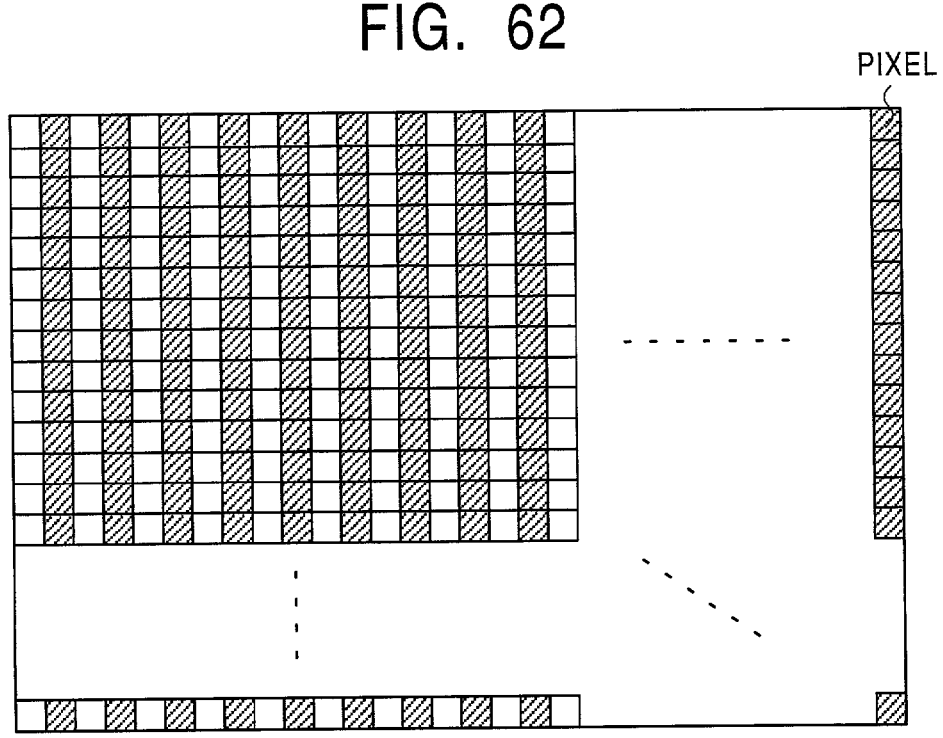
FIG. 62 is an illustration of a pixel based on which decoding is performed.

For example, when swapping is performed in which each set of pixels arranged in the column direction is used as a swapping unit, every two columns as hatched in FIG. 62 can be used as a reference of decoding, and the other columns (indicated by the blanks shown in FIG. 62) can be used as columns to be swapped.

In the case shown in FIG. 62, when the image has 2N columns, the data amount of additional information that can be embedded in the image is a maximum of log 2(N!) bits.

The embedded coding can be performed by swapping sets of at least one pixel in units smaller than units of columns or lines.

Figure 63:
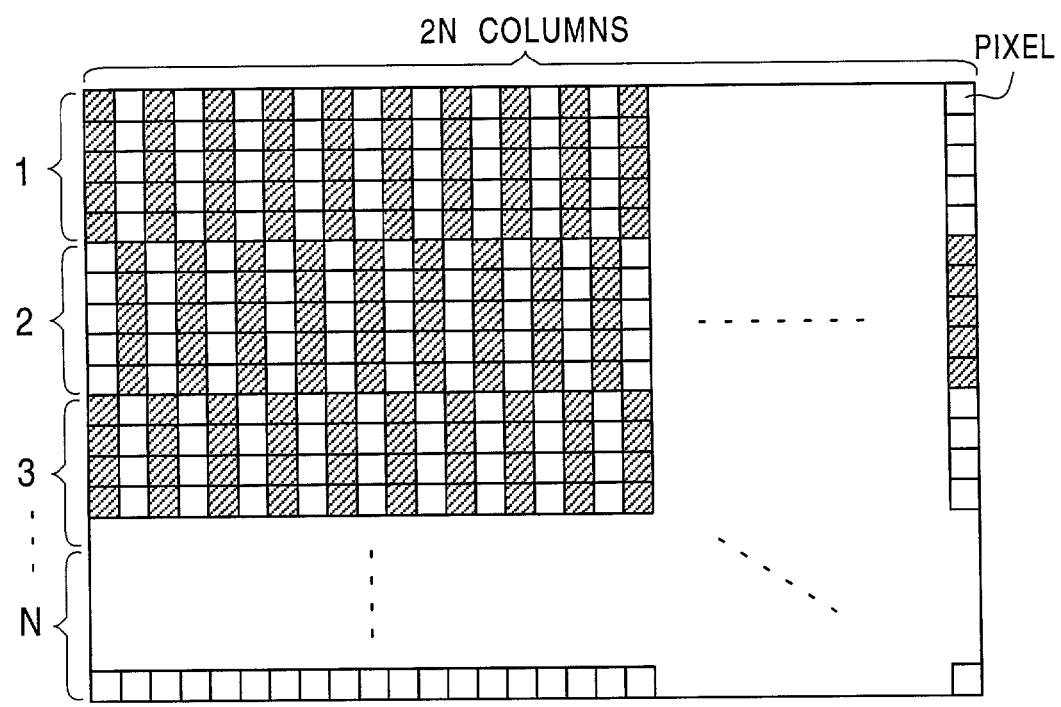
FIG. 63 is an illustration of a pixel based on which decoding is performed.

For example, as shown in FIG. 63, swapping can be performed in which each column of an image is divided into sets of one or more pixels (such as five pixels) successively arranged and each set is used as a swapping unit. In this case, as shown in FIG. 63, with the swapping unit classified into two groups in check pattern, one group (e.g., the blanks shown in FIG. 63) can be used for swapping, and the other group (e.g., the hatched portions shown in FIG. 63) can be used as a reference of decoding. When this technique is performed, if the number of lines is a number of pixels in which there are M swapping units, and the number of columns is 2N, the data amount of additional information that can be embedded in the image is a maximum of log 2((M×N)!) bits.

Figure 64:
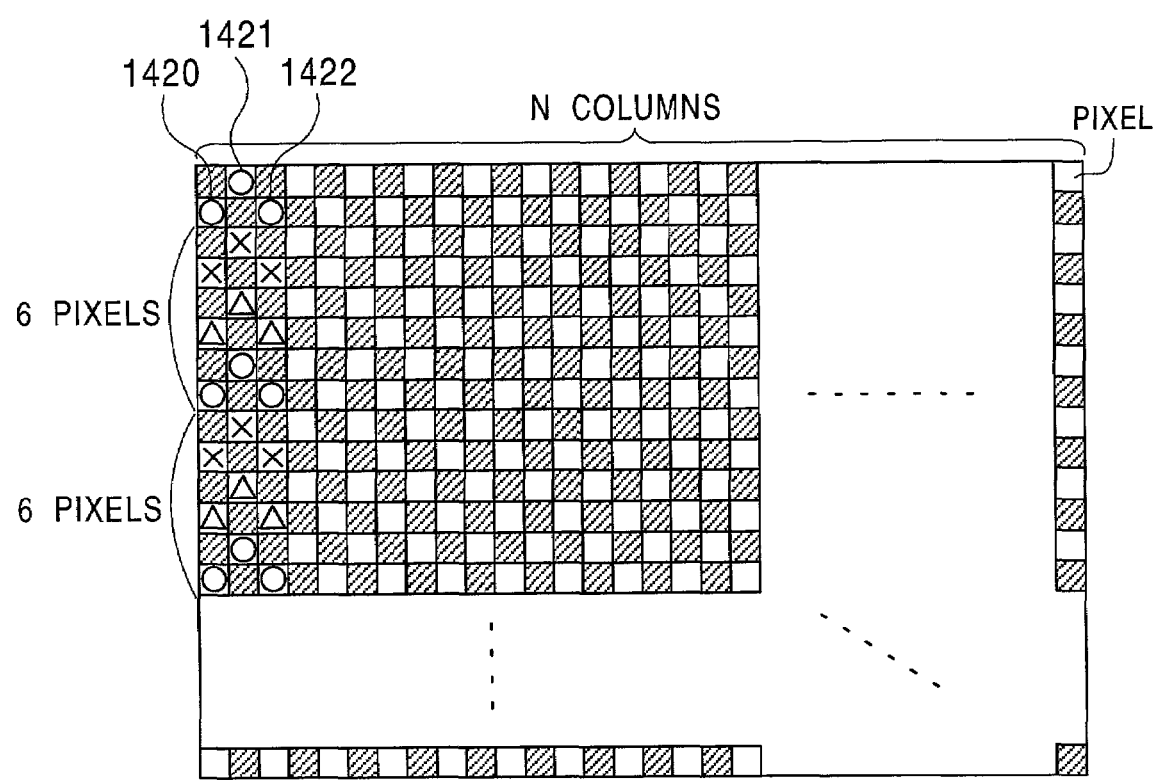
FIG. 64 is an illustration of a pixel based on which decoding is performed.

For example, as shown in FIG. 64, swapping can be performed in which from each column of an image each predetermined number of pixels, such as six pixels, is extracted and each of the extracted sets of pixels (in FIG. 64, sets of pixels indicated by circles, sets of pixels indicated by crosses, sets of pixels indicated by triangles, etc.) is used as a swapping unit. Also in this case, by dividing the pixels constituting the image in check pattern into two groups as shown in FIG. 64, one group (e.g., the blanks shown in FIG. 64) can be used for swapping, and the other group (e.g., the hatched portions shown in FIG. 64) can be used as a reference of decoding. When this technique is performed, and from each column of the image, each set of pixels is extracted every 2M pixels (every six pixels in the example shown in FIG. 64) and is used as a swapping unit, if the image has N columns, the data amount of additional information that can be embedded in the image is a maximum of log 2((M×N)!) bits. For example, the swapping unit indicated by each circle in FIG. 64 exists in each column, as denoted by reference numerals 1420, 1421, and 1422. Accordingly, noting only the swapping unit indicated by the circle in each column, swapping can be performed in N! patterns. Thus, when each set of pixels, extracted from each column every 2M pixels, is used as a swapping unit, M swapping units exist. Therefore, in the entirety of the image shown in FIG. 64, a maximum of (M×N)! swapping patterns are possible. As a result, the data amount of additional information that can be embedded in the image is log 2((M×N)!) bits.

In the examples shown in FIGS. 62 to 64, sets of pixels (the blanks shown in FIGS. 62 to 64) to be swapped are adjacent to a plurality of references (the hatched portions shown in FIGS. 62 to 64) of decoding. In this case, for example, the reciprocal of the sum of the squares of each distance between each of the references of decoding and each set of pixels to be swapped can be used as interrelation.

As described above, the swapping unit used in the embedded coding and the embedded decoding is particularly not limited.

Also, the set of pixels which is used as a reference of decoding is particularly not limited.

From a point of decoding accuracy, it is preferred that pixels to be swapped be adjacent to more pixels used as a reference of decoding. Accordingly, the example shown in FIG. 64 is most preferred. From a point of decoding accuracy, it is preferred that the number of pixels as a reference of decoding be more.

However, because pixels as a reference of decoding are not swapped, when the number of the pixels is large, the data amount of additional information that can be embedded is less. In addition, when the number of pixels as a reference of decoding is large, and when pixels to be swapped are adjacent to more pixels as a reference of decoding, the effect of encryption is weakened.

Accordingly, it is preferred that, by considering decoding accuracy, the data amount of additional information to be embedded, and the effect of encryption, the number of pixels which is used as a reference of decoding and a pattern for arranging the pixels be set in accordance with uses of the embedded coding and the embedded decoding.

When a column is swapped for a column close thereto, or when columns close to each other are swapped, with their positional relationship unchanged, the effect of encryption is also weakened. Accordingly, to prevent such a pattern of swapping from occurring, limitation can be set, such as limitation in which each column is swapped for a column having a predetermined distance or greater to the original position, and limitation in which columns close to each other are swapped for columns having a predetermined distance or greater to each other.

When an image to be embedded-coded is, for example, a color image corresponding to R, G, and B component signals, all the R, G, and B components may be swapped to identical positions, or each of the R, G, and B components may be separately swapped. When all the R, G, and B components are swapped to identical positions, the data amount of additional information that can be embedded is less than the case of separately swapping each of the R, G, and B components, but decoding precision in the embedded decoding can be increased. When each of the R, G, and B components is separately swapped, decoding precision in the embedded decoding deteriorates, compared with the case of swapping all the R, G, and B components to identical positions, but the data amount of additional information that can be embedded can be increased.

Information used as additional information is not particularly limited. For example, an image, sound, text, a computer program, a control signal, and other types of data can be used as the additional information. By using part of the image stored in the image database 101, as additional information, and using the other part as what to be supplied to the frame memory 131, the part of the image which is used as the additional information is embedded in the other part, so that image compression is realized.

Although in this embodiment, additional information is embedded in an image, the additional information can be embedded in another type of media, for example, sound. In other words, for example, by separating time-sequential sound data into proper frames, and swapping the sound data in each frame in accordance with additional information, the additional information can be embedded in sound.

Although in the above cases, the CPU 132 or 142 performs the embedded coding process or the embedded decoding process by executing the computer program, the process can be performed by dedicated hardware therefor.

When the above-described embedded coding/decoding is used to ensure that advertisement information is shown to the user in accordance with the output of package data by the user terminal 3, by embedded-coding the package data in the following manner, the encoded data may be provided to the user terminal 3.

For example, first, text data, image data, and sound data, each of which is subdata paired with the main data of multimedia package data, are embedded in the main data of the multimedia package data.

Figure 65:
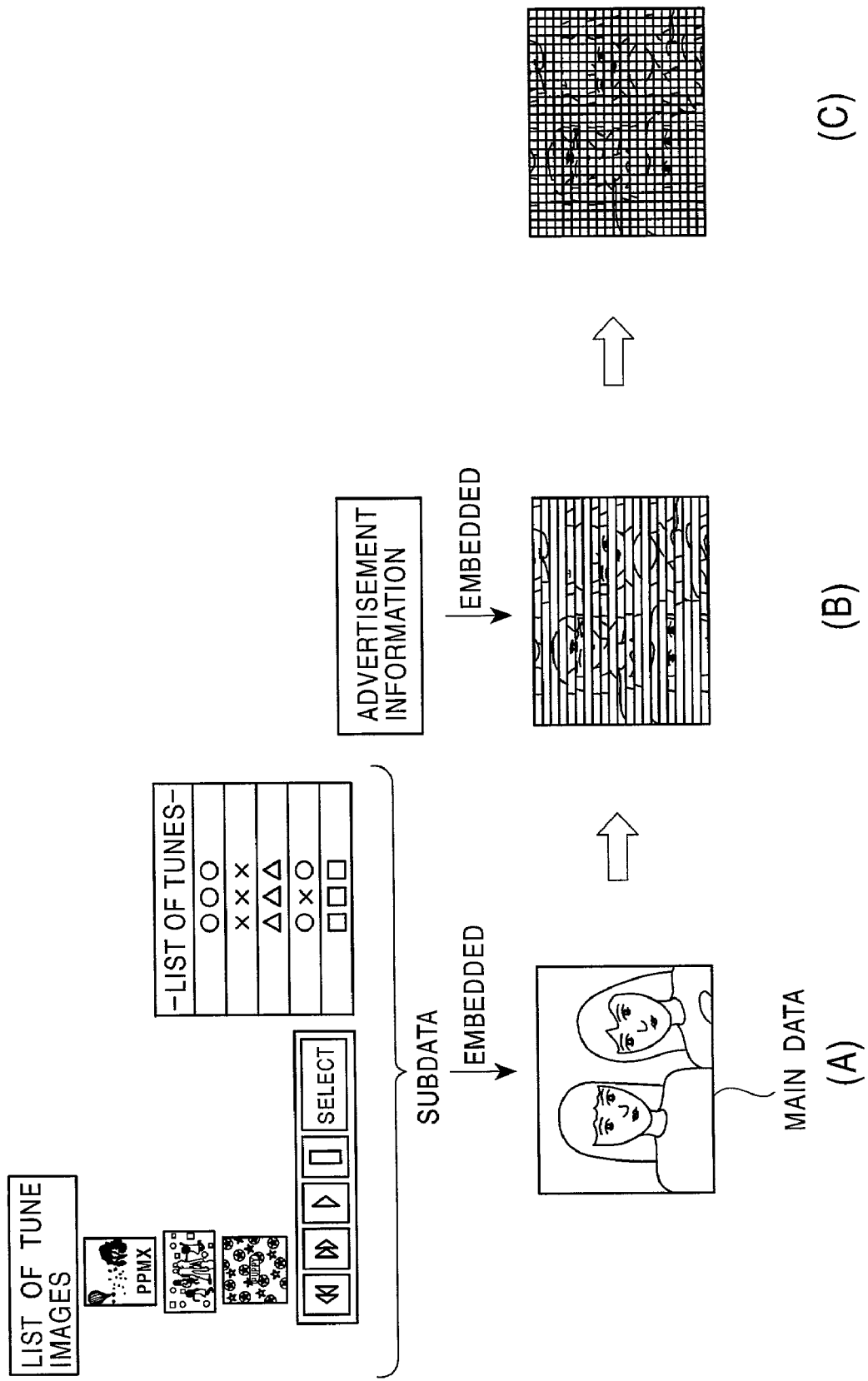
FIG. 65 is an illustration of a method for generating encoded data in which advertisement information is embedded in multimedia package data.

Specifically, assuming that the main data is image data, the lines of image data that is main data (shown in the illustration (A) of FIG. 65) are swapped based on subdata, whereby an embedded-coded image as shown in the illustration (B) of FIG. 65 is obtained.

By further embedding advertisement information in the embedded-coded image, a final embedded-coded image is obtained.

Specifically, based on the advertisement information, by swapping the columns of the embedded-coded image obtained by embedding the subdata in the main data, a final embedded-coded image as shown in the illustration (c) of FIG. 65 is obtained.

Figure 66:
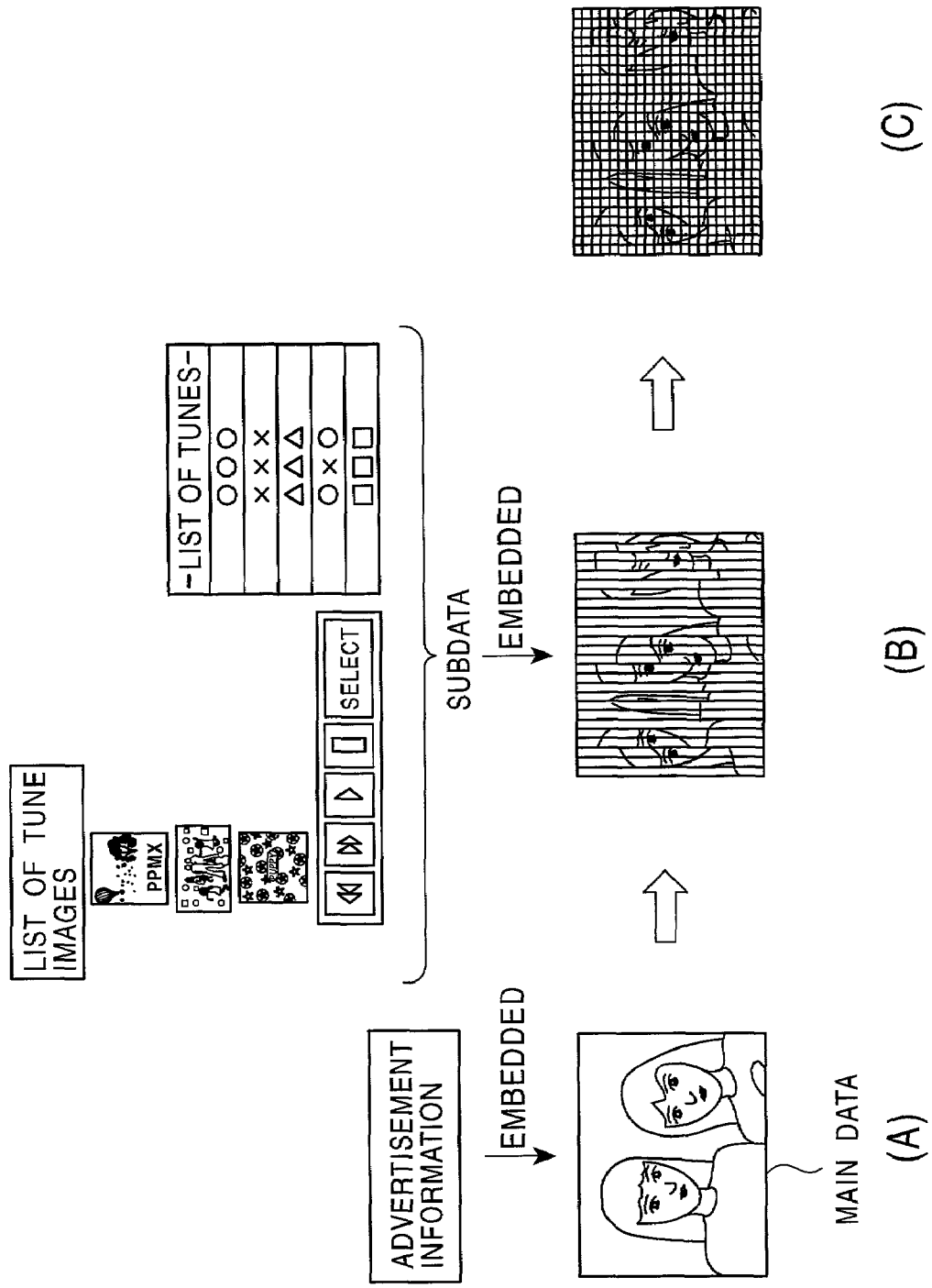
FIG. 66 is an illustration of a method for generating encoded data in which advertisement information is embedded in multimedia package data.

In the example shown in FIG. 65, by first swapping the lines of the image as main data, the embedded-coded image is obtained, and by subsequently swapping the columns of the embedded-coded image based on the advertisement information, the final embedded-coded image is obtained. However, as described above, in the embedded coding/decoding, the embedded coding/decoding is not influenced by swapping which type of items among lines and columns first or later. Thus, as shown in FIG. 66, after obtaining an embedded-coded image by swapping, based on additional information, the columns of an image as main data (the illustration (A) of FIG. 66), by swapping, based on subdata, the lines of the embedded-coded image (the illustration (B) of FIG. 66), a final embedded-coded image (the illustration (C) of FIG. 66) can be obtained.

The swapping based on the subdata of the columns of the image, and the swapping based on the advertisement information of the lines of the image may be performed.

A method for embedding the advertisement information in the multimedia package data is not limited to the above swapping of the lines and the columns.

When encoded data as an embedded-coded image as described above is provided from the package server 1 to the user terminal 3, the user terminal 3 can ensure that the additional information is shown to the user in accordance with the output of the multimedia package data.

When the main data of the multimedia package data is text data, in general, only a small amount of information can be embedded in the main data, compared with a case in which the main data is image data or sound data. Accordingly, in this embodiment, only when the main data is image data or sound data, the advertisement information is embedded. Nevertheless, when the main data is text data, the advertisement information can be embedded.

FIG. 67 shows a construction of the user terminal 3 when the package server 1 provides encoded data obtained by embedded-coding multimedia package data. In FIG. 67, blocks corresponding to those shown in FIG. 18 are denoted by identical reference numerals, and descriptions thereof are omitted below, as required. The user terminal 3 is basically identical in structure to that shown in FIG. 18, except that a first decoding unit 54 and a second decoding unit 55 are newly provided.

In this example, as described using FIG. 65 or FIG. 66, it is assumed that multimedia package data in the form of encoded data in which subdata and advertisement information are separately embedded in main data is provided from the package server 1.

The first decoding unit 54 performs the embedded decoding process on the encoded data as multimedia package data obtained by performing the embedded coding. The embedded-decoded result is output to the second decoding unit 55 and is supplied to a display unit 51 or a speaker 53 by the first decoding unit 54. The second decoding unit 55 performs the embedded decoding process on the output from the first decoding unit 54. The embedded-decoded result is output to a selected-instruction detecting unit 45 and is supplied to the display unit 51 or the speaker 53 by the second decoding unit 55.

Next, with reference to the flowcharts show in FIGS. 68 and 69, the process of the user terminal 3 shown in FIG. 67 is described below.

Figure 68:
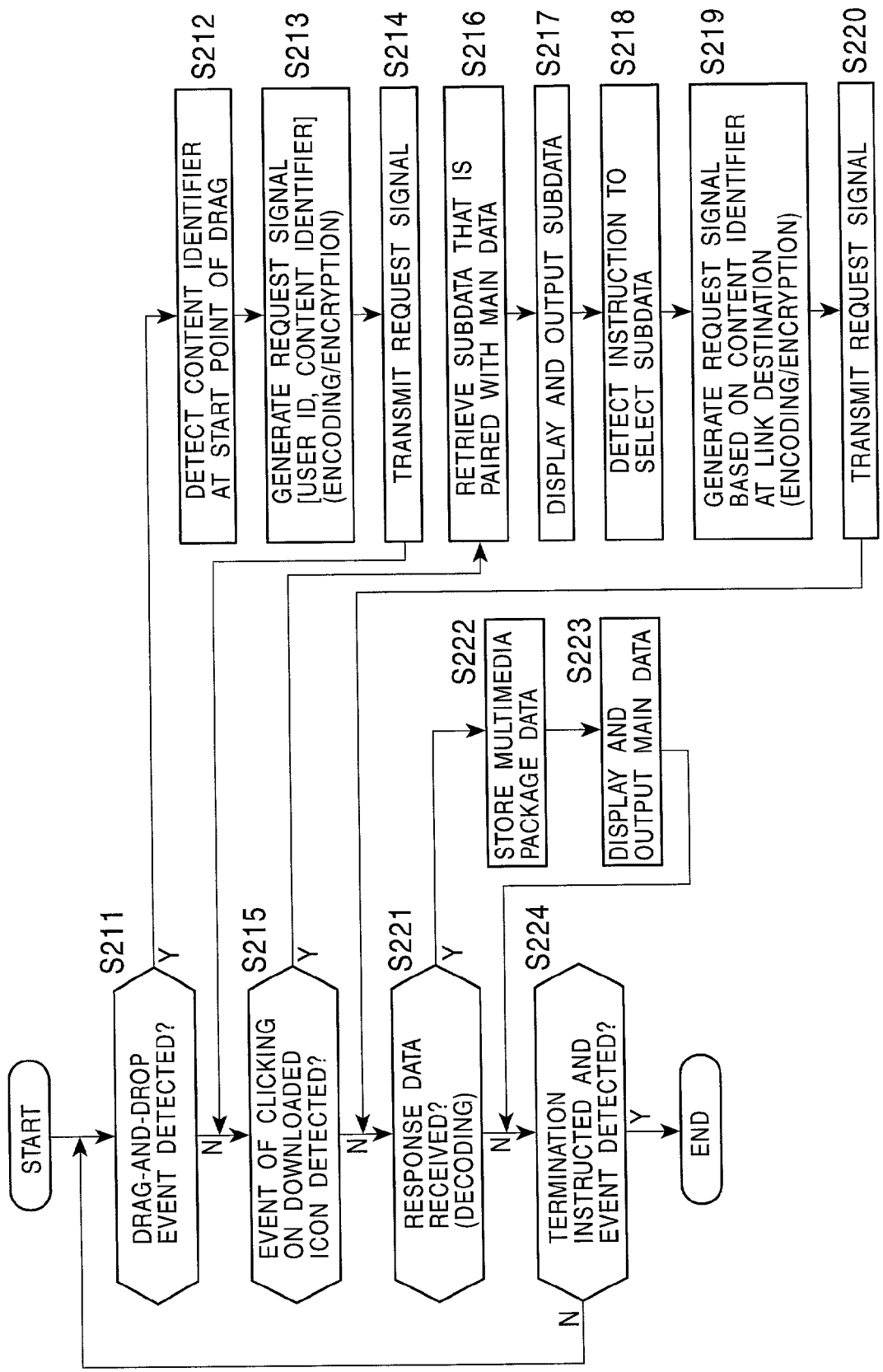
FIG. 68 is a flowchart illustrating processing performed by the user terminal 3 shown in FIG. 67.

As shown in FIG. 68, the user terminal 3 performs steps S211 to 223 which are basically identical to steps S31 to S43, respectively.

However, in this process, the multimedia package data provided from the package server 1 is basically in the form of encoded data obtained by performing the embedded coding. Accordingly, in step S222, the encoded data is stored in a storage unit 52. Because the encoded data form makes it impossible to output main data in step S223 and makes it impossible to output subdata in step S217, when the main data and the subdata are output, the user terminal 3 shown in FIG. 67 performs decoding of the multimedia package data in accordance with the flowchart shown in FIG. 69 in order to obtain the main data and the subdata, in parallel to the process in accordance with the flowchart shown in FIG. 68.

In step S231, a data retrieval unit 44 retrieves the multimedia package data (encoded data) which is downloaded from the package server 1 and stored in the storage unit 52, as required, and proceeds to step S232. In step S232, the data retrieval unit 44 determines which of image data or sound data the main data of the multimedia package data is. In step S232, if the data retrieval unit 44 has determined that the main data is not either of image data and sound data, that is, when the main data is text data, the data retrieval unit 44 goes back to step S231.

When the main data is text data, in this embodiment, the multimedia package data having the main data is not embedded-coded, as described above. Accordingly, since the main data and subdata can be instantly output, the data retrieval unit 44 goes back to step S231, without performing particular processing.

For example, it is assumed that information is not embedded in a header in the multimedia package data, and it is assumed that the header describes the type of the format of the multimedia package data. Accordingly, the determination in step S232 can be performed by referring to the header of the multimedia package data.

In step S232, if the data retrieval unit 44 has determined that the main data is either of image data and sound data, that is, when the multimedia package data is embedded-coded, the encoded data as the embedded-coded multimedia package data is supplied to the first decoding unit 54, and the process proceeds to step S233.

In step S233, the first decoding unit 54 performs the embedded coding process on the encoded data from the data retrieval unit 44, whereby the additional information embedded in the encoded data is reproduced and the main data with subdata embedded in (hereinafter referred to also as "sub-data-embedded main data") is obtained.

In step S234, the advertisement information reproduced in step S233 is supplied from the first decoding unit 54 and is output by the display unit 51 or the speaker 53. Specifically, when the advertisement information is one that can be displayed, it is supplied from the first decoding unit 54 and is displayed on the display unit 51. When the advertisement information is one that can be output in the form of sound, it is supplied from the first decoding unit 54 and is output from the speaker 53.

The subdata-embedded main data obtained in step S233 is supplied from the first decoding unit 54 to the second decoding unit 55. In step S235, the second decoding unit 55 performs the embedded decoding process on the subdata-embedded main data, whereby the main data and the subdata embedded therein are reproduced. The process proceeds to step S231.

The main data reproduced as described above is output in step S223 in FIG. 68, and the subdata is output in step S217 in FIG. 68.

Figure 70:
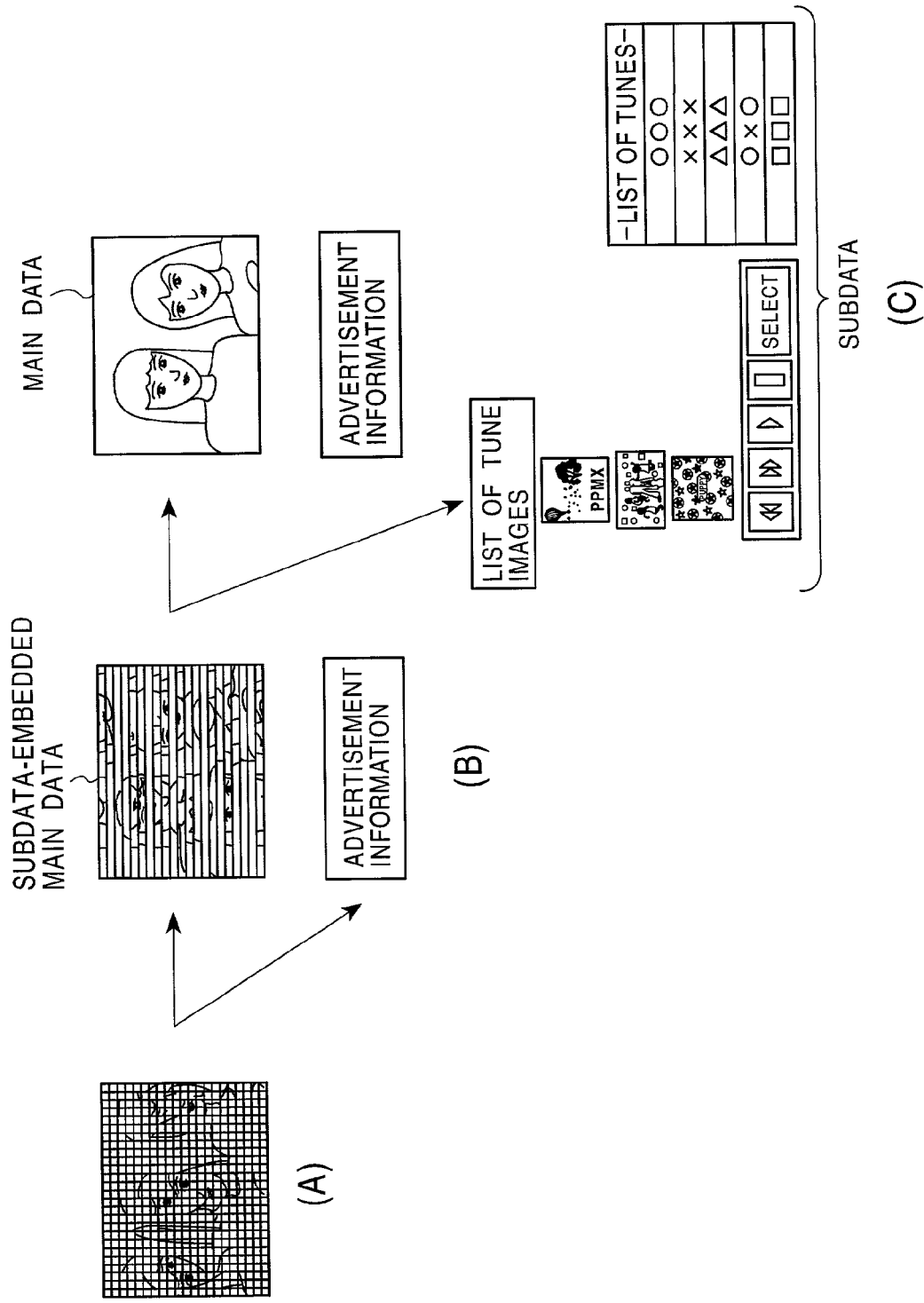
FIG. 70 is an illustration of steps for decoding encoded data by the user terminal 3.

Accordingly, when encoded data in which, for example, subdata and advertisement information are embedded in main data as image data is downloaded to the user terminal 3, the encoded data (the part (A) of FIG. 70) is embedded-coded, whereby the advertisement information embedded in the main data is reproduced and output as shown in the part (B) of FIG. 70 and subdata-embedded main data is obtained. The subdata-embedded main data is embedded-decoded to reproduce the main data and the subdata embedded therein, as shown in the part (C) of FIG. 70.

As a result, when the user right-clicks on image data as the main data so that the subdata paired with the main data can be displayed, the advertisement information is always output. Thus, when the user views (or listens to) the subdata, it is ensured that the user views (or listens to) also the advertisement information.

If the file of the encoded data is opened by an application other than the dedicated browser 62, an image in which, for example, lines and columns are swapped is simply displayed, so that the user cannot obtain the subdata without viewing output advertisement information. In other words, whenever the user obtains the subdata, the advertisement information is always output.

Figure 71:
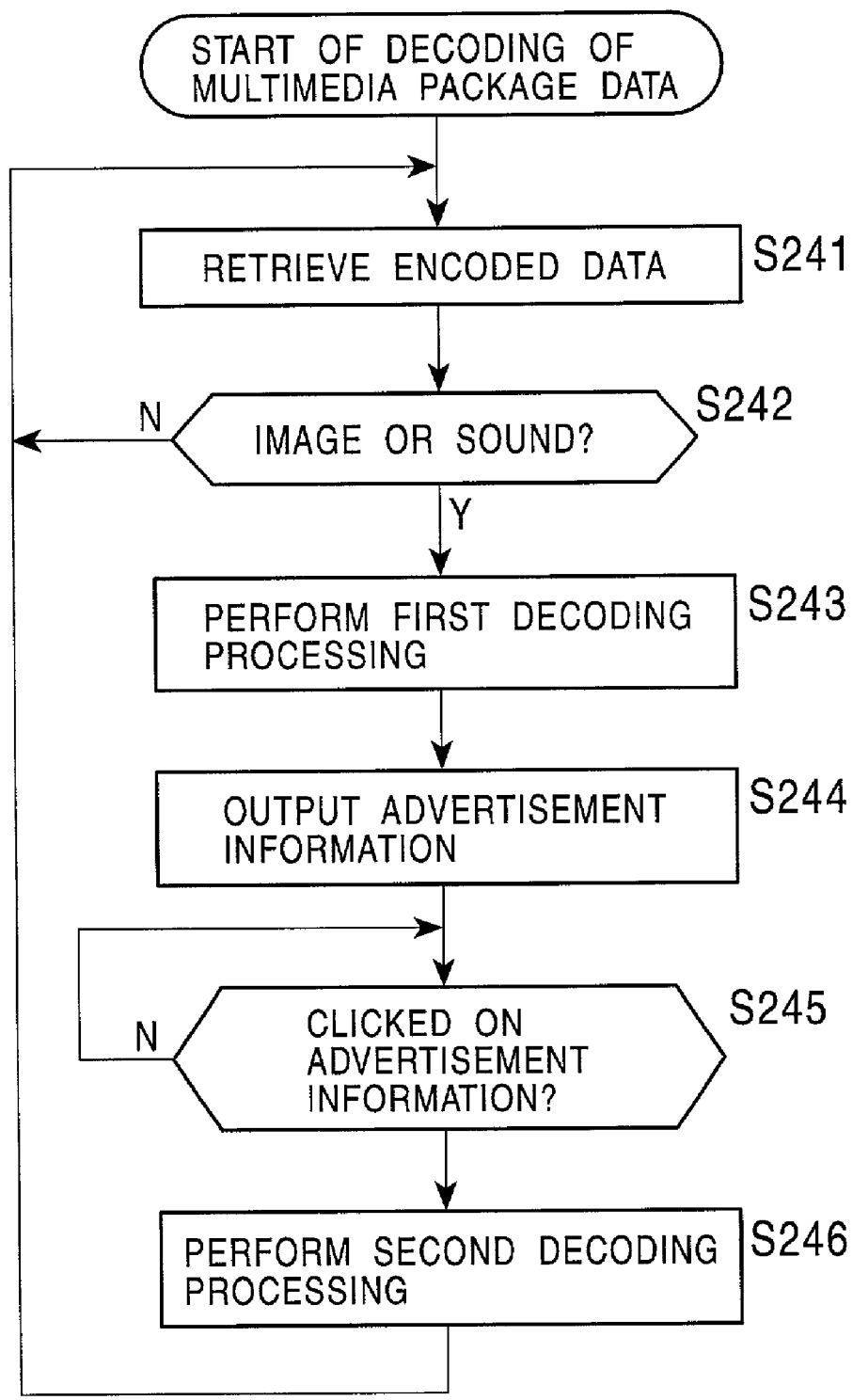
FIG. 71 is a flowchart illustrating a process for decoding multimedia package data by the user terminal 3.

The user terminal 3 in FIG. 67 can be controlled to perform a multimedia-package-data decoding process in accordance with the flowchart shown in FIG. 71.

Figure 69:
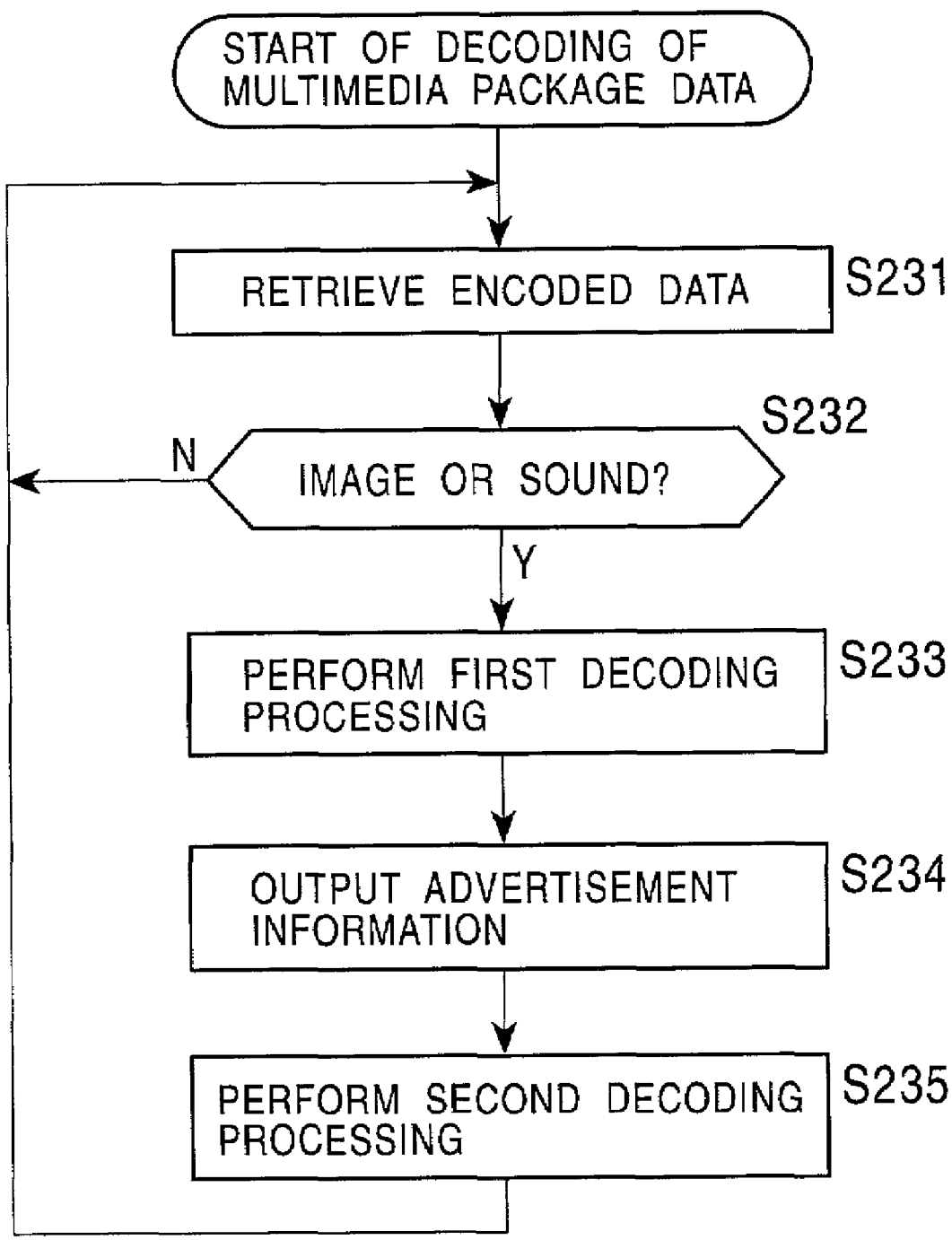
FIG. 69 is a flowchart illustrating a process for decoding multimedia package data by the user terminal 3.

In this process, the user terminal 3 performs steps S241 to S244 which are basically identical to steps S231 to S235 in FIG. 69.

In step S245 which is performed after the advertisement information reproduced in step S243 is supplied and output from the display unit 51 or the speaker 53 in step S244, the process determines whether the user has taken a predetermined action, such as clicking, on the advertisement information output in step S244. If the process has determined that the user has not clicked, the process goes back to step S245.

In step S245, if the process has determined that the user has clicked on the advertisement information output in step S244, the process proceeds to step S246, and the main data and subdata embedded therein are reproduced.

Accordingly, the subdata is not output unless the user performs clicking indicating that the user has recognized the output advertisement information. As a result, compared with the process shown in FIG. 69, the user's consciousness can be more strongly directed to the advertisement information.

In the above case, completely reproduced main data is output. However, when the main data is image data, the subdata-embedded main data obtained by the first decoding unit 54 may be first output, and the main data obtained by the second decoding unit 55 may be subsequently output instead of the subdata-embedded main data.

Figure 72:
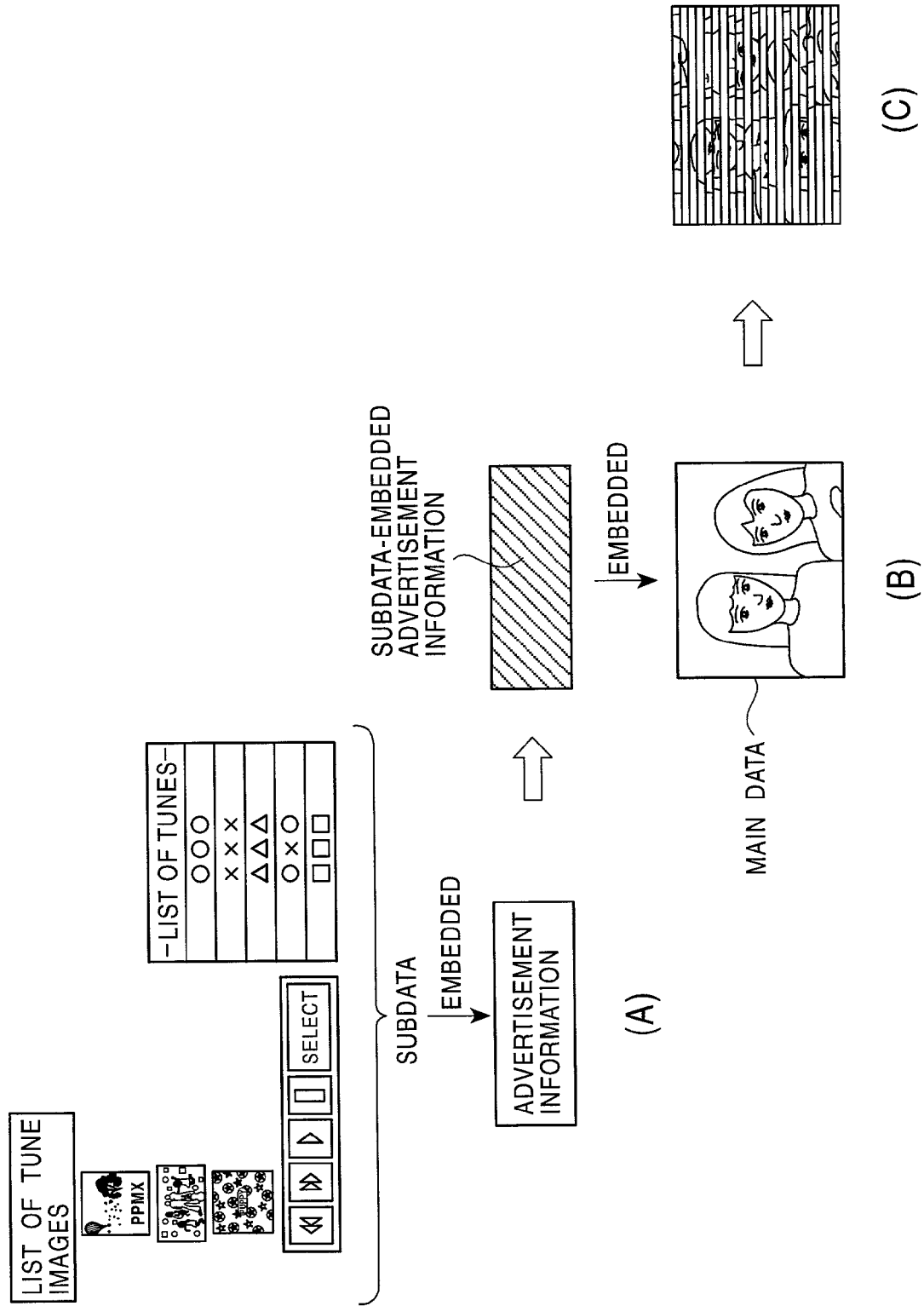
FIG. 72 is an illustration of a method for generating encoded data in which advertisement information is embedded in multimedia package data.

The embedded coding of multimedia package data for ensuring that advertisement information is shown to the user can be performed as shown in FIG. 72.

In this case, first, by embedding subdata in advertisement information, subdata-embedded advertisement information is obtained, as shown in the part (A) of FIG. 72. By embedding subdata-embedded advertisement information in main data (the part (B) of FIG. 72), encoded data (the part (C) of FIG. 72) to be provided to the user is obtained.

Figure 73:
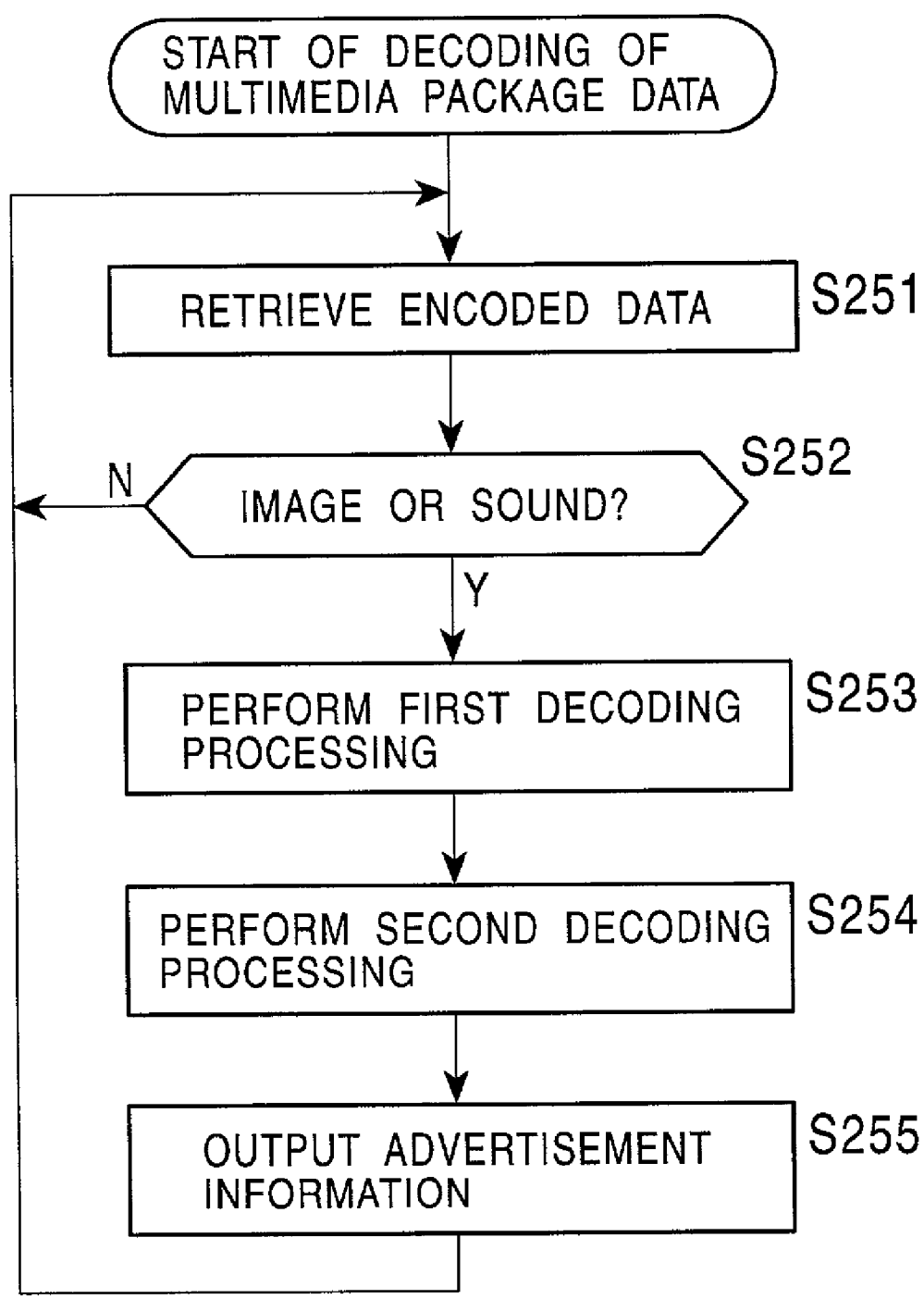
FIG. 73 is a flowchart illustrating a process for decoding multimedia package data by the user terminal 3.

When the encoded data is provided from the package server 1, the user terminal 3 shown in FIG. 67 performs a multimedia-package-data decoding process in accordance with the flowchart shown in FIG. 73.

In this process, the user terminal 3 performs steps S251 and S252 which are similar to steps S231 and S232 in FIG. 69.

In step S253, the first decoding unit 54 performs the embedded decoding process on the encoded data from the data retrieval unit 44, whereby the main data and the subdata-embedded advertisement information embedded therein are reproduced.

The subdata-embedded advertisement information obtained in step S253 is supplied from the first decoding unit 54 to the second decoding unit 55. In step S254, the second decoding unit 55 performs the embedded decoding process on the subdata-embedded advertisement information, whereby the advertisement information and the subdata embedded therein are reproduced. The process proceeds to step S255.

In step S255, the advertisement information reproduced in step S254 is supplied from the second decoding unit 55 and is output by the display unit 51 or the speaker 53. The process goes back to step S251.

The main data reproduced as described above is output in step S223 in FIG. 68, and the subdata is output in step S217 in FIG. 68.

Figure 74:
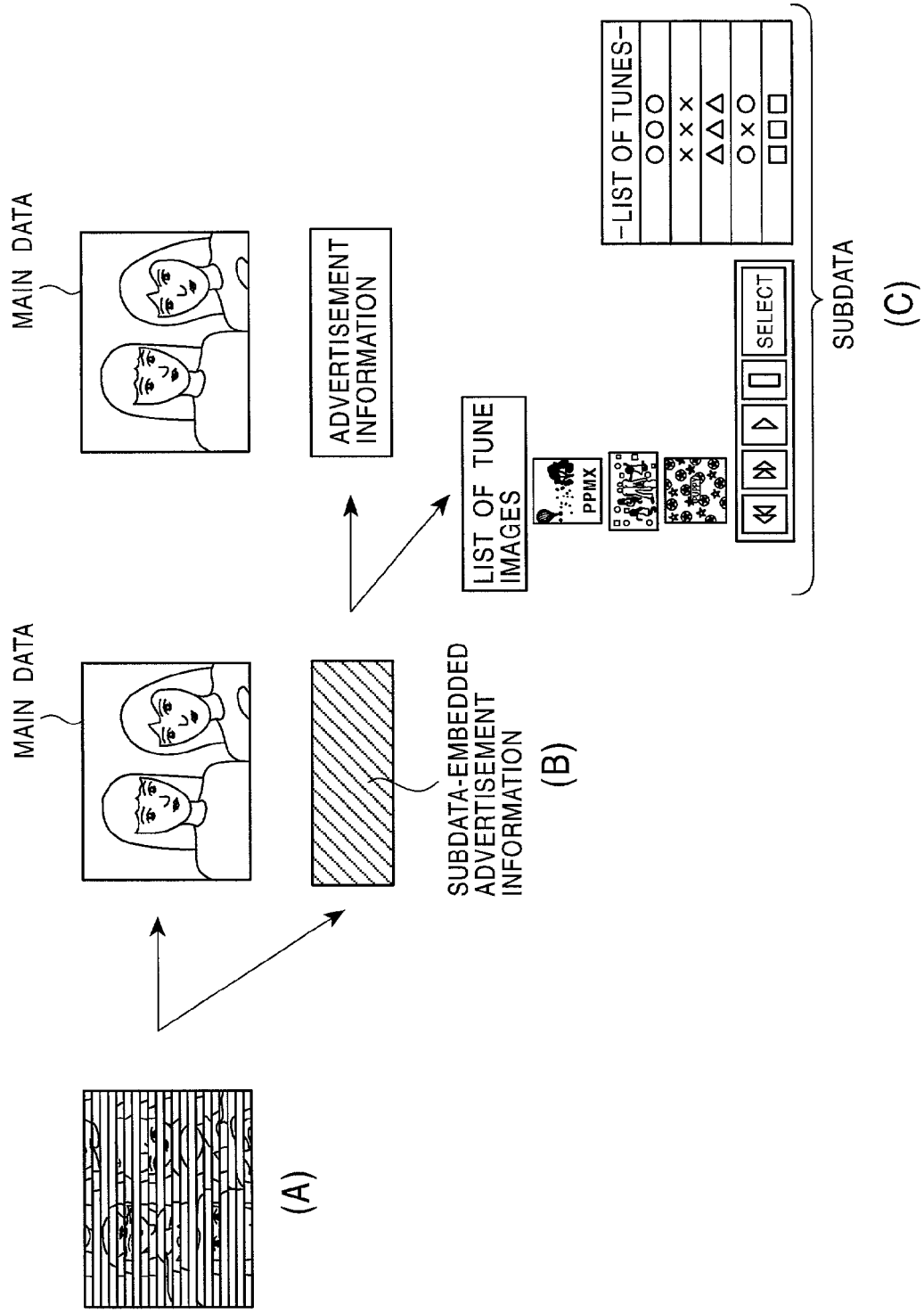
FIG. 74 is an illustration of steps for decoding encoded data by the user terminal 3.

Accordingly, when encoded data in which, for example, subdata and advertisement information are embedded in main data as image data, as described in FIG. 72, is downloaded to the user terminal 3, the encoded data (the part (A) of FIG. 74) is embedded-decoded, whereby main data and subdata-embedded advertisement information are reproduced, as shown in the part (B) of FIG. 74. The subdata-embedded advertisement information is embedded-decoded, whereby the advertisement information and subdata embedded therein are reproduced, as shown in the part (C) of FIG. 74.

As a result, when the user right-clicks on image data as the main data so that the subdata paired with the main data can be displayed, the advertisement information is always output. Thus, when the user views (or listens to) the subdata, it is ensured that the user views (or listens to) also the advertisement information.

If the file of the encoded data is opened by an application other than the dedicated browser 62, an encoded data is simply displayed, so that the user cannot obtain the subdata without viewing output advertisement information. In other words, whenever the user obtains the subdata, the advertisement information is always output.

As described using FIG. 65 or FIG. 55, from the encoded data in which the subdata and the advertisement information are separately embedded in the main data, the subdata and the advertisement information can be separately reproduced. Thus, there is a possibility that a user having evil intention can reproduce the subdata without reproducing the advertisement information. However, as described using FIG. 72, when the subdata is embedded in the advertisement information, and the subdata-embedded advertisement information is embedded in the main data, the subdata and the advertisement information must be reproduced simultaneously, so that the reproduction of the subdata without reproducing the advertisement information can be completely prevented.

When the package server 1 provides encoded data in which advertisement information is embedded, it is ensured that the user views or listens to the advertisement information. Thus, the charging processing unit 38 can count the number of times the encoded data is downloaded, and can charge the advertiser of provision of the advertisement information in accordance with the number of times the counted number of times.

Although in the above case, (the database 31 of) the package server 1 stores encoded data in which the advertisement information has already been embedded, the package server 1 can embed the advertisement information when transmitting multimedia package data requested by the user terminal 3.

Figure 75:
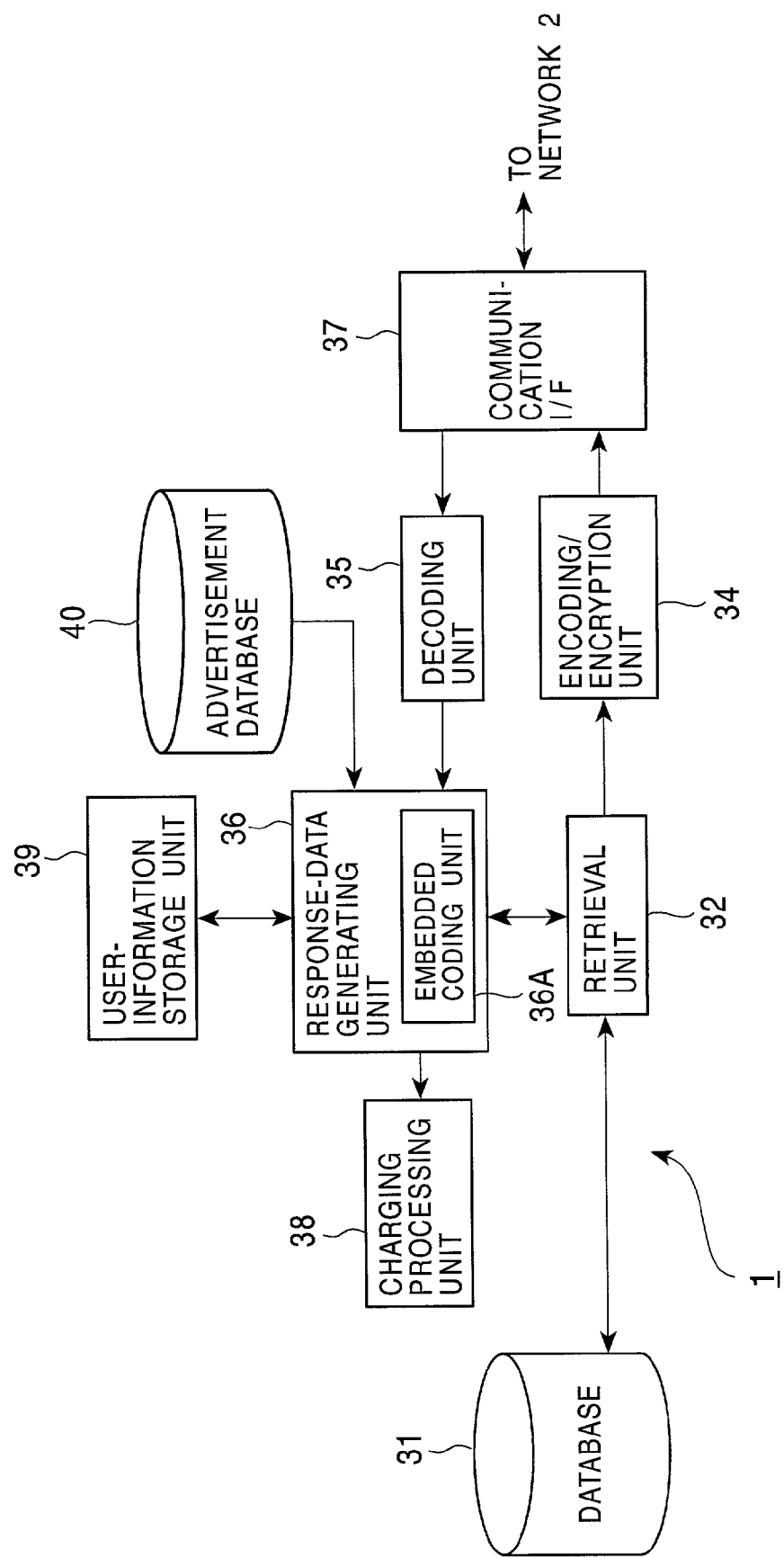
FIG. 75 is a block diagram showing a third functional construction of the package server 1.

FIG. 75 shows a construction of the above package server 1. In FIG. 75, blocks corresponding to those shown in FIG. 25 are denoted by identical reference numerals, and descriptions thereof are omitted, as required. The package server 1 shown in FIG. 75 is basically identical to that shown in FIG. 25, except that an embedded coding unit 36A and an advertisement database 40 are newly provided.

The embedded coding unit 36A is built into a response-data generating unit 36. When receiving multimedia package data from a retrieval unit 32, the response-data generating unit 36 reads advertisement information stored in the advertisement database 40 and performs the embedded coding process for embedding the read advertisement information in the multimedia package data from the retrieval unit 32. The resultant encoded data is output as response data from the embedded coding unit 36A to the retrieval unit 32.

In this case, it is possible to provide a service in which the advertiser of the advertisement information is charged beforehand and a frequency at which the advertisement information is embedded in the multimedia package data is changed in accordance with the charged amount.

Although in the above case, the advertisement information is embedded in the multimedia package data, not only the advertisement information but also predetermined information which must be output by the user terminal 3, such as copyright information, can be embedded in the multimedia package data.

The advertisement information can be embedded not only in the multimedia package data but also in the package data described using FIGS. 4 to 6 in which icon data is used as main data and text data is used as subdata.

The advertisement information can be embedded in arbitrary data other than package data having a pair of main data and subdata.

The encoded data which is provided to the user terminal 3 is not limited to the above package data having embedded advertisement information, but may be a type of data obtained by encoding package data so that the advertisement information can be obtained in the process of decoding.

In this embodiment, text data, image data, and sound data are used as media data constituting the multimedia package data. In addition, for example, a program or the like can be used, and among text data, image data, sound data, and other types of media data, arbitrary two only or four or more can be used.

What is claimed is:

1. A communication apparatus for transmitting data when requested by an external apparatus, said communication apparatus comprising:
   a storage unit for storing a plurality of pieces of package data each of which consists of main data and subdata, said main data being one of a plurality of pieces of media data, said subdata consisting of a plurality of pieces of media data and a plurality of pieces of link data corresponding thereto;
   a retrieval unit for retrieving the desired package data from said storage unit in response to a request from said external apparatus;
   an encryption unit for outputting encrypted package data generated by encrypting the retrieved package data; and
   a communication unit for transmitting the encrypted package data to said external apparatus.

2. A communication apparatus according to claim 1, wherein said storage unit stores a plurality of pieces of package data each of which consists of the main data as one media-type of data among visual data, audio data, and text data, and subdata including a plurality of visual data, a plurality of audio data, a plurality of text data, and uniform resource locator (URL) addresses corresponding to the data type thereof.

3. A communication apparatus according to claim 2, wherein said subdata stored in said storage unit further includes icon data corresponding to each of said plurality of audio data.

4. A communication apparatus according to claim 1, wherein said retrieval unit retrieves the desired package data from said storage unit in response to a URL address received from said external apparatus.

5. A communication apparatus according to claim 1, further comprising a charging processing unit which, in accordance with the transmission of the package data, generates and transmits, to an external settlement center, charging information including personal information including a credit card number assigned to a user of said external apparatus, and amount information corresponding to the package data.

6. A communication apparatus according to claim 1, further comprising:
   a user-information storage unit for storing user information on users of said external apparatus; and
   a changer unit for changing, based on the stored user information, one of the subdata in the package data stored in said storage unit and the link data in the subdata which is linked to said package data.

7. A communication apparatus according to claim 6, wherein:
   said user-information storage unit stores, for each of the users, the number of pieces of package data purchased by the users; and
   said user-information storage unit stores, for each of the users, the changed part of the subdata and the changed part of the link data.

8. A communication apparatus according to claim 1, wherein the package data stored in said storage unit is formed by embedding the subdata in the main data.

9. A communication apparatus according to claim 8, wherein the package data stored in said storage unit is formed such that the subdata is embedded in the main data so that the distribution of the energy of the main data is changed.

10. A communication apparatus according to claim 9, further comprising an embedded coding unit which reads the package data stored in said storage unit and which embeds the subdata in the main data in accordance with the subdata in the package data so that the distribution of the energy of the main data is changed.

11. A communication apparatus according to claim 10, wherein the main data is image data, and said embedded coding unit embeds the subdata in image data, as the main data, in accordance with the subdata by swapping the image data in predetermined units so that a distribution of interrelation in the image data is lost.

12. A communication apparatus according to claim 10, wherein said embedded coding unit embeds the subdata in image data, as the main data, in accordance with the subdata by swapping the image data in predetermined units so that a distribution of continuity in the image data is lost.

13. A communication apparatus according to claim 10, wherein said embedded coding unit embeds the subdata in image data, as the main data, in accordance with the subdata by swapping the image data in predetermined units so that a distribution of similarity in the image data is lost.

14. A communication apparatus for receiving data from an external apparatus, said communication apparatus comprising:
   a request unit for requesting, from said external apparatus, package data consisting of main data and subdata in response to a user's instruction, said main data being one of a plurality of media data, said subdata consisting of a plurality of pieces of media data and a plurality of pieces of link data corresponding thereto;
   an output unit for outputting, in response to the request by said request unit, the main data of the package data received from said external apparatus;
   a user-instruction detecting unit for detecting a user's instruction concerning the output main data; and
   an output control unit for outputting the subdata corresponding to the output main data when the user's instruction is detected by said user-instruction detecting unit;
   wherein when said user-instruction detecting unit detects a user's instruction concerning part of the subdata, said request unit requests new package data from said external apparatus based on link data corresponding to the part of the subdata.

15. A communication apparatus according to claim 14, wherein said package data includes: the main data as one media-type of data among visual data, audio data, and text data; and subdata including a plurality of visual data, a plurality of audio data, a plurality of text data, and URL addresses corresponding to the data type thereof.

16. A communication apparatus according to claim 15, wherein said subdata further includes icon data corresponding to each of said plurality of audio data.

17. A communication apparatus according to claim 15, wherein:
   said output unit outputs, in the form of an icon image, the visual data as the main data of said package data received from said external apparatus; and
   said user-instruction detecting unit detects the user's instruction in accordance with a designation with a mouse by the user which is related to said icon image output by said output unit; and
   said output control unit displays, in the form of a pop-up menu, the subdata corresponding to the main data in accordance with the detection of the user's instruction.

18. A communication apparatus according to claim 16, wherein:
said output unit outputs, in the form of an icon image, the visual data as the main data of said package data received from said external apparatus; and
said user-instruction detecting unit detects the user's instruction in accordance with a designation with a mouse by the user which is related to said icon image output by said output unit;
said output control unit displays, in the form of a pop-up menu, the subdata corresponding to the main data in accordance with the detection of the user's instruction;
an arrangement of icon images is displayed as the visual data;
an operation unit is displayed which can selectively reproduce a plurality of audio data as the audio data; and
a pop-up menu having items formed by a plurality of text data as said text data.

19. A communication apparatus according to claim 14, wherein said request unit transmits, to said external apparatus, a URL address corresponding to part of the subdata designated by the user's instruction.

20. A communication apparatus according to claim 19, further comprising a storage unit for storing said package data,
wherein said request unit periodically requests said package data stored in said storage unit from said external apparatus and updates the requested package data.

21. A communication apparatus according to claim 20, further comprising:
a user-information storage unit for storing user information on a user who uses said external apparatus; and
a changer unit for changing, based on said user information stored in said user-information storage unit, one of the subdata in the package data stored in said storage unit and the link data in the subdata which is linked to the package data.

22. A communication apparatus according to claim 21, wherein:
said user-information storage unit stores, for each of the users, the number of pieces of package data purchased by the users; and
said user-information storage unit stores, for each of the users, the changed part of the subdata and the changed part of the link data.

23. A communication apparatus according to claim 14, wherein the package data is formed by embedding the subdata in the main data.

24. A communication apparatus according to claim 23, wherein the package data is formed such that the subdata is embedded in the main data so that the distribution of the energy of the main data is changed.

25. A communication apparatus according to claim 24, wherein the package data is formed such that the subdata is embedded in image data, as the main data, in accordance with the subdata by swapping the image data in predetermined units so that a distribution of interrelation in the image data is lost.

26. A communication apparatus according to claim 24, wherein the package data is formed such that the subdata is embedded in image data, as the main data, in accordance with the subdata by swapping the image data in predetermined units so that a distribution of continuity in the image data is lost.

27. A communication apparatus according to claim 24, wherein the package data is formed such that the subdata is embedded in image data, as the main data, in accordance with the subdata by swapping the image data in predetermined units so that a distribution of similarity in the image data is lost.

28. A communication apparatus for receiving data from an external apparatus, comprising:
a request unit for requesting, from said external apparatus, encoded data generated by performing encoding so that predetermined information is reproduced when decoding the encoded data;
a decoding unit for receiving and decoding the requested encoded data; and
an output unit for outputting both the predetermined information and decoded data generated by finally decoding the encoded data;
wherein the encoded data received in accordance with the request from said request unit is formed by encoding package data having main data and subdata, and said main data is one of a plurality of pieces of media data and said subdata consists of a plurality of pieces of media data and a plurality of pieces of link data corresponding thereto;
further comprising:
a user-instruction detecting unit for detecting a user's instruction concerning the output main data; and
an output control unit for outputting the subdata corresponding to the output main data when the user's instruction is detected by said user-instruction detecting unit;
wherein when said user-instruction detecting unit detects a user's instruction concerning part of the subdata, said request unit requests new package data from said external apparatus based on link data corresponding to the part of the subdata;
wherein the package data includes:
a plurality of pieces of package data each of which consists of the main data as one media-type of data among visual data, audio data, and text data; and
subdata including a plurality of visual data, a plurality of audio data, a plurality of text data, and URL addresses corresponding to the data type thereof;
wherein:
said output unit outputs, in the form of an icon image, the visual data as the main data of said package data received from said external apparatus;
said user-instruction detecting unit detects the user's instruction in accordance with a designation with a mouse by the user which is related to said icon image output by said output unit; and
said output control unit displays, in the form of a pop-up menu, the subdata corresponding to the main data in accordance with the detection of the user's instruction
wherein:
said output unit outputs, in the form of an icon image, the visual data as the main data of said package data received from said external apparatus; and
said user-instruction detecting unit detects the user's instruction in accordance with a designation with a mouse by the user which is related to said icon image output by said output unit;
said output control unit displays, in the form of a pop-up menu, the subdata corresponding to the main data in accordance with the detection of the user's instruction;
an arrangement of icon images is displayed as the visual data;
an operation unit is displayed which can selectively reproduce a plurality of audio data as the audio data; and a pop-up menu having items formed by a plurality of text data as said text data.

29. A communication apparatus for receiving data from an external apparatus, comprising:
- a request unit for requesting, from said external apparatus, encoded data generated by performing encoding so that predetermined information is reproduced when decoding the encoded data;
- a decoding unit for receiving and decoding the requested encoded data; and
- an output unit for outputting both the predetermined information and decoded data generated by finally decoding the encoded data;
- wherein the encoded data received in accordance with the request from said request unit is formed by encoding package data having main data and subdata, and said main data is one of a plurality of pieces of media data and said subdata consists of a plurality of pieces of media data and a plurality of pieces of link data corresponding thereto;
- further comprising:
- a user-instruction detecting unit for detecting a user's instruction concerning the output main data; and
- an output control unit for outputting the subdata corresponding to the output main data when the user's instruction is detected by said user-instruction detecting unit;
- wherein when said user-instruction detecting unit detects a user's instruction concerning part of the subdata, said request unit requests new package data from said external apparatus based on link data corresponding to the part of the subdata;
- wherein said request unit transmits, to said external apparatus, a URL address corresponding to part of the subdata designated by the users instruction.

30. A communication apparatus according to claim 29, further comprising a storage unit for storing said package data,
- wherein said request unit periodically requests said package data stored in said storage unit from said external apparatus and updates the requested package data.

31. A communication apparatus according to claim 30, further compnsing:
- a user-information storage unit for storing user information on a user who uses said external apparatus; and
- a changer unit for changing, based on said user information stored in said user-information storage unit, one of the subdata in the package data stored in said storage unit and the link data in the subdata which is linked to said package data.

32. A communication apparatus according to claim 31, wherein:
- said user-information storage unit stores, for each of the users, the number of pieces of package data purchased by the users; and
- said user-information storage unit stores, for each of the users, the changed part of the subdata and the changed part of the link data.

* * * * *